US012677322B2

(12) United States Patent
Khoshkholgh Dashtaki et al.

(10) Patent No.: US 12,677,322 B2
(45) Date of Patent: Jul. 7, 2026

(54) CONTENTION RESOLUTION IN NON-TERRESTRIAL NETWORKS

(71) Applicant: Ofinno, LLC, Reston, VA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 420 days.

(21) Appl. No.: 18/080,208

(22) Filed: Dec. 13, 2022

(65) Prior Publication Data

US 2023/0189345 A1     Jun. 15, 2023

Related U.S. Application Data

(60) Provisional application No. 63/289,183, filed on Dec. 14, 2021.

(51) Int. Cl.

| | |
|---|---|
| *H04W 74/0833* | (2024.01) |
| *H04W 72/12* | (2023.01) |
| *H04W 72/232* | (2023.01) |
| *H04W 74/0836* | (2024.01) |
| *H04W 74/0838* | (2024.01) |

(52) U.S. Cl.
CPC ....... *H04W 74/0833* (2013.01); *H04W 72/12* (2013.01); *H04W 72/232* (2023.01); *H04W 74/0836* (2024.01); *H04W 74/0838* (2024.01)

(58) Field of Classification Search
None
See application file for complete search history.

(56) References Cited

U.S. PATENT DOCUMENTS

| | | | |
|---|---|---|---|
| 11,515,937 B2 * | 11/2022 | Nuttall | H04B 7/18586 |
| 12,279,220 B2 * | 4/2025 | Kong | H04W 56/0045 |

(Continued)

OTHER PUBLICATIONS

U.S. Appl. No. 63/169,668, filed Apr. 1, 2021 to Huang et al., "Method and Apparatus for Handling Contention Resolution in a Wireless Communication System".*

(Continued)

*Primary Examiner* — Gregory B Sefcheck

(74) *Attorney, Agent, or Firm* — Matthew Fernandez; Kavon Nasabzadeh; Jacob L. Mangan

(57) ABSTRACT

A wireless device receives one or more configuration parameters indicating a single value for a contention resolution timer. The wireless device starts the contention resolution timer based on an initial transmission of a transport block of a random access (RA) procedure via a non-terrestrial network, where a length of the contention resolution timer is initialized equal to the single value. The wireless device receives, while the contention resolution timer is running, a first downlink control information (DCI) indicating a retransmission of the transport block. In response to the contention resolution timer expiring and the receiving the first DCI during the contention resolution timer, the wireless device does not discard a temporary cell (TC) radio network temporary identifier (RNTI) of the wireless device, where the expiry of the contention resolution timer is prior to the retransmission of the transport block.

20 Claims, 28 Drawing Sheets

Scheduling/indicating Msg3 transmission

Scheduling/indicating Msg3 retransmission indicating the indication of the contention resolution indicator

BS

Msg1/MsgA

Msg2/MsgB

Msg3

PDCCH

Msg3

Msg4

RA procedure is triggered/ initiated

UE   T0   T1                T2   T3   T4                T5   T6        T7   Time RAR response window (e.g., *ra-ResponseWindow* or *msgB-ResponseWindow*)

Contention resolution timer

(56) References Cited

U.S. PATENT DOCUMENTS

| | | | | |
|---|---|---|---|---|
| 2009/0197589 | A1* | 8/2009 | Kitazoe | H04W 76/25 |
| | | | | 455/422.1 |
| 2010/0278131 | A1* | 11/2010 | Jeong | H04W 74/0833 |
| | | | | 370/329 |
| 2016/0192433 | A1* | 6/2016 | Deenoo | H04W 24/08 |
| | | | | 370/329 |
| 2016/0286600 | A1* | 9/2016 | Faccin | H04W 76/27 |
| 2016/0337848 | A1* | 11/2016 | Chang | H04W 12/041 |
| 2019/0098563 | A1* | 3/2019 | Bressanelli | H04W 36/305 |
| 2020/0107369 | A1* | 4/2020 | Jeon | H04W 74/006 |
| 2020/0404713 | A1* | 12/2020 | Sakhnini | H04W 74/0833 |
| 2021/0227575 | A1* | 7/2021 | Ou | H04L 1/1864 |
| 2021/0227594 | A1* | 7/2021 | Lee | H04W 24/08 |
| 2021/0266957 | A1* | 8/2021 | Shrestha | H04L 1/1825 |
| 2021/0298114 | A1* | 9/2021 | Nam | H04W 52/0216 |
| 2022/0039152 | A1* | 2/2022 | Shi | H04W 74/0816 |
| 2022/0053461 | A1* | 2/2022 | Bao | H04W 72/1263 |
| 2022/0078856 | A1* | 3/2022 | Jeon | H04L 5/0055 |
| 2022/0110184 | A1* | 4/2022 | Jeon | H04W 74/0841 |
| 2022/0124672 | A1* | 4/2022 | Xu | H04W 72/044 |
| 2022/0272767 | A1* | 8/2022 | Liu | H04L 1/188 |
| 2022/0322458 | A1* | 10/2022 | Huang | H04W 74/0833 |
| 2022/0361013 | A1* | 11/2022 | Cai | H04W 74/0833 |
| 2022/0361282 | A1* | 11/2022 | Jiang | H04W 76/28 |
| 2023/0043620 | A1* | 2/2023 | Khoshkholgh Dashtaki | |
| | | | | H04W 74/0833 |
| 2023/0045529 | A1* | 2/2023 | Khoshkholgh Dashtaki | |
| | | | | H04W 74/0841 |
| 2023/0080733 | A1* | 3/2023 | Tao | H04W 76/27 |
| | | | | 370/328 |
| 2023/0099762 | A1* | 3/2023 | Khoshkholgh Dashtaki | |
| | | | | H04W 72/23 |
| | | | | 370/350 |
| 2023/0127160 | A1* | 4/2023 | Khoshkholgh Dashtaki | |
| | | | | H04W 74/0836 |
| | | | | 370/329 |
| 2023/0180249 | A1* | 6/2023 | Bala | H04W 52/028 |
| | | | | 370/329 |
| 2023/0388952 | A1* | 11/2023 | Khoshkholgh Dashtaki | |
| | | | | H04W 56/0045 |
| 2023/0389126 | A1* | 11/2023 | Li | H04W 56/0045 |

OTHER PUBLICATIONS

U.S. Appl. No. 63/280,339, filed Nov. 17, 2021 to Huang et al., "Method and Apparatus for Handling Contention Resolution in a Wireless Communication System".*

3GPP TS 38.212 V16.7.0 (Sep. 2021); Technical Specification; 3rd Generation Partnership Project; Technical Specification Group Radio Access Network; NR; Multiplexing and channel coding; (Release 16).

3GPP TS 38.213 V16.7.0 (Sep. 2021); Technical Specification; 3rd Generation Partnership Project; Technical Specification Group Radio Access Network; NR; Physical layer procedures for control (Release 16).

3GPP TS 38.214 V16.7.0 (Sep. 2021); Technical Specification; 3rd Generation Partnership Project; Technical Specification Group Radio Access Network; NR; Physical layer procedures for data; (Release 16).

3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).

3GPP TS 38.321 V16.6.0 (Sep. 2021); Technical Specification; 3rd Generation Partnership Project; Technical Specification Group Radio Access Network; NR; Medium Access Control (MAC) protocol specification; (Release 16).

3GPP TS 38.331 V16.6.0 (Sep. 2021); Technical Specification; 3rd Generation Partnership Project; Technical Specification Group Radio Access Network; NR; Radio Resource Control (RRC) protocol specification; (Release 16).

R2-2108318; 3GPP TSG-RAN WG2 Meeting #115-e; Online, Aug. 9-27, 2021; (Revision of R2-2105250); Agenda tem: 8.10.2.2; Souce: MediaTek Inc.; Title: On disabling uplink HARQ retransmission and associated LCP impacts; Document for: Discussion and decision.

R2-2110308; 3GPP TSG-RAN WG2 Meeting #116 electronic; Online, Nov. 1-Nov. 12, 2021; Agenda item: 8.10.2.2; Source: Lenovo, Motorola Mobility; Title: Remaining UP issues for NR NTN; Document for: Discussion.

R2-2110864; 3GPP RAN WG2 Meeting #116e; eMeeting Nov. 1-12, 2021; Change Request; 38.321; CR draft; rev -; Current version: 16.6.0.

R2-2111006; 3GPP TSG-RAN WG2 Meeting #116 electronic; Online, Nov. 1-12, 2021; Agenda Item: 8.10.2.1; Source: ASUSTek; Title: Discussion on issue of restarting contention resolution timer; Document for: Discussion and Decision.

R2-2111338; 3GPP TSG-RAN WG2 Meeting #116 electronic; Online, Nov. 1-Nov. 12, 2021; Agenda tem: 8.10.2.1; Source: OPPO; Title: Summary of [AT116-e][106][NTN] RACH aspects (OPPO); Document for: Discussion and Decision.

R2-2111351; 3GPP TSG-RAN WG2 Meeting #116 electronic; Online, Nov. 1- Nov. 12, 2021; Agenda Item: 8.10.2.1; Source: OPPO; Title: Summary of [AT116-e][106][NTN] RACH aspects (OPPO)—phase 2; Document for: Discussion and Decision.

* cited by examiner

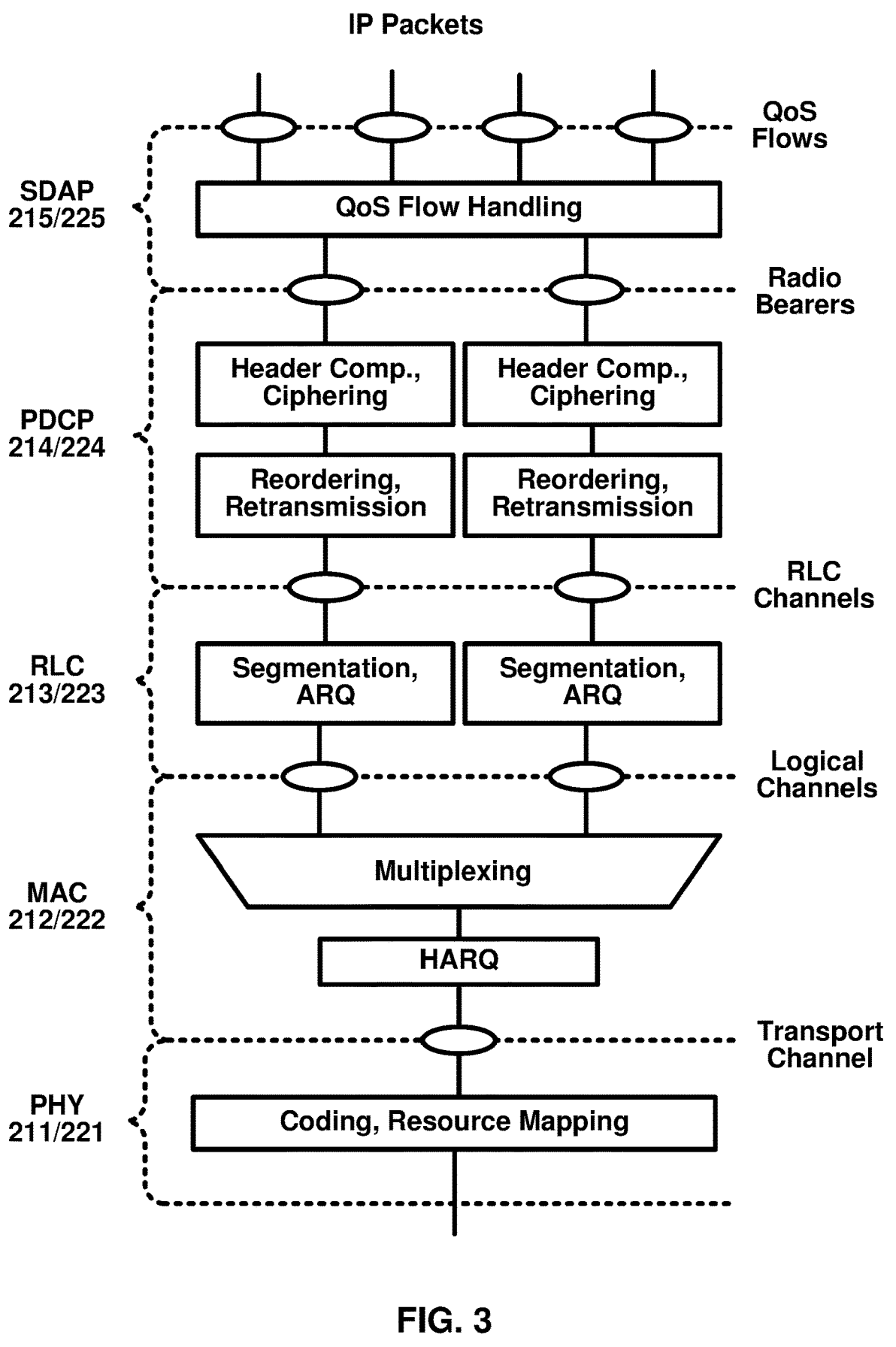

IP Packets

QoS Flows

SDAP
215/225

QoS Flow Handling

Radio Bearers

PDCP
214/224

Header Comp., Ciphering

Header Comp., Ciphering

Reordering, Retransmission

Reordering, Retransmission

RLC Channels

RLC
213/223

Segmentation, ARQ

Segmentation, ARQ

Logical Channels

MAC
212/222

Multiplexing

HARQ

Transport Channel

PHY
211/221

Coding, Resource Mapping

FIG. 3

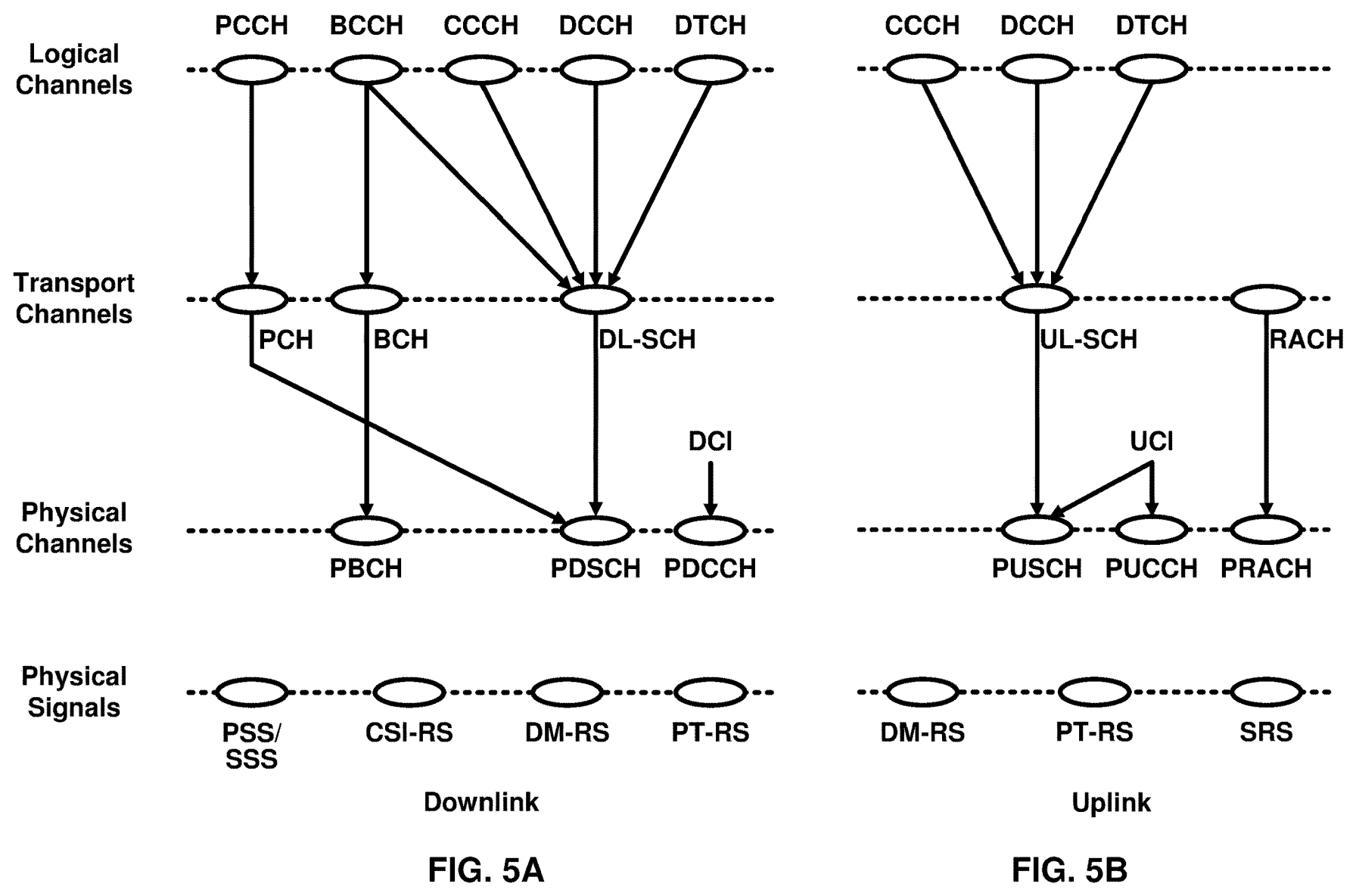

Logical Channels

Transport Channels

Physical Channels

Physical Signals

DTCH DCCH CCCH

UL-SCH RACH

PUSCH PUCCH PRACH

UCI

DM-RS PT-RS SRS

Uplink

FIG. 5B

PCCH BCCH CCCH DCCH DTCH

PCH BCH DL-SCH

PBCH PDSCH PDCCH

DCI

PSS/SSS CSI-RS DM-RS PT-RS

Downlink

FIG. 5A

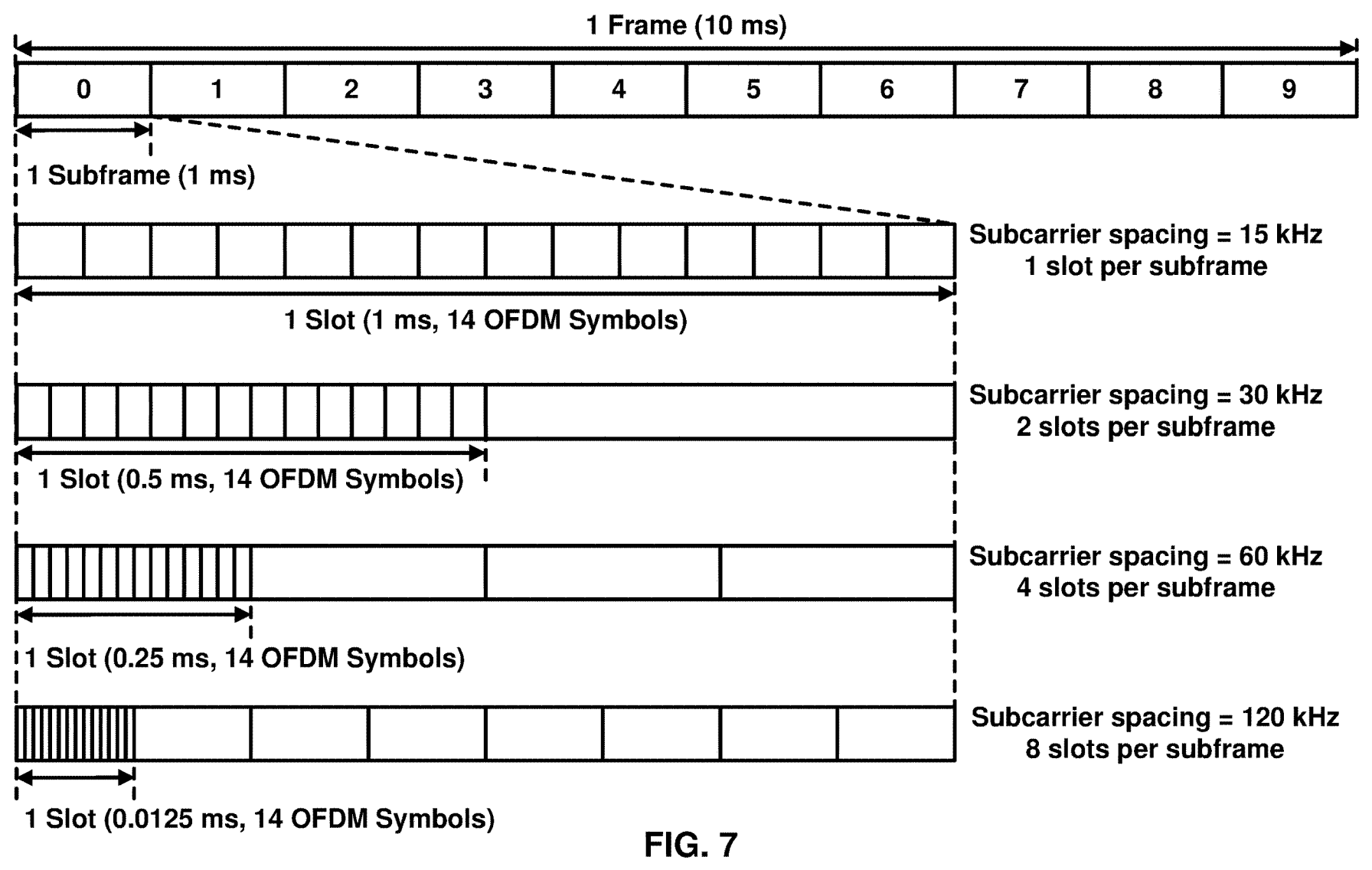

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Frequency

Time

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000km | Elliptical around the earth | 200 – 3500 km |

FIG. 19

| Class of Orbit | Altitude (km) | Elevation angle (degrees) | |
|---|---|---|---|
| | | 0 | 90 |
| LEO satellite | | Propagation delay – satellite to UE (millisec) | |
| | 800 | 11.0 | 2.7 |
| | 1400 | 14.8 | 4.7 |
| MEO satellite | | Propagation delay – satellite to UE (millisec) | |
| | 8000 | 43.0 | 26.7 |
| GEO satellite | | Propagation delay – satellite to UE (millisec) | |
| | 35,786 | 138.9 | 119.3 |

Types of non-terrestrial network platforms

FIG. 21

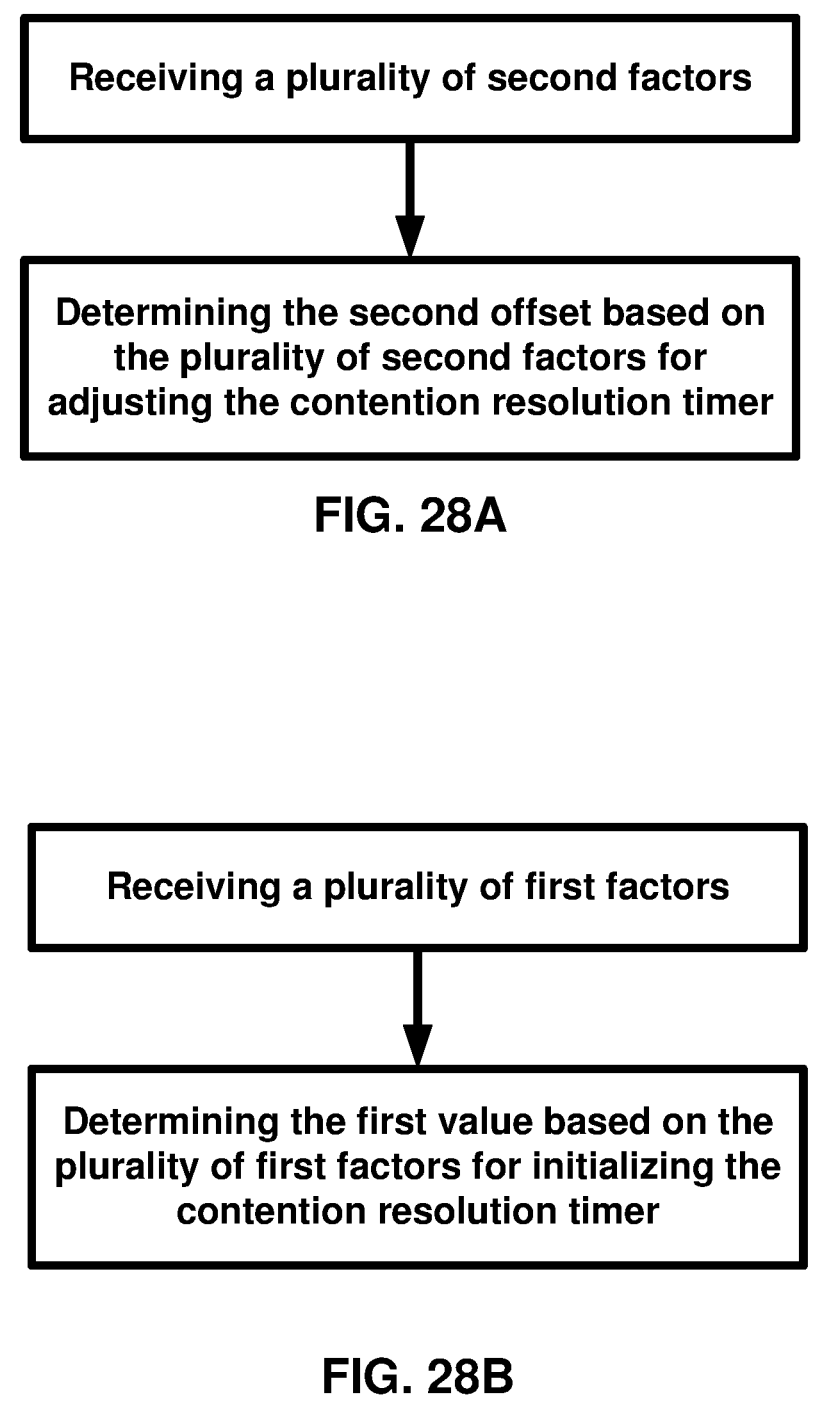

Receiving a plurality of second factors

Determining the second offset based on the plurality of second factors for adjusting the contention resolution timer

FIG. 28A

Receiving a plurality of first factors

Determining the first value based on the plurality of first factors for initializing the contention resolution timer

FIG. 28B

CONTENTION RESOLUTION IN NON-TERRESTRIAL NETWORKS

CROSS-REFERENCE TO RELATED APPLICATIONS

This application claims the benefit of U.S. Provisional Application No. 63/289,183, filed Dec. 14, 2021, which is hereby incorporated by reference in its entirety.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 17 shows several DCI formats.

FIG. 19 is an example figure of different types of NTN platforms/nodes.

FIG. 21 shows examples of propagation delay corresponding to NTNs of different altitudes.

FIG. 28A and FIG. 28B depict example flow diagrams of an RA procedure per aspect of an embodiment of the present disclosure.

DETAILED DESCRIPTION

Figures 1A, 1B:
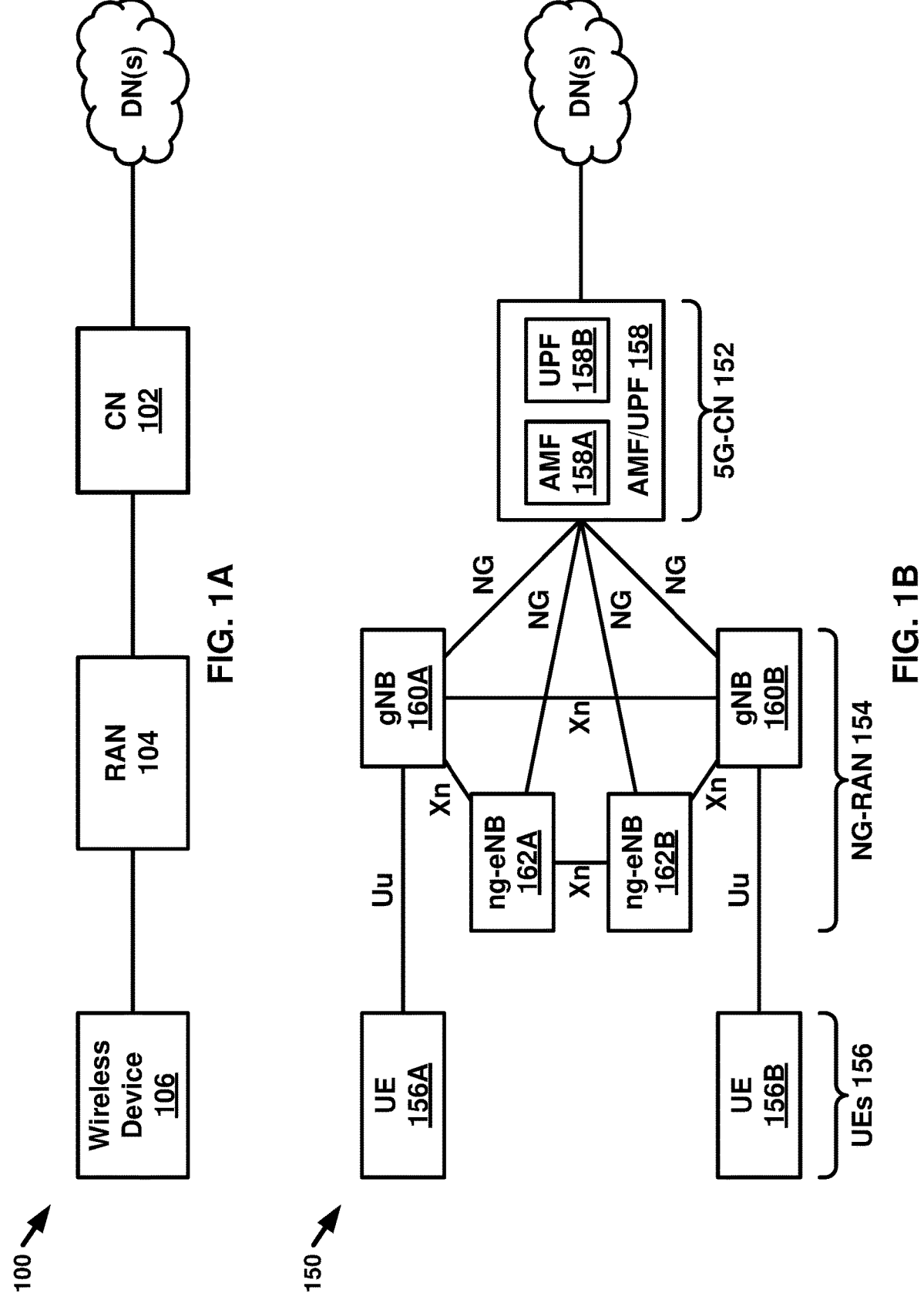
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
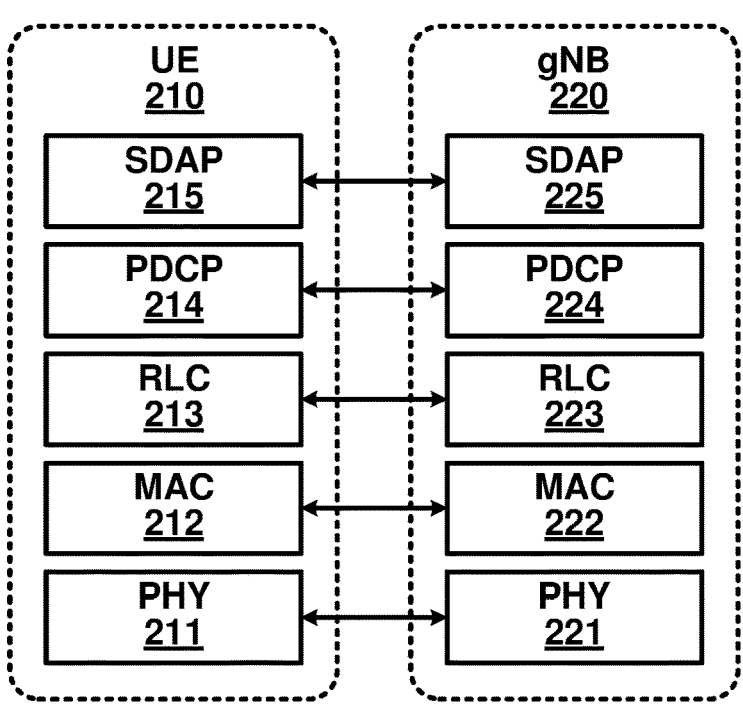
FIG. 2A and FIG. 2B respectively illustrate a New Radio (NR) user plane and control plane protocol stack.
Figure 2B:
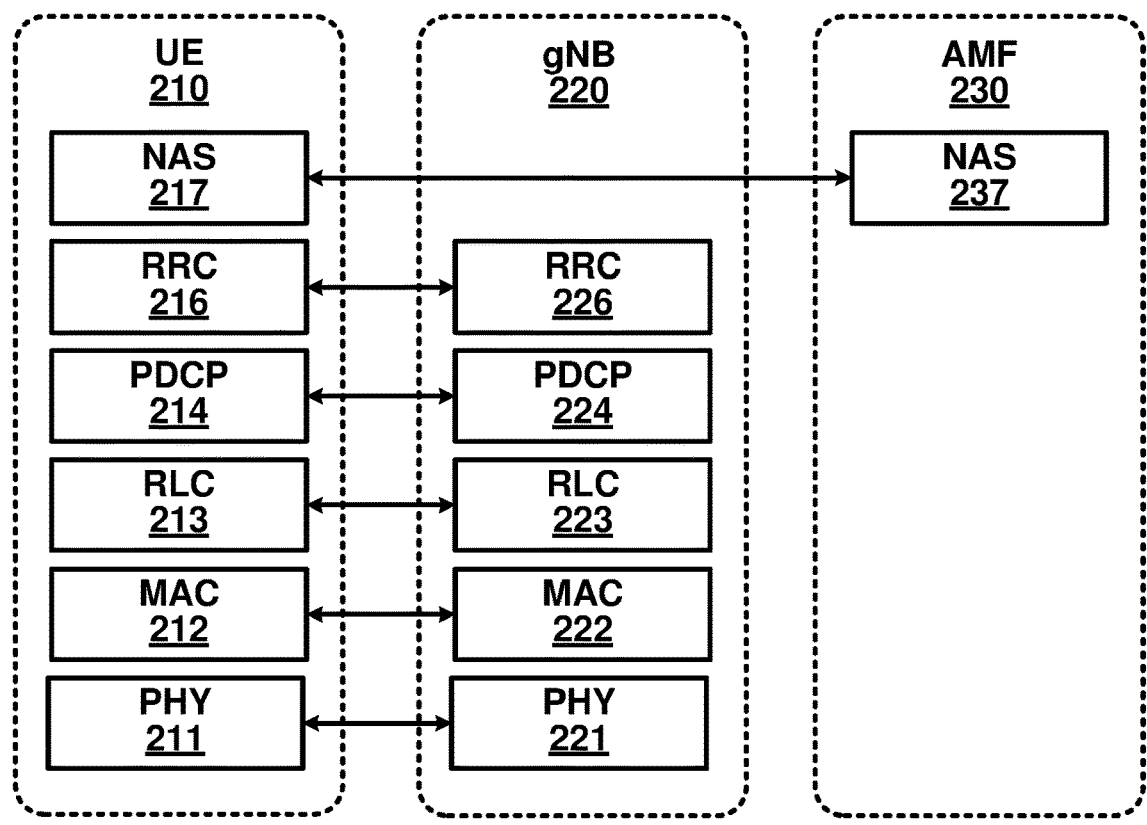

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions.

The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
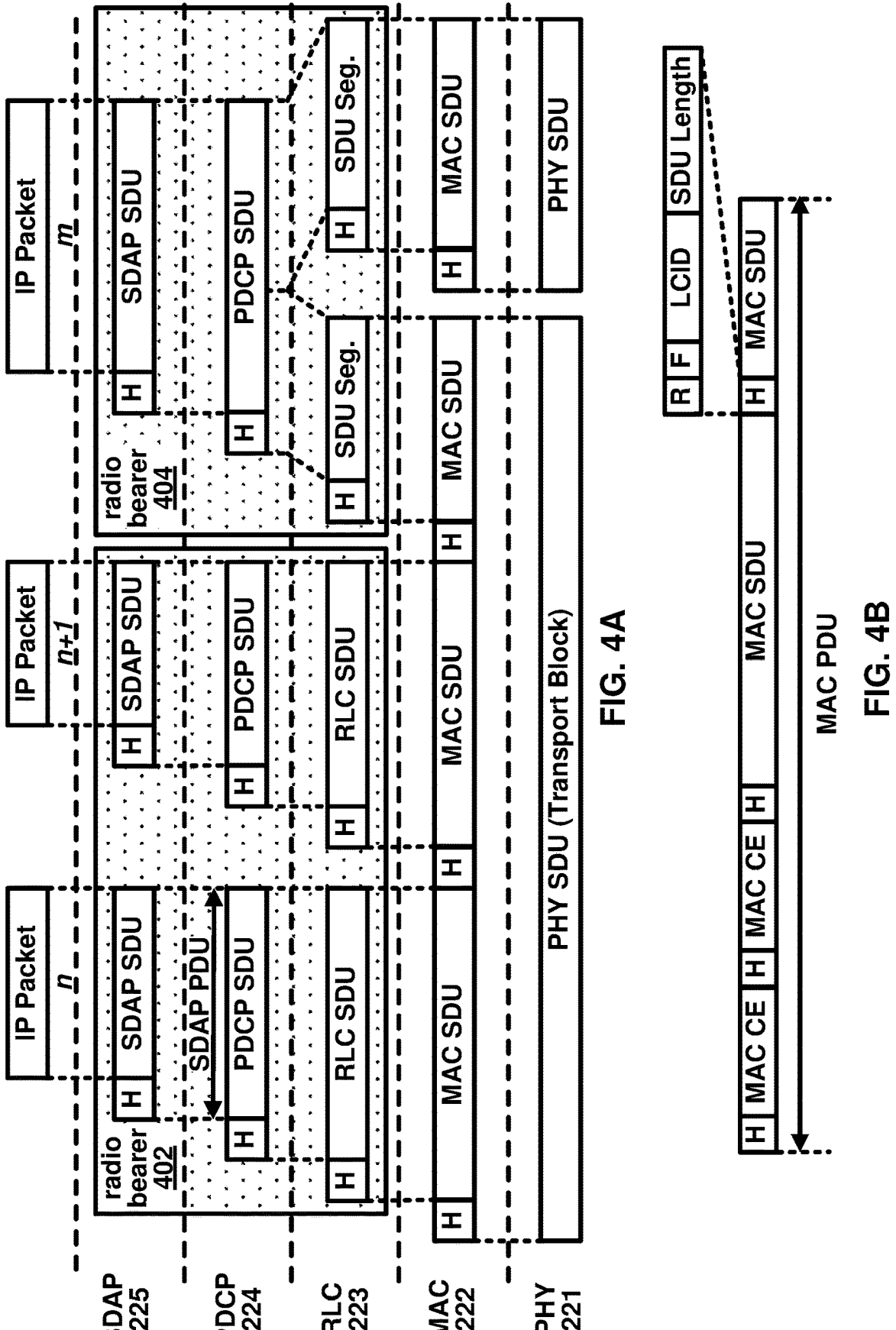
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
   a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;
   a dedicated control channel (DCCH) for carrying control messages to/from a specific the UE to configure the UE; and
   a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;
   a broadcast channel (BCH) for carrying the MIB from the BCCH;
   a downlink shared channel (DL-SCH) for carrying downlink data and signaling messages, including the SIBs from the BCCH;
   an uplink shared channel (UL-SCH) for carrying uplink data and signaling messages; and
   a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;
   a physical downlink shared channel (PDSCH) for carrying downlink data and signaling messages from the DL-SCH, as well as paging messages from the PCH;
   a physical downlink control channel (PDCCH) for carrying downlink control information (DCI), which may include downlink scheduling commands, uplink scheduling grants, and uplink power control commands;
   a physical uplink shared channel (PUSCH) for carrying uplink data and signaling messages from the UL-SCH and in some instances uplink control information (UCI) as described below;
   a physical uplink control channel (PUCCH) for carrying UCI, which may include HARQ acknowledgments, channel quality indicators (CQI), pre-coding matrix indicators (PMI), rank indicators (RI), and scheduling requests (SR); and
   a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
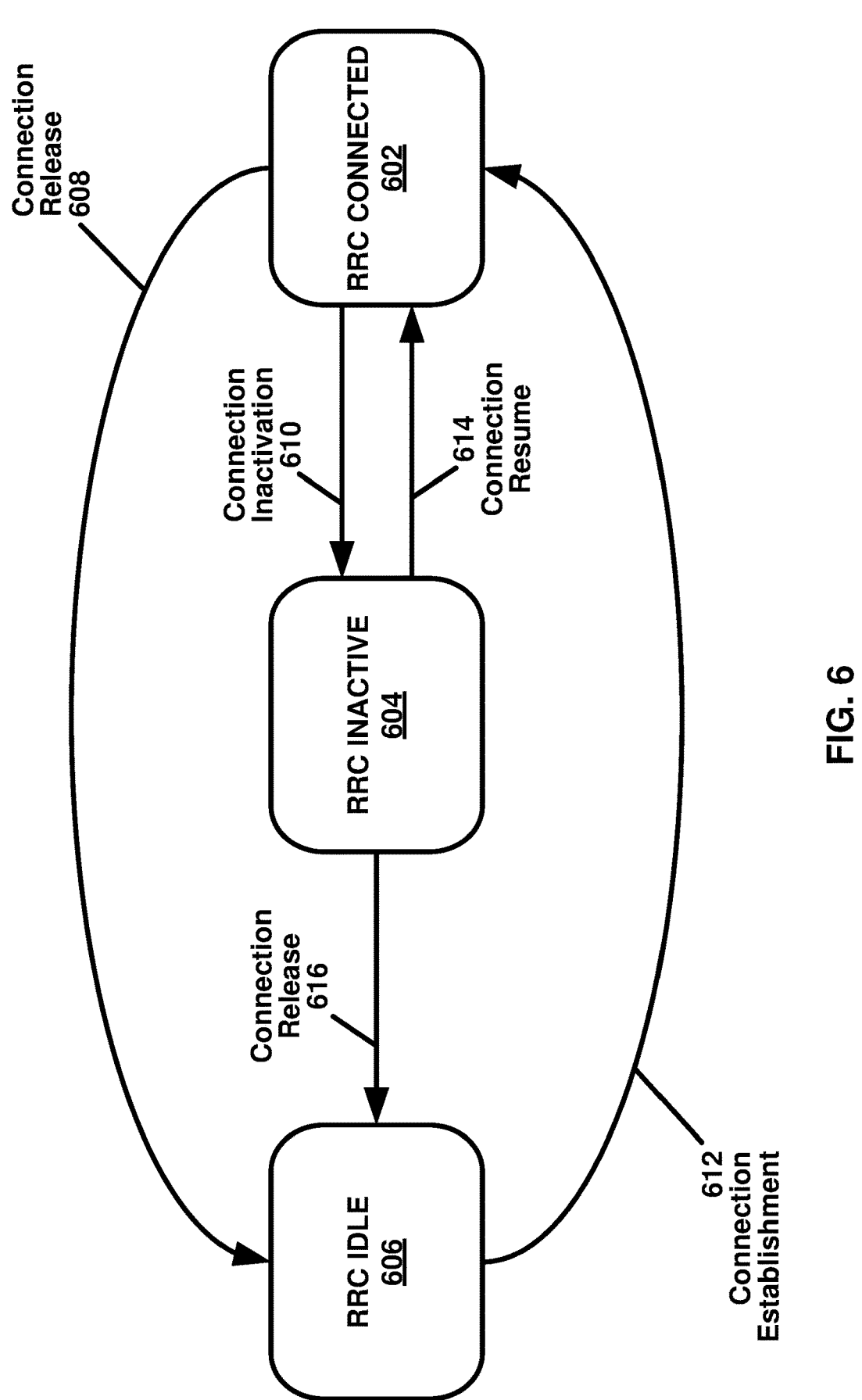
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 s. For example, NR defines numerologies with the following subcarrier spacing/cyclic prefix duration combinations: 15 kHz/4.7 s; 30 kHz/2.3 s; 60 kHz/1.2 s; 120 kHz/0.59 s; and 240 kHz/0.29 s.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
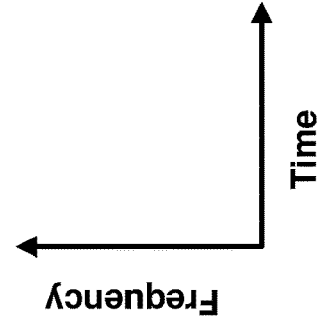
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
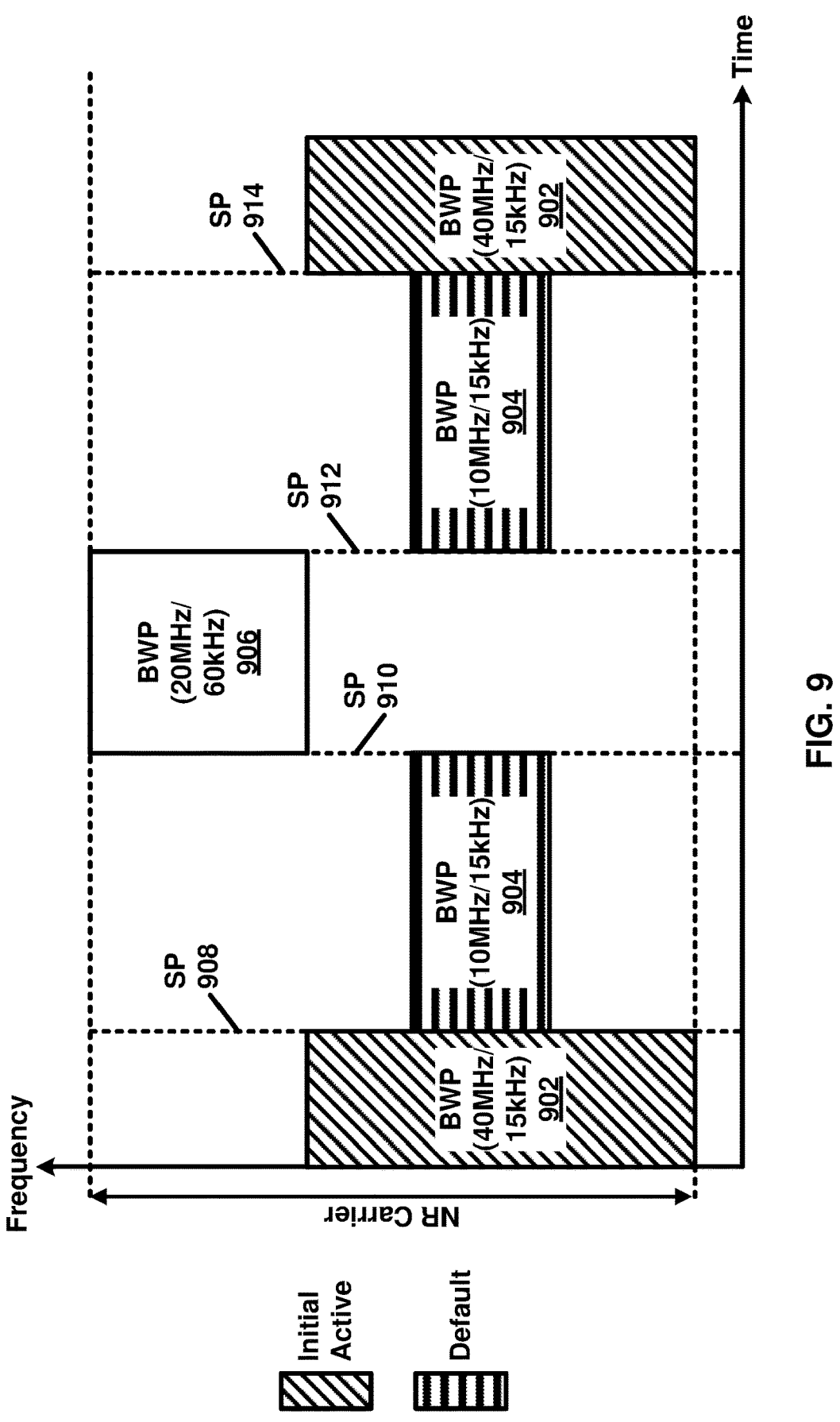
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
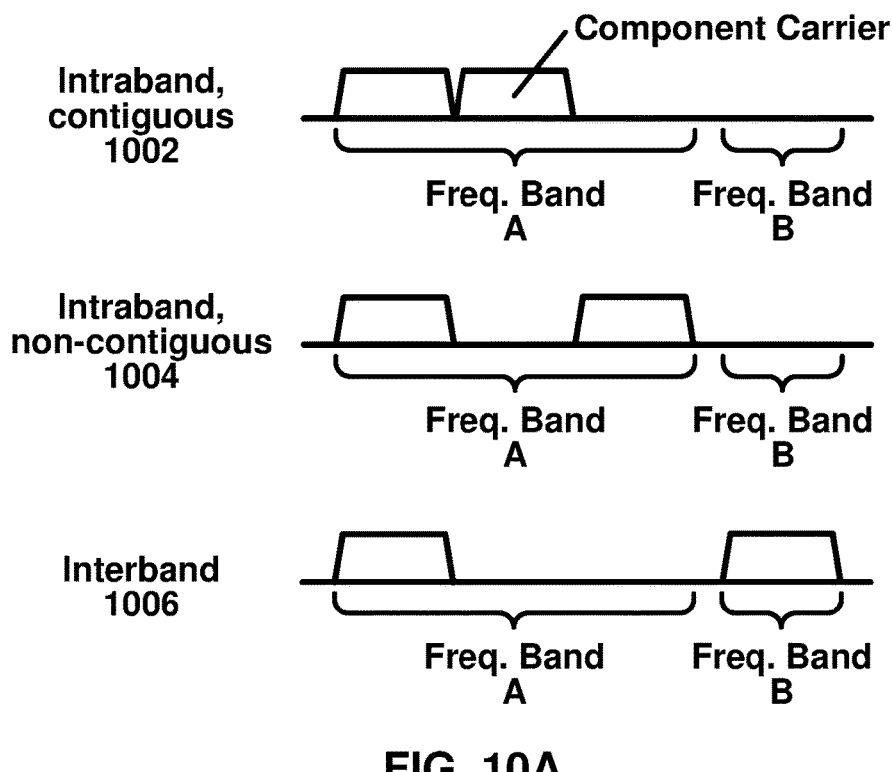
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
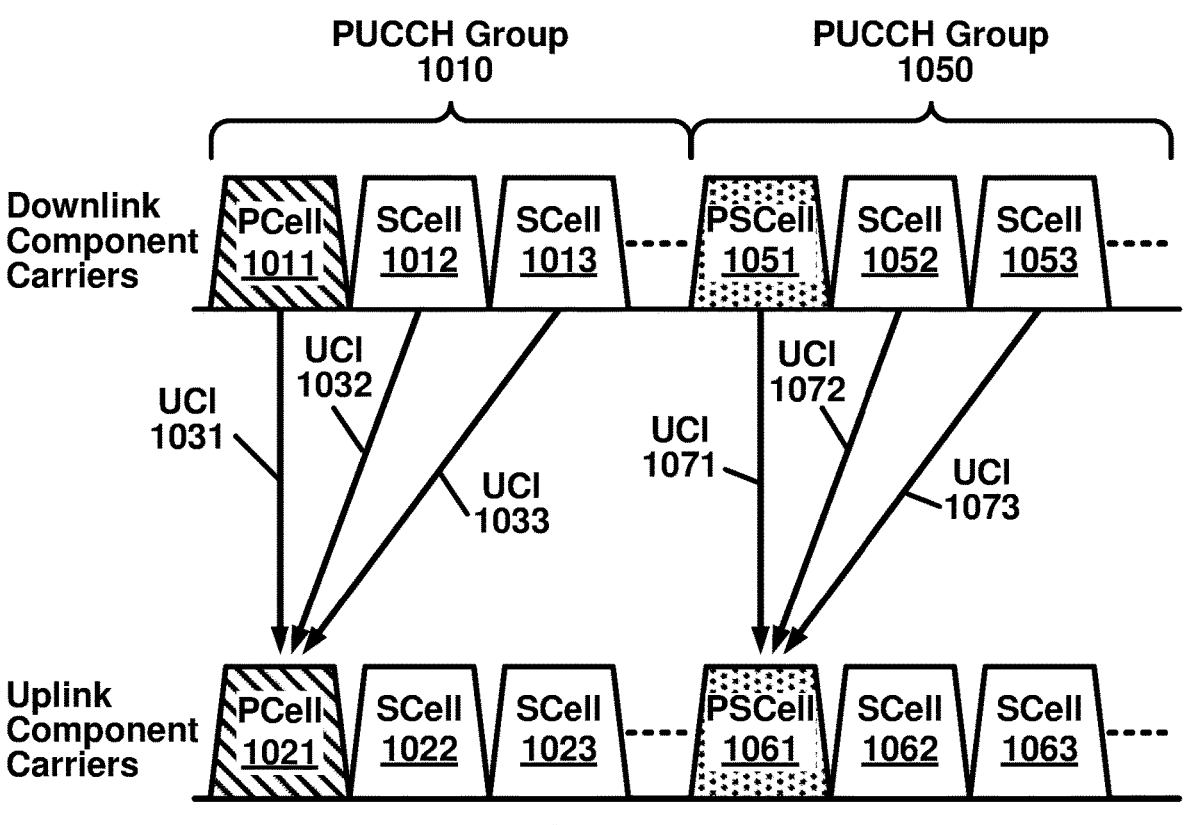
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
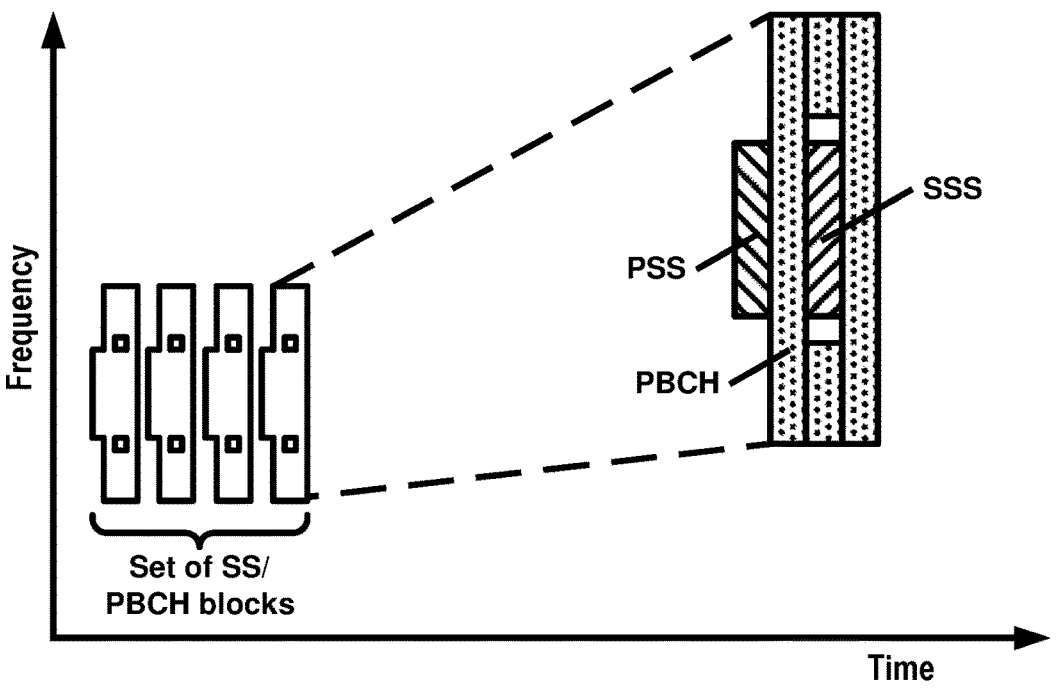
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
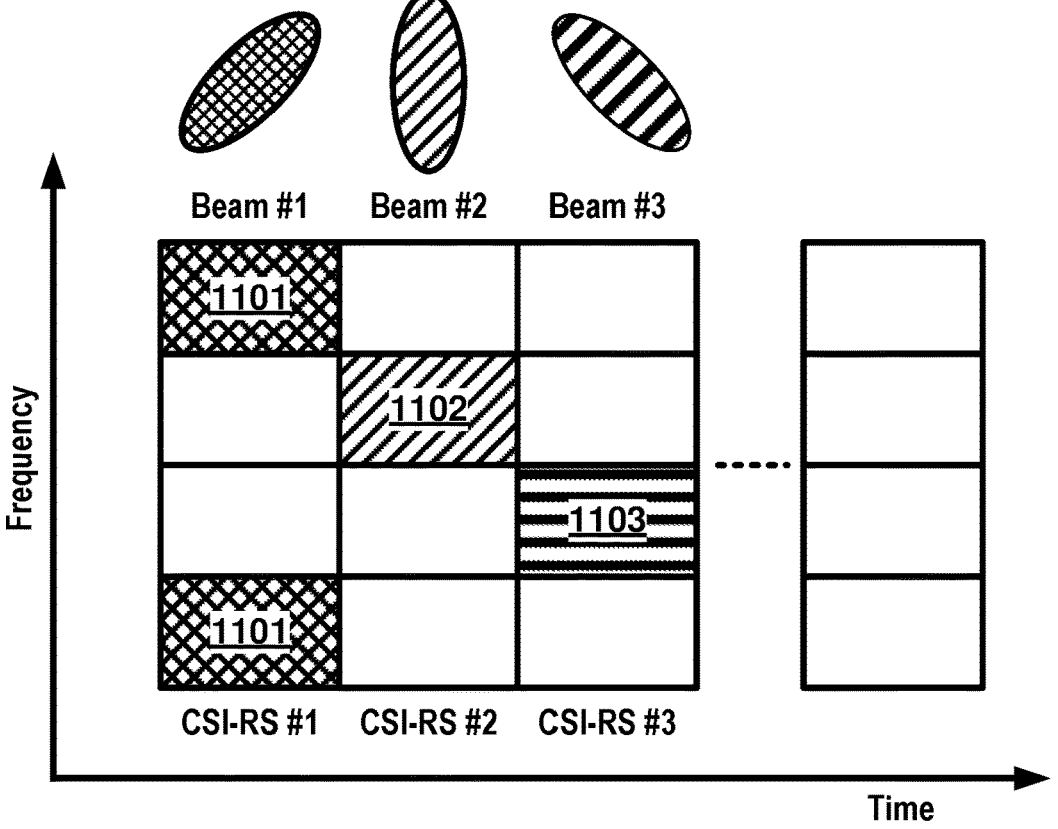
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subfr-ameconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
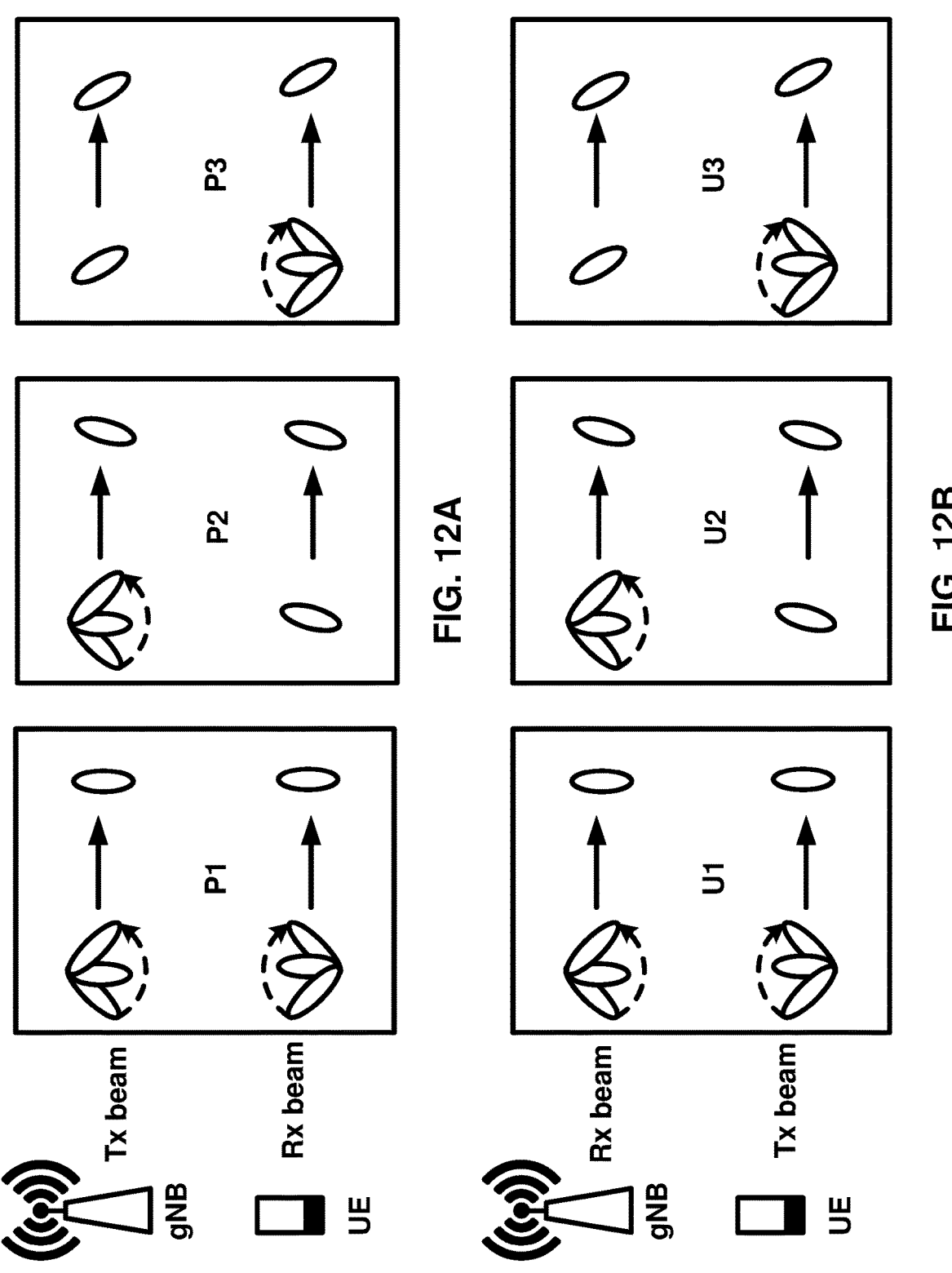
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
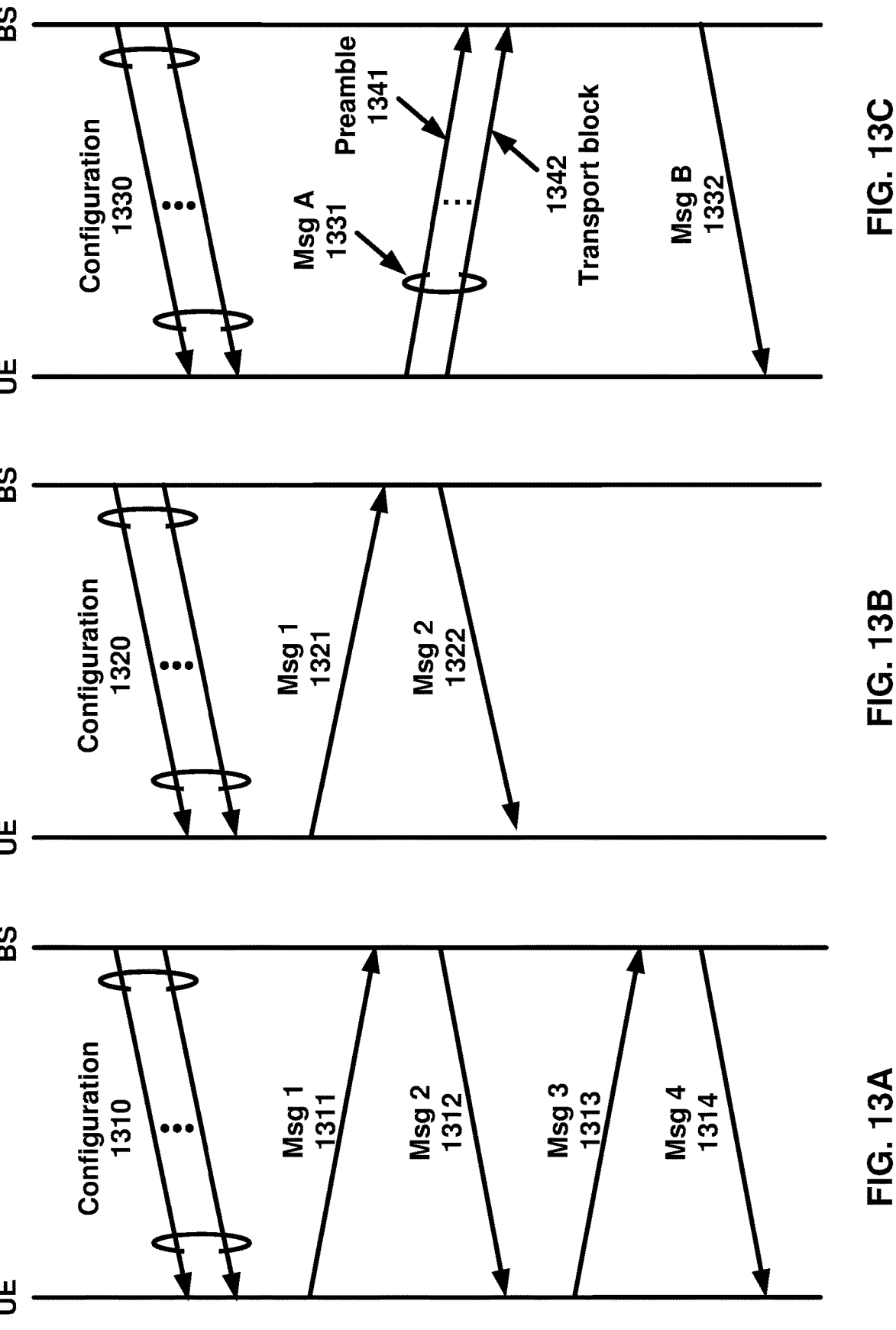
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER-_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows: RA-RNTI=$1+s\_id+14\times t\_id+14\times 80\times f\_id+14\times 80\times 8\times ul\_carrier\_id$, where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 00 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
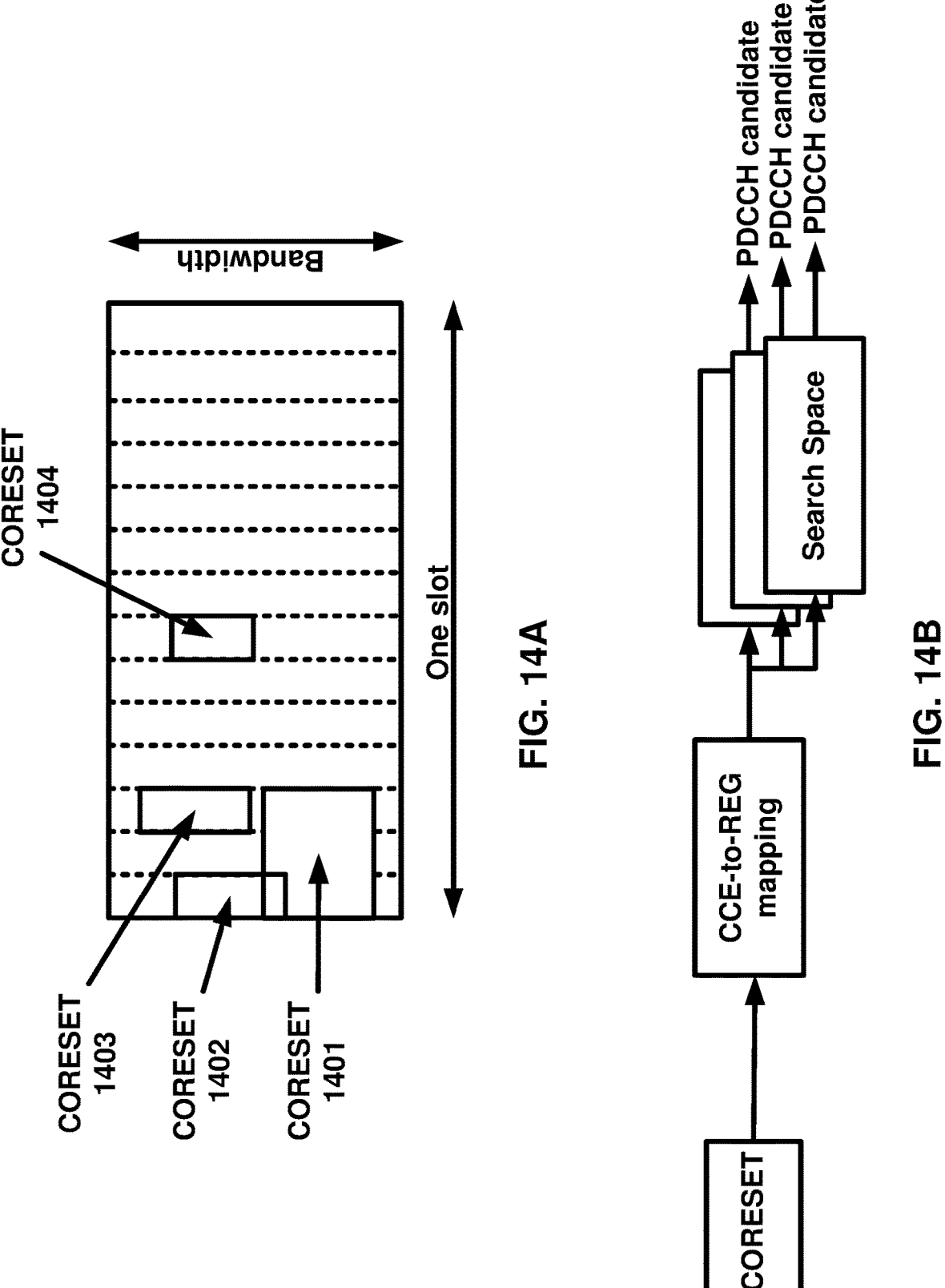
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
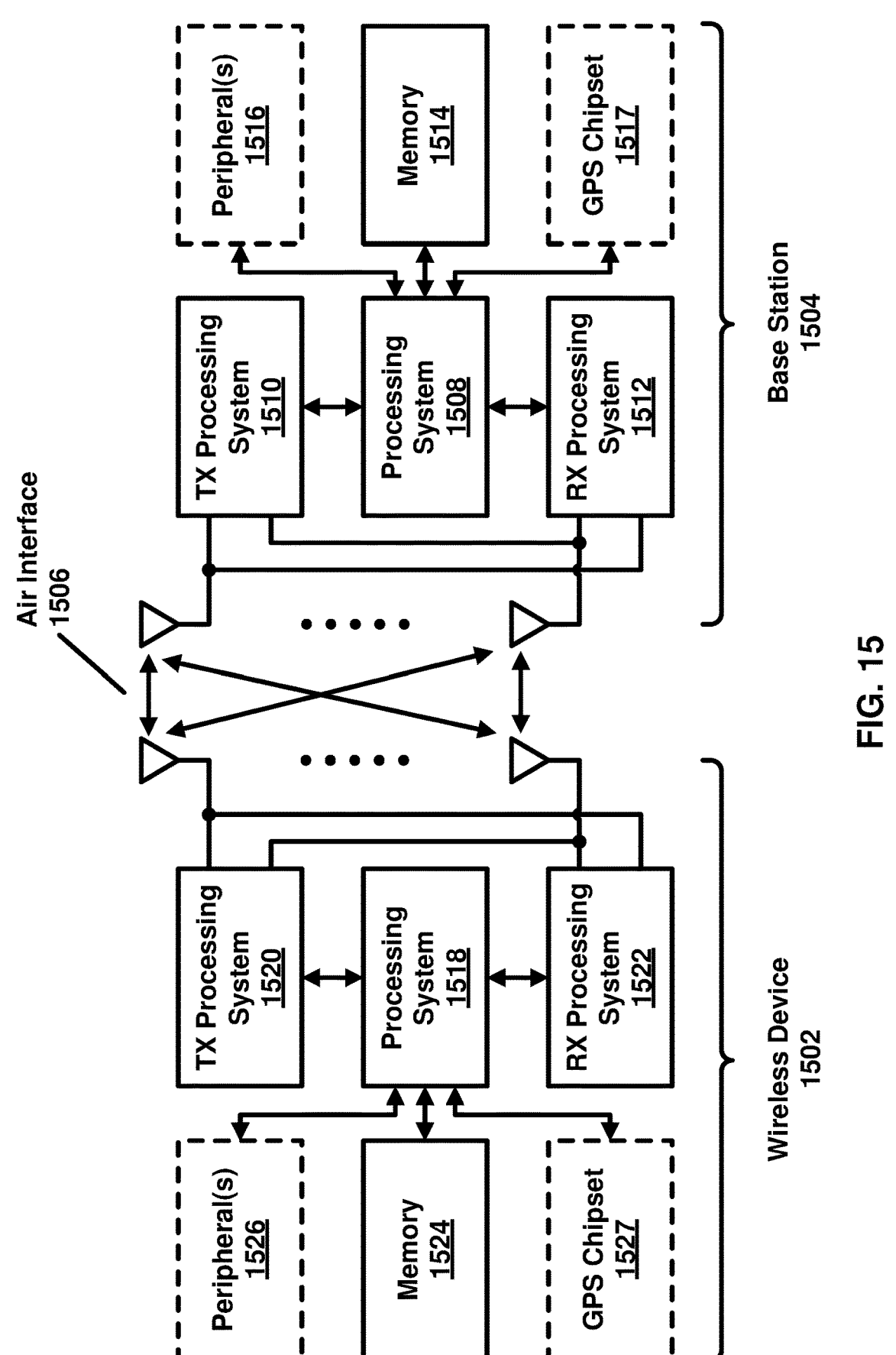
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
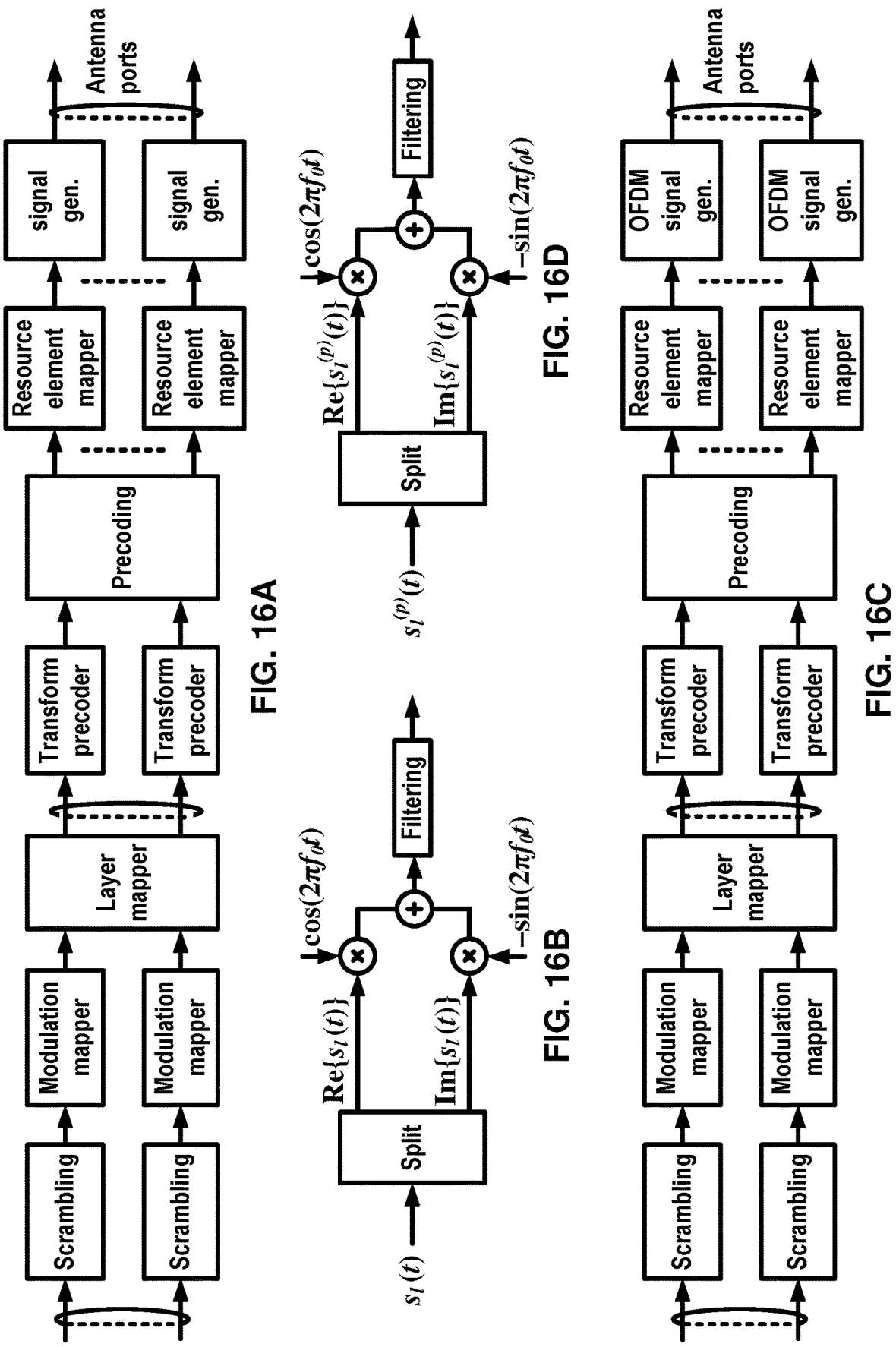
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples, and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples, and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual-connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of the base station to a MAC entity of the wireless device, may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a Long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a Short truncated BSR, and/or a Long truncated BSR. In an example, a MAC CE may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells).

When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. In an example, the serving cell may be a PCell.

In an example, the base station may transmit, to the wireless device, one or more messages (e.g., one or more downlink signals). The one or more messages may comprise one or more RRC messages, e.g., one or more RRC configuration/reconfiguration messages. For example, the one or more RRC messages may comprise one or more configuration parameters (e.g., one or more RRC configuration parameters).

In an example, the one or mor configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate the SCell in response to receiving an SCell Activation/Deactivation MAC CE.

For example, the base station may configure (e.g., via the one or more RRC messages/parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch the DL BWP and the UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP in response to the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or one DL/UL pair) may improve the wireless device battery consumption. One or more BWPs other than the active UL BWP and the active DL BWP, which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s), e.g., number of CCEs, number of PDCCH candidates in CSS set(s), and/or number of PDCCH candidates in the USS(s), and/or possible (or configured) DCI format(s).

In an example, the wireless device may receive the C-RNTI (e.g., via one or more previous transmissions) from the base station. For example, the one or more previous transmissions may comprise a Msg2 1312, Msg4 1314, or a MsgB 1332. If the wireless device is not provided the Type3-PDCCH CSS set or the USS set and if provided the Type1-PDCCH CSS set, the wireless device may monitor the one or more PDCCH candidates for DCI format 0_0 and DCI format 1_0 with CRC scrambled by the C-RNTI in the Type1-PDCCH CSS set.

For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows several DCI formats. For example, the base station may use the DCI formats to transmit downlink control information to the wireless device. In an example, the wireless device may use the DCI formats for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. In an example, DCI format 0_1 may be used to schedule one or multiple PUSCH in one cell or indicate CG-DFI (configured grant-Downlink Feedback Information) for configured grant PUSCH, etc.

In an example, the wireless device may support a baseline processing time/capability. For example, the wireless device may support additional aggressive/faster processing time/capability. In an example, the wireless device may report to the base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance) comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}$ after the end of the last symbol of the PDSCH.

In an example, a PUSCH preparation/processing time may be considered for determining the transmission time of an UL data. For example, if the first uplink symbol in the PUSCH allocation for a transport block (including DM-RS) is no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}$ after the end of the reception of the last symbol of the PDCCH carrying the DCI scheduling the PUSCH.

In an example, the one or more configuration parameters may comprise one or more DRX configuration parameters (e.g., DRX-Config). The one or more DRX configuration parameters may configure the wireless device with DRX operation. In an example, the one or more DRX configuration parameters may indicate monitoring the PDCCH for the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

For example, the wireless device may, based on the DRX operation being configured, use the DRX operation while communicating with the base station in the serving cell. For example, a MAC entity (or the MAC layer) of the wireless device, based on the DRX operation being configured, may control the PDCCH monitoring activity of the MAC entity. When the DRX operation is configured, the wireless device may monitor the PDCCH for at least one RNTI. In an example, the at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

In an example, the one or more DRX configuration parameters may comprise: DRX on duration timer/period/window (e.g., drx-onDurationTimer) indicating a duration at the beginning of a DRX cycle, drx-SlotOffset indicating a delay before starting the DRX on duration timer, DRX inactivity timer/period/window (e.g., drx-InactivityTimer) indicating a duration after a PDCCH occasion in which the PDCCH indicates a new UL or DL transmission for the MAC entity, DRX retransmission timer of DL (e.g., drx-RetransmissionTimerDL), per DL HARQ process except for the broadcast process, indicating a maximum duration until a DL retransmission is received, DRX retransmission timer of UL (e.g., drx-RetransmissionTimerUL), per UL HARQ process, indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycleTimer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before an UL HARQ retransmission grant is expected by the MAC entity.

In an example, the Serving Cells (e.g., the serving cell) of a MAC entity may be configured the one or more DRX configuration parameters in two DRX groups with separate DRX parameters. When a secondary DRX group is not configured, there may be only one DRX group (e.g., a DRX group) and the Serving Cells (e.g., the serving cell) may belong to the DRX group. When the two DRX groups are configured (e.g., the DRX group and a second DRX group), each Serving Cell (e.g., the serving cell) is uniquely assigned (or belong) to either of the DRX group or the second DRX group. The DRX configuration parameters that are separately configured for each DRX group are: the DRX on duration timer (e.g., the drx-onDurationTimer) and/or the DRX inactivity timer (e.g., the drx-InactivityTimer). The one or more DRX configuration parameters that are common to the two DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

For example, when the DRX operation is configured, the wireless device may be in an on duration of the DRX operation (e.g., a DRX on duration) or an off duration of the DRX operation (e.g., a DRX off duration). For example, the DRX on duration may start based on starting the DRX on duration timer/period. For example, when the wireless device is not in the DRX on duration, the wireless device may be in the DRX off duration. For example, the DRX off duration may stop based on starting the DRX on duration timer. For example, the wireless device may switch/transit from the DRX on duration to the DRX off duration based on stopping the DRX on duration timer. For example, the wireless device may switch/transit from the DRX off duration to the DRX on duration based on starting the DRX on duration.

In an example, when the DRX operation is configured, the wireless device may determine whether the wireless device is in an active time (or a DRX active state or Active Time) for the serving cell (or the Serving Cells) in the DRX goup. For example, the wireless device may determine that the active time for the serving cell in the DRX group comprises the DRX on duration.

For example, the wireless device may determine that the active time for the serving cell in the DRX group comprises the time while: the DRX on duration timer (e.g., drx-onDurationTimer) or the DRX inactivity timer (e.g., drx-InactivityTimer) configured for the DRX group is running, or the DRX retransmission timer of DL (e.g., drx-RetransmissionTimerDL) or the DRX retransmission timer of the UL (e.g., drx-RetransmissionTimerUL) is running on any of the Serving Cells (e.g., the serving cell) in the DRX group, or a contention resolution timer (e.g., ra-ContentionResolutionTimer) or a message B (MsgB) response window (e.g., msgB-ResponseWindow) is running, or a scheduling request (SR) is sent/transmitted on PUCCH and is pending, or a PDCCH indicating a new transmission addressed to the C-RNTI not being received after successful reception of a random access response (RAR) for a Random Access Preamble (or a preamble 1311/1321/1341) that is not selected by the MAC entity among the contention-based Random Access Preamble(s).

For example, when the wireless device is outside the active time for the serving cell in the DRX goup, the wireless device may be in a DRX inactive state (or a DRX non-active time or a DRX non-active state). For example, when the wireless device is in the active time for the serving cell in the DRX goup, the wireless device may be in a DRX active state.

For example, the wireless device may evaluate one or more DRX active time conditions (or one or more DRX Active Time conditions) to determine whether the wireless device is in the active time (for the serving cell in the DRX group) or not. For example, based on evaluating the one or more DRX active time conditions, the wireless device may determine that the wireless device is in active time based on the one or more DRX active time conditions being satisfied.

For example, the one or more DRX active time conditions may be satisfied based on the DRX on duration timer (e.g., drx-onDurationTimer) configured for the DRX group is running, or the DRX inactivity timer (e.g., drx-Inactivity Timer) configured for the DRX group is running, or the DRX retransmission timer for DL (e.g., drx-RetransmissionTimerDL), on any of the Serving Cells (including the serving cell) in the DRX group, is running, or the DRX retransmission timer for UL (e.g., drx-RetransmissionTimerUL), on any of the Serving Cells (including the serving cell) in the DRX group, is running, or the contention resolution timer (e.g., ra-ContentionResolutionTimer) is running, or the MsgB response window (e.g., msgB-ResponseWindow) is running, or the PDCCH indicating the new transmission addressed to the C-RNTI (after successful reception of RAR for preamble that is not selected by the MAC entity among the contention-based preamble(s)) has been received, or the SR is sent/transmitted on PUCCH and is pending.

Figure 18:
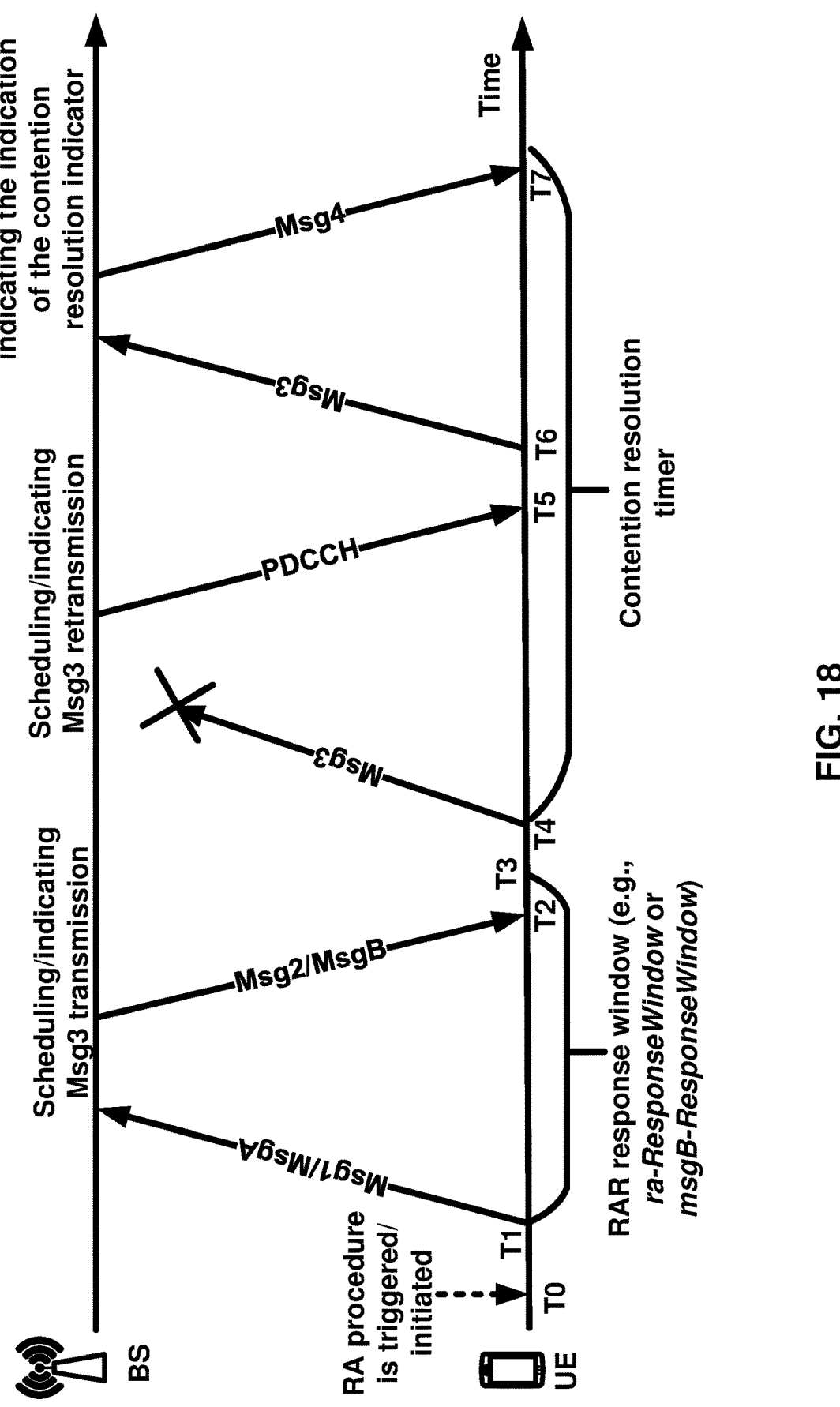
FIG. 18 shows an example of a random access procedure.

FIG. 18 shows an example of a random access procedure. In an example, the one or more configuration parameters may comprise one or more RACH configuration parameters. The one or more RACH configuration parameters may comprise first RACH configuration parameters (e.g., in a RA-ConfigCommon IE) of the RA procedure for a first RA type (e.g., a 4-step RA type) and second RACH configuration parameters (e.g., in a RA-ConfigCommonTwoStepRA-r16 IE) of the RA procedure for a second RA type (e.g., a 2-step RA type). In an example, the one or more RACH configuration parameters may further comprise a third RACH configuration parameters (e.g., MsgA-PUSCH-Config IE) of PUSCH resources for MsgA 1331 transmission for the 2-step RA type.

In an example, the one or more RACH configuration parameters may comprise generic configuration parameters (e.g., in RA CH-ConfigGeneric IE), a total number of preambles for the RA procedure (e.g., preambleTransMax), an indication of association between PRACH occasion/resource (RO) and SSB (e.g., ssb-perRACH-OccasionAndCB-PreamblesPerSSB), one or more configuration parameters (e.g., in GroupB-ConfiguredTwoStepRA) of preamble Group B (e.g., TB size threshold for preamble Group B selection, pathloss/RSRP threshold for preamble Group B selection, number of preambles per SSB available in preamble group B), a first value indicating a contention resolution timer value (e.g., ra-ContentionResolutionTimer) for a contention resolution timer, a first RSRP threshold (e.g., rsrp-ThresholdSSB) for selection of SS block and corresponding RO, a second RSRP threshold (e.g., rsrp-Thresh-oldSSB-SUL) for selection of a SUL or a NUL for the RA procedure, an indication of PRACH root sequence index (e.g., prach-RootSequenceIndex), and one or more other parameters.

According to an example, the one or more RACH configuration parameters (e.g., RACH-ConfigCommon and/or RACH-ConfigGeneric) may comprise, among other parameters, at least one of following: one or more PRACH configuration indexes (e.g., prach-ConfigurationIndex), a number of ROs that may be multiplexed in frequency domain (FDMed) in a time instance (e.g., msg1-FDM), an offset of a lowest RO in frequency domain with respect to a first resource block (e.g., msg1-FrequencyStart), a power ramping step for preamble transmission (e.g., powerRamp-ingStep), a target power level at the network receiver side (preambleReceivedTargetPower), a maximum number of random access preamble transmission that may be performed (e.g., preambleTransMax), a second value indicating a window length for a random access response window (e.g., ra-ResponseWindow), and a third value indicating a window length for a MsgB response window (e.g., msgB-ResponseWindow).

In an example, the one or more PRACH configuration parameters (e.g., prach-ConfigurationIndex), may indicate/configure, among other things, a preamble format, a periodicity for one or more PRACH time resources, one or more PRACH subframe numbers, a number of PRACH slots within the one or more PRACH subframes, a PRACH starting symbol number, and a number of time domain ROs within first PRACH slot. A preamble may be transmitted using a selected RO (e.g., PRACH format with a PRACH transmission power on an indicated PRACH resource).

For example, the selected RO may need to be valid. In an example, a time gap between the selected RO and an uplink occasion/resource may be considered to ensure the validity of the selected RO. For example, for single cell operation or for operation with carrier aggregation in a same frequency band, the wireless device may not transmit the preamble and PUSCH/PUCCH/SRS in a same slot or when a gap between the first or last symbol of the preamble in a first slot is separated by less than M_gap symbols from the last or first symbol, respectively, of a PUSCH/PUCCH/SRS transmission in a second slot. For numerologies of p=1 and p=2, the value of M_gap may be 2. For numerologies of p=3 and p=4, the value of M_gap may be 4.

For example, the one or more RACH configuration parameters may comprise a dedicated RACH configuration message (e.g., RACH-ConfigDedicated). The dedicated RACH configuration message may comprise, among other parameters, one or more ROs for contention-free random access (e.g., occasions), and one or more PRACH mask index for random access resource selection (e.g., ra-ssb-OccasionMaskIndex).

As shown in FIG. 18, the wireless device may trigger the RA procedure at time TO. For example, The wireless device may trigger the RA procedure in response to: initial access to a cell (e.g., the serving cell); a positioning procedure; an uplink coverage recovery procedure; initiating a beam failure recovery; receiving from the base station a RRC reconfiguration message for a handover to a second/target cell; receiving from the base station a PDCCH order; re-synchronizing when new data arrives and the wireless device status is out-of-sync; new data arrives at the buffer of the wireless device when there is no scheduling request (SR) resources (e.g., PUCCH) for transmitting the SR are configured; and/or pending data exists in the buffer of the wireless device and the wireless device has reached a maximum allowable times for (re)transmitting an SR (e.g., SR failure). In an example, the higher layers (e.g., the MAC layer and/or the RRC layer) of the wireless device may trigger the RA procedure.

In an example, there may only be one RA procedure ongoing at any point in time in a MAC entity of the wireless device. For example, based on determining that the RA procedure is ongoing, if a new RA procedure is triggered, it may be up to the wireless device implementation whether to continue with the ongoing RA procedure or initiate with the new RA procedure. For example, the wireless device may trigger the RA procedure based on the PDCCH order indicating a first Random Access Preamble (RAP), a first PRACH mask index and a first uplink carrier. If, during the ongoing RA procedure, the wireless device receives a second PDCCH order indicating the first RAP, the first PRACH mask index and the first uplink carrier, the wireless device may not trigger a new RA procedure. For example, the wireless device may ignore the second PDCCH order.

In response to triggering the RA procedure, the wireless device may initialize/initiate the RA procedure (time TO in FIG. 18). For example, the wireless device may employ/use/maintain one or more parameters/variables for the initiated RA procedure. For example, the one or more parameters/variables may comprise at least one of: RA_TYPE; PREAMBLE_INDEX; PREAMBLE_TRANSMISSION COUNTER; PREAMBLE_POWER_RAMPING_COUNTER; PREAMBLE_POWER_RAMPING_STEP; PREAMBLE_RECEIVED_TARGET_POWER; PRE-AMBLE_BACKOFF; PCMAX; SCALING_FACTOR_BI; POWER_OFFSET_2STEP_RA; MSGA_PREAMBLE_POWER_RAMPING_STEP; and TEMPORARY_C-RNTI (or TC-RNTI).

The initializing/initiating the RA procedure may comprise at least one of: determining a carrier (SUL or NUL) for performing the RA procedure based on a measured RSRP, determining a two-step (or 2-step or 2-stage) RA type or a four-step (4-step or 4-stage) RA type (e.g., selecting RA type) for performing the RA procedure, and initializing one or more RA parameters (variables) specific to the selected RA type. For example, based on the (measured) RSRP being greater than an RSRP threshold, the wireless device may select 2-step RA type (e.g., RA_TYPE=2-stepRA). Otherwise, the wireless device may select 4-step RA type (e.g., RA_TYPE=4-stepRA). In an example, when the RA procedure is triggered for system information (SI) acquisition, the wireless device may select the 4-step RA type for performing the RA procedure.

For example, based on the selected RA type being the 4-stepRA, the wireless device may initialize/initiate the four-step RA procedure, initialize the one or more RA variables/parameters specific to the four-step RA type, and/or may select RA resources for performing the four-step RA procedure. In an example, based on determining that the selected RA type is a 4-step RA procedure (i.e., RA_TYPE=4-stepRA), the one or more RA parameters specific to 4-step RA procedure may comprise at least the following: PREAMBLE_POWER_RAMPING_STEP, pre-ambleTransMax, and SCALING_FACTOR_BI.

For example, based on the selected RA type being the 2-stepRA, the wireless device may initialize/initiate the two-step RA procedure, initialize the one or more RA variables/parameters specific to the two-step RA type, and/or or may select the RA resources for performing the tow-step RA procedure. For example, based on determining that the selected RA type is a 2-step RA procedure, the one or more RA parameters specific to 2-step RA procedure may comprise at least the following: PREAMBLE_POWER_RAMPING_STEP, msgA-TransMax, preamble TransMax, and SCALING_FACTOR_BI.

In an example, if RA_TYPE is switched from 2-stepRA to 4-stepRA during the ongoing RA procedure, the wireless device may set POWER_OFFSET_2STEP_RA based on at least one or more configured parameters and/or may initialize the RA variables specific to the 4-step RA type.

Once the RA procedure is initiated, the wireless device may perform RA procedure using the (selected) RA resources with the selected RA carrier and RA type. For example, performing the RA procedure, based on determining that the RA procedure is the 4-step RA procedure, may comprise at least one or more of the following: selecting the RA resources and transmitting one or more preambles (e.g., corresponding to one or more ROs), and/or monitoring PDCCH (e.g., monitoring one or more PDCCH candidates) for receiving a random access responses (RARs) 1312, and/or one or more retransmissions of the one or more preambles, and/or transmission of Msg3 1313, and/or contention resolution procedure. For example, the contention resolution procedure may comprise retransmitting the Msg3 1313 one or more times, monitoring the one or more PDCCH candidates for receiving a Msg4 1314, and/or determining whether the contention resolution is successful or not.

In an example, performing the RA procedure, based on determining that the RA procedure is the 2-step RA procedure, may comprise at least one or more of the following: selecting the RA resources and transmitting one or more MsgA preambles 1341 via one or more ROs and/or transmitting one or more MsgA payloads 1342 via one or more MsgA PUSCH occasions (POs), and/or monitoring the one or more PDCCH candidates for receiving a MsgB 1332, and/or one or more retransmissions of the one or more MsgA preambles and/or MsgA payloads, and/or switching to the 4-step RA procedure, and/or performing fallback procedure (e.g., transmitting Msg3 1331 in response to receiving a MsgB 1332 comprising a fallbackRAR MAC subPDU). For example, performing the 2-step RA procedure may comprise the contention resolution procedure.

In an example, for performing the RA procedure, the wireless device may select the RA resources. The RA resources may comprise a preamble, an RO (or resources comprising time, frequency, and/or code) for preamble transmission, and/or one or more MsgA POs for MsgA PUSCH/payload transmission. For example, the wireless device may determine a valid RO (e.g., the next available RO) corresponding to a first SSB or a first CSI-RS. For example, the wireless device may select the valid RO randomly with equal probability amongst one or more ROs. For example, the wireless device may determine the valid RO based on the possible occurrence of measurement gaps.

For example, for performing the RA procedure (e.g., the two-step RA procedure or the four-step RA procedure), the wireless device may select a SSB indicated by the PDCCH order or may select the SSB based on a threshold (e.g., rsrp-ThresholdSSB). In an example, the wireless device may select the SSB randomly.

For example, based on the type of the RA procedure being 4-stepRA, the wireless device may select a first Random Access Preamble (RAP) group (e.g., preamble Group A or preamble Group B) based on a potential Msg3 size (e.g., uplink data available for transmission plus one or more MAC subheaders). For example, the potential Msg3 size may be larger than the TB size threshold for the preamble Group B. For example, based on the type of the RA procedure being 2-stepRA, the wireless device may select a second Random Access Preamble (RAP) group (e.g., group A or group B) based on a potential MsgA size (e.g., UL data available for transmission plus MAC subheader and, where required, MAC CEs). For example, the potential MsgA size may be larger than the TB size threshold for the preamble Group B.

For example, the wireless device may randomly select a preamble (from the first RAP group or the second RAP group), set PREAMBLE_INDEX based on the preamble (e.g., the index of the preamble), select a valid RO corresponding to the preamble, and/or calculate RA-RNTI corresponding to the valid RO (if the type of the RA procedure is 4-stepRA) or calculate MSGB-RNTI corresponding to the valid RO (if the type of the RA procedure is 2-stepRA). In an example, the wireless device may set the PREAMBLE_INDEX based on the PDCCH order. For example, the preamble may be a contention-free (CF) preamble, e.g., the preamble is selected by the higher layers (e.g., the MAC layer) of the wireless device among the contention-based (CB) Random Access Preamble(s). For example, the preamble may be a CF preamble based on being indicated by the PDCCH order. For example, the preamble may be a CF preamble for beam failure recovery.

For example, when the type of the RA procedure is 2-stepRA, the wireless device may select the preamble from a 2-step RA type Random Access Preamble(s) associated with the SSB and the second RAP group. In an example, when the type of the RA procedure is 2-stepRA, the MAC entity may select the valid RO randomly with equal probability among the consecutive ROs allocated for the 2-step RA type. In an example, when the type of the RA procedure is 4-stepRA, the MAC entity may select the valid RO randomly with equal probability among the consecutive ROs.

In an example, when the type of the RA procedure is 2-stepRA and the preamble is not selected by the MAC entity among the contention-based Random Access Preamble(s), the wireless device may, according to msgA-PUSCH-resource-Index corresponding to the SSB, select a PUSCH occasion from the PUSCH occasions configured in msgA-CFRA-PUSCH corresponding to a PRACH slot of the valid RO. The wireless device may determine an UL grant and the associated HARQ information (e.g., New Data Indicator (NDI), Transport Block size (TBS), Redundancy Version (RV), and HARQ process ID) for a MsgA payload in the PUSCH occasion. For example, the wireless device may deliver the UL grant and the associated HARQ information to the HARQ entity.

In an example, when the type of the RA procedure is 2-stepRA and the preamble is selected by the MAC entity among the contention-based Random Access Preamble(s), the wireless device may select the PUSCH occasion corresponding to the preamble and the valid RO. For example, the wireless device may determine the UL grant for the MsgA payload according to the PUSCH configuration associated with the second RAP group and determine the associated HARQ information. In an example, based on the preamble and valid RO is mapped to a valid PUSCH occasion, the wireless device may deliver the UL grant and the associated HARQ information to the HARQ entity.

In an example, lower layers (e.g., the physical layer) of the wireless device may receive from higher layers (e.g., the MAC layer), among other information, one or more SS/PBCH block indexes (e.g., the SSB) and/or one or more configuration parameters of one or more PRACH preamble (e.g., the preamble) transmission parameters. In an example, the one or more preamble transmission parameters may indicate preamble format, preamble index (e.g., the PREAMBLE_INDEX), the RA-RNTI and/or the MSGB-RNTI, time and/or frequency resources for preamble transmission, and/or parameters for determining one or more sequences and their shifts in the preamble sequence set (e.g., set type).

In an example, when the type of the RA procedure is 4-stepRA, the higher layers (e.g., the MAC layer) of the wireless device may instruct the physical layer to transmit the preamble (e.g., a Msg1 1311/1321) using the one or more preamble transmission parameters, e.g., the valid RO, the RA-RNTI, the PREAMBLE_INDEX, and PREAMBLE_RECEIVED_TARGET_POWER. As shown in FIG. 18, the wireless device may transmit the preamble (e.g., the Msg1) at time T1.

In an example, when the type of the RA procedure is 2-stepRA, the wireless device may set the PREAMBLE_RECEIVED_TARGET_POWER based on at least a msgA-PreambleReceivedTargetPower and/or a preamble power ramping counter (e.g., PREAMBLE_POWER_RAMPING_COUNTER). For example, for the first transmission of a MsgA 1331 (comprising the preamble 1341 and the MsgA payload 1342), the wireless device may indicate to the Multiplexing and assembly entity to include a C-RNTI MAC CE in a MAC PDU of the MsgA payload if the transmission of the MsgA is not for the CCCH logical channel. For example, the wireless device may indicate to the Multiplexing and assembly entity to include a BFR MAC CE or a Truncated BFR MAC CE in the MAC PDU of the MsgA payload if the RA procedure is initiated for SpCell beam failure recovery and spCell-BFR-CBRA with value true is configured. For example, the wireless device may obtain the MAC PDU of the MsgA payload to transmit from the Multiplexing and assembly entity according to the HARQ information determined for the MSGA payload. The wireless device may store the MAC PDU of the MsgA payload in a MsgA buffer. In an example, the wireless device may instruct the physical layer to transmit the MsgA using the valid RO and the associated PUSCH resource of MsgA if the preamble and the valid RO is mapped to a valid PUSCH occasion. For example, the wireless device may transmit only the preamble based on the preamble and the valid RO not being mapped to a valid PUSCH occasion. The physical layer of the wireless device may use the MSGB-RNTI, PREAMBLE_INDEX, PREAMBLE_RECEIVED_TARGET_POWER, msgA-PreambleReceivedTargetPower, and the amount of power ramping applied to the latest MsgA preamble transmission (i.e. (PREAMBLE_POWER_RAMPING_COUNTER−1)× PREAMBLE_POWER_RAMPING_STEP) to transmit the MsgA. As shown in FIG. 18, the wireless device may transmit the MsgA at time T1.

As shown in FIG. 18, the wireless device may start a RAR window (e.g., the ra-ResponseWindow or the msgB-ResponseWindow) at a first downlink control channel occasion from an end of the preamble transmission (for the case of the 4-step RA procedure) or from an end of the MsgA transmission (for the case of the 2-step RA procedure). The wireless device may, while the RAR window is running, monitor PDCCH (e.g., the one or more PDCCH candidates) for the RAR identified by the RA-RNTI (for the 4-step RA procedure) or the MSGB-RNTI (for the 2-step RA procedure), a temporary cell-radio network temporary identifier (TC-RNTI), and/or the C-RNTI. In an example, the one or more PDCCH candidates may be monitored based on (or using) a Type1-PDCCH common search space (CSS) set (e.g., configured by ra-searchSpace in PDCCH-ConfigCommon), a Type3-PDCCH CSS set (e.g., configured by configured by SearchSpace in PDCCH-Config with searchSpaceType=common), and/or a USS set (e.g., configured by configured by SearchSpace in PDCCH-Config with searchSpaceType=ue-Specific).

According to an example, the RAR window may start at a symbol of a first control resource set (CORESET). According to an example, the symbol duration may correspond to the numerology for the Type1-PDCCH CSS. For example, the symbol may be the first symbol of the earliest/initial CORESET the wireless device is configured to receive PDCCH for the Type 1-PDCCH CSS set. In another example, the symbol may be at least one symbol after the last/ending symbol of the valid RO corresponding to the preamble transmission for the 4-step RA procedure.

For example, the symbol may be at least one symbol after the last symbol of the MsgA PUSCH occasion corresponding to the MsgA payload transmission for the 2-step RA procedure. In another example, the symbol may be at least one symbol after the last symbol of the valid RO corresponding to the preamble transmission for the 2-step RA procedure. In another example, based on determining that the MsgA PUSCH occasion that is mapped to the valid RO (and/or the preamble of the MsgA) is invalid, the symbol may be determined, by the wireless device, at least one symbol after the last symbol of the valid RO. In another example, based on determining that the MsgA PUSCH occasion is valid, the symbol may be determined, by the wireless device, at least one symbol after the last symbol of the MsgA PUSCH occasion.

For example, based on the preamble being a contention-free preamble for beam failure recovery request, the length of the RAR window may be determined from a fourth value (e.g., ra-ResponseWindow configured in BeamFailureRecoveryConfig). For example, based on the preamble not being the contention-free preamble for beam failure recovery request, the length of the RAR window may be determined from the second value (e.g., ra-ResponseWindow configured in RA CH-Config Common). In an example, within/during the RA window and based on the preamble being the contention-free preamble for beam failure recovery, the wireless device may monitor the one or more PDCCH candidates for a first PDCCH addressed to/identified by the C-RNTI. For example, the wireless device may monitor the one or more PDCCH candidates for the first PDCCH transmission on the search space indicated by recoverySearchSpaceId of the SpCell. Based on the first PDCCH received, the wireless device may consider the RA procedure successfully completed. As shown in FIG. 18, when the RA type is 4-stepRA, the wireless device may receive a Msg2 1312/1322 at time T2 in response to transmitting the preamble.

In an example, the preamble may not be the CF preamble for beam failure recovery (e.g., the preamble may be a CB preamble selected by the MAC layer of the wireless device among the CB Random Access Preamble(s)). During/within the RAR window (e.g., the ra-ResponseWindow) and based on the preamble not being the CF preamble for beam failure recovery, the wireless device may monitor the one or more PDCCH candidates for a second PDCCH transmission addressed to (or identified by) the RA-RNTI. The second PDCCH may indicate a downlink assignment (e.g., a RAR message or a RAR) based on which the wireless device may receive a transport block (TB) comprising a MAC PDU.

In an example, the MAC PDU may comprise one or more MAC subPDUs and/or optionally padding. In an example, a MAC subPDU may comprise at least one of following: a MAC subheader with Backoff Indicator (BI) only; a MAC subheader with Random Access Preamble identifier (RAPID) only (e.g., acknowledgment for an SI request); a MAC subheader with the RAPID and a MAC RAR. For example, the MAC PDU may comprise one or more MAC RARs. In an example, the MAC RAR may be fixed size and may comprise at least one of the following fields: an R field that may indicate a Reserved bit; a Timing Advance Command (TAC) MAC CE field that may indicate an index value indicating the amount of timing advance (TA) adjustment; an UL grant (or an UL grant field); and an RNTI field (e.g., the TC-RNTI and/or the C-RNTI) that may indicate an identity that is employed during the RA procedure.

For example, the preamble may be a CF preamble, e.g., the preamble is not selected by the MAC entity among the contention-based Random Access Preamble(s). For example, the preamble may be indicated by the PDCCH order. Based on receiving the TAC MAC CE in the RAR message (e.g., the MAC RAR comprising the TAC MAC CE), the wireless device may apply the TAC MAC CE and start/restart the time alignment timer (e.g., timeAlignment-Timer). For example, the time alignment timer may be associated with a TA group (TAG), the TAG that the serivng cell belongs to.

For example, the preamble may be selected by the MAC layer among the contention-based Random Access Preamble(s). In an example, the preamble may not be indicated by the PDCCH order. Based on determining the time alignment timer not being running when the RAR message is received, the wireless device may apply the TAC MAC CE. For example, the wireless device may start the time alignment timer.

In an example, based on determining the time alignment timer be running when the wireless device receives the RAR message, the wireless device may ignore the TAC MAC CE.

For example, the UL grant may indicate one or more resources to be employed on the uplink. For example, the UL grant may indicate at least one of following: time and frequency resource allocation of a PDSCH carrying the one or more TBs, a size of the PDSCH, MCS, etc. For example, the UL grant may indicate the one or more resources for transmitting a Msg3 1313. For example, the UL grant may indicate the one or more resources to be employed for transmitting on the uplink in response to determining the RAR is received successfully. For example, the UL grant may indicate the one or more resources to be employed for transmitting on the uplink in response to determining the RAR is received successfully and the preamble is a CF preamble. For example, the UL grant may indicate the one or more resources to be employed for transmitting on the uplink in response to determining the RAR is received successfully and the preamble is not selected by the MAC layer of the wireless device among the CB Random Access Preamble(s).

For example, if the MAC PDU comprises a MAC sub-PDU with the BI, the wireless device may set the PRE-AMBLE_BACKOFF to value of the BI field of the MAC subPDU. In an example, if the MAC PDU does no comprise the MAC subPDU with the BI, the wireless device may set the PREAMBLE_BACKOFF to 0 ms.

In an example, the MAC PDU may comprise the MAC subPDU with the RAPID. For example, based on the RAPID matching/corresponding to the preamble (or the transmitted PREAMBLE_INDEX), the wireless device may determine/consider that the RAR (or the RAR message) is received successful (e.g., consider/determine the RAR reception is successful). As shown in FIG. 18, the wireless device may stop the RAR window (e.g., the ra-ResponseWindow) after (or in response to) the successful reception of the RAR comprising the RAPID that matches the preamble (or the transmitted PREAMBLE_INDEX). For example, based on the RAPID matching/corresponding to the preamble and the MAC subPDU comprising the RAPID only (e.g., the RA procedure being triggered for a system information (SI) request), the wireless device may consider the RA procedure being successfully completed.

I an example shown in FIG. 18, the MAC PDU may comprise at least the MAC subPDU with the RAPID corresponding to the preamble (e.g., the MAC PDU comprises a MAC subPDU with RAPID and the MAC RAR). Based on the MAC RAR, the MAC layer of the wireless device may perform at least one of the following: applying the TAC MAC CE, indicating the preambleReceivedTargetPower and the amount of power ramping applied to the preamble transmission to lower layers (e.g., the physical layer) of the wireless device, and/or processing the UL grant value and indicating it to the lower layers (e.g., the physical layers) of the wireless device. For example, if the preamble is the CF preamble (e.g., the preamble is not selected by the MAC entity among the contention-based Random Access Pre-amble(s), the wireless device may consider the RA proce-dure being successfully completed.

In an example, based on the preamble being selected by the MAC entity among the contention-based Random Access Preamble(s) (e.g., the preamble is not selected based on the PDCCH order and/or the preamble is not a CF preamble), the wireless device may perform one of more of the following: setting the TC-RNTI (or the TEMPO-RARY_C-RNTI) to a value received in the MAC RAR, indicating to the Multiplexing and assembly entity to include a C-RNTI MAC CE in a MAC PDU of a Msg3 (e.g., if the transmission is not being made for the CCCH logical channel), indicating to the Multiplexing and assembly entity to include a BFR MAC CE or a Truncated BFR MAC CE in the MAC PDU of the Msg3 (e.g., if the RA procedure is initiated for SpCell beam failure recovery and spCell-BFR-CBRA with value true is configured), and/or obtaining the MAC PDU of the Msg3 to transmit from the Multiplexing and assembly entity and store it in a Msg3 buffer. As shown in FIG. 18, the wireless device may, based on the UL grant (e.g., the UL grant indicated in the MAC RAR), transmit the Msg3 at time T4.

In an example, the wireless device may determine that the RAR reception not being successful, e.g., based on deter-mining that the MAC PDU comprising one or more RAP-IDs, matching the transmitted PREAMBLE_INDEX, is not received until the expiry of the RAR window (e.g., the ra-ResponseWindow). In an example, in response to and/or after determining that the RAR reception not being success-ful, the wireless device may perform one or more retrans-missions of one or more preambles during the RA procedure.

As shown in FIG. 18, during the RAR window (e.g., the msgB-ResponseWindow) the wireless device may receive a MsgB 1332. For example, when the RA type is 2-stepRA, in response to transmitting the MsgA the wireless device may receive the MsgB. For example, during the msgB-Respon-seWindow is running, the wireless device may monitor the one or more PDCCH candidates of the SpCell for a RAR (or a RAR message) identified by the MSGB-RNTI. For example, for the two-step RA procedure, the RAR may comprise at least one of following: a wireless device con-tention resolution identity, an RV ID for retransmission of one or more TBs, decoding success or failure indicator of one or more TB transmission. For example, based on the C-RNTI MAC CE being included in the MsgA, the wireless device may monitor the one or more PDCCH candidates of the SpCell for the RAR identified by the C-RNTI while the msgB-ResponseWindow is running. For example, the MsgB may comprise a MAC subPDU with the BI. Based on receiving the MAC subPDU with the BI, the wireless device may set the PREAMBLE_BACKOFF to value of the BI field of the MAC subPDU multiplied with SCALING_FAC-TOR_BI.

For the two-step RA procedure, the wireless device may fall back to a four-step RA procedure based on an explicit and/or implicit indication of the MsgB. The wireless device may transmit the Msg3, e.g., after or in response to receiving the fallback message (e.g., a fallback RAR or a fallbackRAR MAC subPDU) via resource(s) indicated by an UL grant in the MsgB. In this case the wireless device may follow the four-step RA procedure, e.g., starting the contention reso-lution timer, and/or determining whether the contention resolution being successful or not being successful. For example, upon or in response to receiving the fallback RAR, the wireless device may stop the msgB-ResponseWindow once the RAR reception is considered as successful (e.g., at time T3 in FIG. 18).

For example, the fallback RAR may comprise the MAC subPDU indicating the RAPID matching the preamble. In response to receiving the MAC subPDU indicating the RAPID matching the preamble, the wireless device may consider the RAR reception successful, apply the following actions for the SpCell, process the TAC MAC CE, indicate the msgA-PreambleReceivedTargetPower and the amount of power ramping applied to the preamble transmission to the lower layers (e.g., the physical layer) of the wireless device. Based on the preamble being a CF preamble (e.g., indicated by the PDCCH order), the wireless device may consider the RA procedure successfully completed and process an UL grant value indicated by the fallback RAR.

For example, the wireless device may indicate the UL grant the lower layers (e.g., the physical layer) of the wireless device. For example, based on the preamble not being a CF preamble (e.g., the preamble being selected by the MAC layer among the CB preambles), the wireless device may set the TC-RNTI to a value indicated by the RAR message (e.g., the fallback RAR) and process an UL grant value received by the fallback RAR. For example, the UL grant may schedule/indicate a transmission of the Msg3. In an example, based on the Msg3 buffer being empty, the wireless device may obtain a MAC PDU from the MSGA buffer and store it in the Msg3 buffer for transmission of the Msg3. The MAC layer of the wireless device may indicate the transmission of the Msg3 to the physical layer of the wireless device. As FIG. 18 shown, based on the UL grant indicated by the fallback RAR, the wireless device may transmit the Msg3 at time T4.

In an example, the wireless device may determine to retransmit the MsgA, e.g., in response to not receiving the MsgB comprising the contention resolution identifier, which the wireless device may include in the MsgA payload, until the expiry of the msgB-ResponseWindow.

As shown in FIG. 18, the wireless device may, based on the Msg3 being transmitted, start the contention resolution timer (e.g., the ra-ContentionResolutionTimer). For example, the value range of the contention resolution timer may be based on the first value configured/indicated by the one or more RACH configuration parameters. The wireless device may monitor the one or more PDCCH candidates while the ra-ContentionResolutionTimer is running regard-less of the possible occurrence of a measurement gap. For example, the wireless device may monitor the one or more PDCCH candidates for at least the C-RNTI and the TC-RNTI.

As shown in FIG. 18, the wireless device at time T6 may receive a third PDCCH transmission indicating/scheduling the Msg3 (re)transmission. For example, the base station may not receive the Msg3 transmitted at time T4. Based on not receiving the Msg3 (e.g., not being able to decode the Msg3 successfully), the base station may schedule/indicate the retransmission of the Msg3. In an example, the wireless device may, based on receiving the third PDCCH addressed to the TC-RNTI, consider an NDI is toggled (e.g., the third PDCCH indicating/scheduling the retransmission of the Msg3). For example, the wireless device may restart the ra-ContentionResolutionTimer at each HARQ retransmis-sion in the first symbol after the end of the Msg3 (re) transmission. For example, based on retransmitting the Msg3 at time T7, the wireless device may restart the contention resolution timer.

In an example, during/while the contention resolution timer is running, the wireless device may receive the Msg4. For example, during the contention resolution timer the wireless device may receive a fourth PDCCH transmission addressed to the C-RNTI. For example, the Msg3 may comprise the C-RNTI MAC CE. Based on the RA procedure being initiated for SpCell beam failure recovery, or the RA procedure being initiated by the PDCCH order, or the RA procedure being initiated by the higher layer (e.g., the MAC layer or by the RRC layer) of the wireless device and the fourth PDCCH indicates (or comprise) an UL grant for a new transmission, the wireless device may consider the contention resolution successful, stop the contention reso-lution timer (e.g., ra-ContentionResolutionTimer), discard the TC-RNTI, and/or consider the RA procedure success-fully completed.

For example, the fourth PDCCH may be addressed to the TC-RNTI and the Msg3 may comprise the CCCH SDU. For example, the fourth PDCCH may indicate a downlink assignment. The downlink assignment may comprise a transport block with/carrying a MAC PDU. Based on the MAC PDU being successfully decoded, the wireless device may stop the contention resolution timer.

For example, the MAC PDU may comprise a UE Con-tention Resolution Identity MAC CE (e.g., an indication of a contention resolution). As shown in FIG. 18, the indication of the contention resolution may match the CCCH SDU transmitted in the Msg3. In an example, the wireless device may consider the contention resolution successful and finish the disassembly and demultiplexing of the MAC PDU. For example, based on the RA procedure being initiated for SI request, the wireless device may indicate a reception of an acknowledgement for SI request to upper layers (e.g., the RRC layer) of the wireless device. For example, based on the RA procedure not being initiated for the SI request, the wireless device may set the C-RNTI to the TC-RNTI, discard the TC-RNTI, and consider the RRA procedure successfully completed. For example, if the indication of the contention resolution does not match the CCCH SDU trans-mitted in the Msg3, the wireless device may discard the TC-RNTI, consider the contention resolution not successful, and discard the successfully decoded MAC PDU.

In an example, the contention resolution timer (e.g., ra-ContentionResolutionTimer) may expire. The wireless device may, based on the expiry of the contention resolution timer, discard the TC-RNTI and consider the contention resolution not successful.

In an example, the wireless device may determine the contention resolution not being successful based on not receiving the indication of the contention resolution until the contention resolution timer expires. For example, the wireless device may determine that the contention resolution not being successful based on the contention resolution timer being expired. Based on the contention resolution not being successful, the wireless device may flush a HARQ buffer used for transmission of the MAC PDU in the Msg3 buffer, increment the preamble counter (e.g., PREAMBLE_TRANSMISSION_COUNTER), consider the RA procedure unsuccessfully completed (e.g., if the preamble counter reaches its maximum allowable preamble transmission threshold, e.g., PREAMBLE_TRANSMISSION_COUNTER=preambleTransMax+1), apply the backoff time, switch the RA type (e.g., if PREAMBLE_TRANSMISSION_COUNTER=msgA-TransMax+1), and/or select the RA resources for performing the RA procedure.

For example, the wireless device may stop the time alignment timer based on the contention resolution not being successful, the preamble being selected by the MAC layer among the CB Random Access Preamble(s) (e.g., the preamble is not indicated by the PDCCH order), and the time alignment time not being running when the RAR message or the fallback RAR is received. For example, the wireless device may stop the time alignment timer based on the contention resolution not being successful, the preamble is selected by the MAC layer among the CB Random Access Preamble(s), and the TAC MAC CE not being ignored.

In an example, when the RA type of the RA procedure is 2-stepRA, the wireless device may retransmit the MsgA, e.g., in response to determining that the contention resolution not being successful.

For example, the wireless device may increment a counter counting a number of preamble transmissions (e.g., PREAMBLE_TRANSMISSION_COUNTER), for example, after or in response to the RAR reception being unsuccessful and/or after or in response to a contention resolution being unsuccessful. The wireless device may determine that the RA procedure being unsuccessfully completed and/or a MAC entity of the wireless device may indicate a RA problem to upper layer(s) (e.g., the RRC layer), for example, in response to determining that the number of preamble transmissions reached a configured value, (e.g., if PREAMBLE_TRANSMISSION_COUNTER=preambleTransMax+1). In an example, the wireless device may determine that the RA procedure not being completed and/or one or more retransmissions of the preamble and/or the MsgA may be performed, in response to determining that the number of preamble transmissions being smaller than the configured value, (e.g., if PREAMBLE_TRANSMISSION_COUNTER<preambleTransMax+1).

A non-terrestrial network (NTN) network (e.g., a satellite network) may be a network or network segment that uses a space-borne vehicle to embark a transmission equipment relay node (e.g., radio remote unit) or a base station (e.g., an NTN base station). While a terrestrial network is a network located on the surface of the earth, an NTN may be a network which uses an NTN node (e.g., a satellite) as an access network, a backhaul interface network, or both. In an example, an NTN may comprise one or more NTN nodes and/or space-borne vehicles. An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding). The NTN node with the regenerative payload may comprise the on-board processing used to demodulate and decode the received signal and/or regenerate the signal before sending/transmitting it back to the earth.

In an example, the NTN node may be a satellite, a balloon, an air ship, an unmanned aircraft system (UAS), and the like. For example, the UAS may be a blimp, a high-altitude platform station (HAPS), e.g., a quasi-stationary (or stationary) HAPS, or a pseudo satellite station. FIG. 19 is an example figure of different types of NTN platforms/nodes. In an example, a satellite may be placed into a low-earth orbit (LEO) at an altitude between 250 km to 1500 km, with orbital periods ranging from 90-130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator. From the perspective of a given point on the surface of the earth, the position of the GEO satellite may not change.

Figure 20:
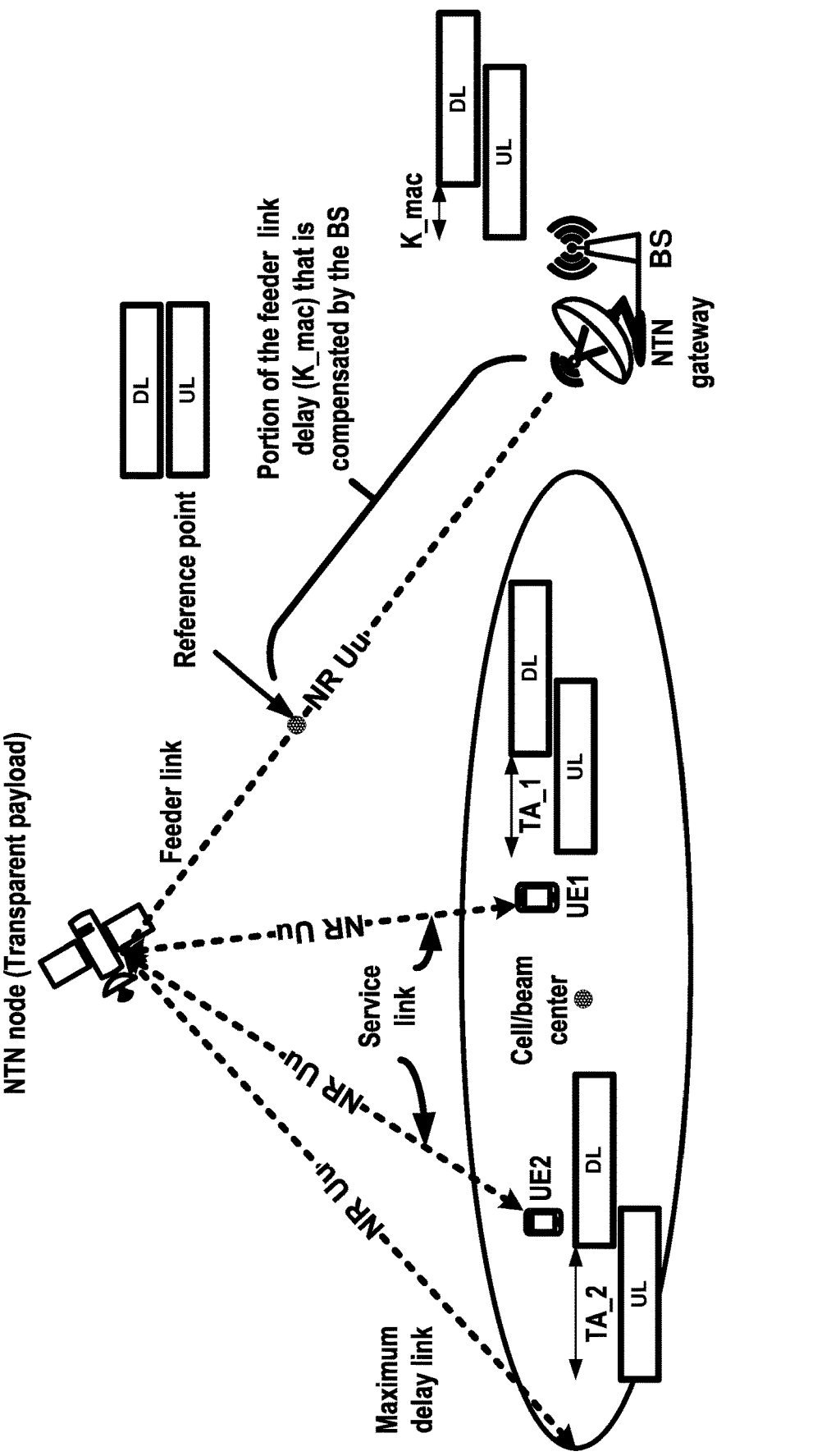
FIG. 20 shows an example of an NTN with a transparent NTN platform/node.

FIG. 20 shows an example of an NTN with a transparent NTN platform/node. As shown in FIG. 20, the NTN node (e.g., the satellite) may forward a received signal from a gateway on the ground back to the earth over a feeder communication link (or feeder link, for short). The gateway may be collocated with the base station. In an example, the gateway and the base station may not be collocated. The NTN node may forward a received signal from a wireless device on the earth to another NTN node or a gateway on the ground. The signal may be forwarded back with amplification and/or a shift between service link frequency (point or a bandwidth) and feeder link frequency. For example, the NTN node may forward a received signal from another NTN node (e.g., over inter-link satellite communication links).

For example, the NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). As shown in FIG. 19, the size of a spotbeam may range from tens of kilometers to a few thousand kilometers. For example, the size of the spotbeam may depend on the system design.

In an example, a propagation delay may be an amount of time it takes for the head of the signal to travel from a sender (e.g., the base station or the NTN node) to a receiver (e.g., the wireless device) or vice versa. For uplink, the sender may be the wireless device and the receiver may be the base station/access network. For downlink, the sender may be the base station/access network and the receiver may be the wireless device. The propagation delay may vary depending on a change in distance between the sender and the receiver, e.g., due to movement of the NTN node, movement of the wireless device, inter-satellite link, and/or feeder link switching.

FIG. 21 shows examples of propagation delay corresponding to NTNs of different altitudes. The propagation delay in the figure may be one-way latency/delay. In an example, one-way latency/delay may be an amount of time required to propagate through a telecommunication system from the sender (e.g., the base station) to the receiver (e.g., the wireless device). In an example shown in FIG. 21, for the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or RTD) may be twice of the one-way delay between a wireless device and the base station. From FIG. 21, in case of a GEO satellite with the transparent payload, the RTD may be four times of 138.9 milliseconds (approximately 556 milliseconds). In an example, the RTD of a terrestrial network (e.g., NR, E-UTRA, LTE) may be negligible compared to the RTD of an NTN scenario (e.g., the RTD of a terrestrial network may be less than 1 millisecond). In an example, the RTD of the GEO satellite may be hundreds of times longer than the one of a terrestrial network. A maximum RTD of a LEO satellite with the transparent payload and altitude of 600 km may be approximately 25.77 milliseconds. In an example, for a LEO satellite with the transparent payload and altitude of 1200 km, the maximum RTD may be approximately 41.77 milliseconds.

A differential delay within a beam/cell of a NTN node may depend on, for example, the maximum diameter of the beam/cell footprint at nadir. For example, the differential delay withing the beam/cell may depend on the maximum delay link in FIG. 20. In an example, the differential delay may imply the maximum difference between communication latency that two wireless devices, e.g., a first wireless device (UE1) that is located close to the center of the cell/beam and a second wireless device (UE2) that is located close to the edge of the cell/beam in FIG. 20, may experience while communicating with the base station via the NTN node. The first wireless device may experience a smaller RTD compared to the second wireless device. The link with a maximum propagation delay (e.g., the maximum delay link) may experience the highest propagation delay (or RTD) in the cell/beam. In an example, the differential delay may imply a difference between the maximum delay of the cell/beam and a minimum delay of the cell/beam. In an example, the service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, the differential delay may be as large as 20 milliseconds.

In an example, the wireless device (e.g., the first wireless device and/or the second wireless device in FIG. 20) may receive one or more NTN configuration parameters. For example, the one or more configuration parameters (e.g., the one or more RRC configuration parameters) may comprise the one or more NTN configuration parameters.

For example, the one or more NTN configuration parameters may be received, by the wireless device, from a broadcast system information (e.g., SIB1 or one or more NTN-specific SIBs). The one or more NTN configuration parameters may facilitate/manage the calculation of the propagation delay (e.g., the UE-gNB RTT) or a timing advance (TA) at one or more wireless devices camping in the cell/beam (e.g., the wireless device). In an example, the one or more NTN configuration parameters may comprise at least one or more satellite ephemeris parameters, one or more (network-controlled) common delay/TA parameters, and/or one or more timing offset parameters. In an example, the one or more NTN configuration parameters may be provided/indicated via a single broadcast system information (e.g., SIB1 or an NTN-specific SIB). In another example, the one or more NTN configuration parameters may be provided/indicated via one or more broadcast system information (e.g., SIB1 and the NTN-specific SIB). For example, the one or more timing offset parameters may be indicated/provided via SIB 1. For example, the one or more satellite ephemeris parameters and the common TA/delay parameters may be indicated/provided via the NTN-specific SIB.

In an example, the wireless device may maintain/calculate a cell-specific timing offset, one or more beam-specific timing offsets, and/or a UE-specific timing offset based on the one or more timing offset parameters and/or one or more MAC CE commands and/or one or more RRC signaling. For example, the one or more timing offset parameters may comprise a first timing offset (e.g., Koffset in ServingCell-ConfigCommon). The first timing offset may account for a maximum RTD of the cell/beam. For example, the wireless device may track/update/maintain the cell/beam-specific timing offset based on receiving an update of the first timing offset from the base station.

In some aspect, the one or more timing offset parameters may comprise the first timing offset and/or one or more beam-specific timing offsets. The one or more beam-specific timing offsets may respectively correspond to one or more maximum propagation delays of the one or more beams in the cell. For example, when the cell comprises of N>1 beams indexed by n, the n-th entry of the one or more beam-specific timing offsets may correspond to the maximum RTD of the n-th beam of the cell. In another example, the n-th entry of the one or more beam-specific timing offsets may indicate a difference between the first timing offset and the maximum RTD of the n-th beam of the cell. In an example, the wireless device may determine/calculate/maintain the cell/beam-specific timing offset based on the one or more beam-specific timing offsets and/or the first timing offset. For example, the wireless device may calculate/maintain the cell/beam-specific timing offset based on an indication indicating a beam index corresponding to the beam that is used for communication with the base station (or the NTN node) in the cell.

In an example, the one or more timing offset parameters may configure a third timing offset. In an example, the wireless device may set a MAC-specific timing offset (or a MAC layer timing offset), denoted by K-Mac, based on the third timing offset. For example, K-Mac may be set to 0, by the wireless device, in response to determining the third timing offset not being indicated/configured. For example, in an NTN scenario with the transparent NTN node, when the UL frame and the DL frame is aligned at the base station, the third timing offset may be absent from the one or more NTN configuration parameters or may be set to 0. In an example, the third timing offset may indicate a portion of the propagation delay that the base station may pre-compensate (e.g., when the UL frame and the DL frame are not aligned at the base station). As shown in FIG. 20, in the NTN scenario with the transparent payload, when the UL frame and DL frame is unaligned at the base station, the third timing offset may indicate the difference between the UL frame timing and the DL frame timing at the base station, e.g., the third timing offset may indicate a portion of the feeder link delay that is per-compensated by the base station. As shown in FIG. 20, the UL frame and DL frame may be aligned at a reference point on the feeder link. For example, the reference point may be the NTN node, e.g., the third timing offset is equal to the feeder link delay.

Transmissions from different wireless devices in a cell/beam (e.g., the first wireless device and the second wireless device in FIG. 20) may need to be time-aligned at the base station and/or the NTN node (e.g., satellite) to maintain uplink orthogonality. In an example, time alignment/synchronization may be achieved by using different timing advance (TA) values at different wireless devices to compensate for their different propagation delays (or RTDs). For example, the wireless device may calculate/measure/maintain a current TA value based on at least a combination of a closed-loop TA procedure/control and an open-loop TA procedure/control.

In an example, the closed-loop TA procedure/control may be based on receiving at least one TA command MAC CE from the base station. For example, the at least one TAC CE may comprise a TA (or an absolute TA) command field of a Msg2 1312 (or a MsgB 1332). The wireless device may maintain/calculate a closed-loop TA value in response to receiving the at least one TA command MAC CE.

In an example, the open-loop TA procedure/control may require a GNSS-acquired position (or location information) of the wireless device and/or reading/acquiring the one or more NTN configuration parameters (e.g., via the broadcast system information). In an example, the combination of the closed-loop TA control/procedure and the open-loop TA procedure/control may require resetting the (accumulative) closed-loop TA value to a predefined value (e.g., 0) when a new GNSS-acquired position becomes available and/or when the wireless device reads/acquires the broadcast system information (e.g., for the one or more NTN configuration parameters). In an example, a combination of the closed-loop TA control and the open-loop TA control may be based on adding the open-loop TA value (e.g., derived/calculated based on the open-loop TA procedure/control) and the closed-loop TA value (or a portion of the closed-loop TA procedure/control). For example, the open-loop TA value may be determined/calculated, by the wireless device, at least based on the GNSS-acquired position of the wireless device, the satellite ephemeris parameters (e.g., the satellite ephemeris data), and/or the common delay/TA parameters (e.g., the common TA value). For example, the current TA value (e.g., $N_{TA}$) may be based on the combination on the open-loop TA value and the closed-loop TA value.

In an example, the wireless device may calculate/measure/estimate the UE-gNB RTT (or the RTD) based on the current TA value and the third timing offset (e.g., K-Mac). For example, the UE-gNB RTT may be the summation of the current TA value and K-Mac. In an example, if the third timing offset is not indicated or when the K-Mac is 0, the UE-gNB RTT may be determined, by the wireless device, based on the current TA value.

In an example, the satellite ephemeris parameters may comprise at least the satellite ephemeris data/information, an epoch time for the satellite ephemeris data, a first validity period/window (or a first validation period/window), and/or one or more drift rates corresponding to the satellite ephemeris data (e.g., indicating one or more variation rates of the satellite location/movement due, for example, to orbital decay/atmospheric drag). The wireless device may, based on an implemented orbital predictor/propagator model, may use the satellite ephemeris parameters (and/or the GNSS-acquired position) to measure/calculate/maintain movement pattern of the satellite, estimate/measure the service link delay, and/or to adjust the current TA value via the open-loop TA procedure/control. In an example, the one or more drift rates may comprise a (first order) drift rate, a second-order drift rate or variation rate of the drift rate, and/or a third-order drift rate or variation rate of the second-order drift rate. In an example, the satellite ephemeris data/information may be configured in one or more satellite ephemeris formats.

In an example, the wireless device may maintain/calculate/update the open-loop TA value (or the UE-gNB RTT) over a period (e.g., the first validation window/period) using the satellite ephemeris parameters. For example, using the one or more drift rates of the satellite ephemeris parameters the wireless device may skip a frequent reading/acquiring of the one or more NTN configuration parameters (e.g., acquiring the NTN-specific SIB). In another example, the wireless device may not require acquiring a new satellite ephemeris data based on the first validation period/window being running. The first validity period/window may indicate the validity time of the (satellite) ephemeris data/information. In an example, the first validity period/window may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not require to read/update/acquire the satellite ephemeris data. For example, upon or in response to acquiring a new satellite ephemeris data (or parameters), the wireless device may start/restart the first validity timers. In an example, in response to determining that the first validity period/window being expired, the wireless device may acquire an updated satellite ephemeris data/information. In an example, upon the expiry of the first validity period/window and when the wireless device is not able to acquire the updated satellite ephemeris data/information, the wireless device may become unsynchronized.

The common TA (or the common delay) parameters may indicate a common TA/delay, a second validity period/window (or a second validation period/window or a common TA validation period/window), and/or one or more higher-order (e.g., a first order and/or a second order and/or a third-order) drift rates of the common TA. For example, the second validity period/window may indicate a maximum period during which the wireless device may not require to acquire the common TA for calculation of the open-loop TA value. According to an example, the second validity period/window may indicate a maximum period during which the wireless device may not require to acquire the one or more NTN configuration parameters (e.g., acquiring the one or more NTN-specific SIBs). In an example, when the second validity period/window being configured, the wireless device may (re)start the second validity period/window upon/in response to reading/receiving new common TA parameters. For example, in response to determining that the second validity window/period being expired, the wireless device may acquire an updated common TA/delay (e.g., via a SIB). In an example, upon the expiry of the second validity period/window and when the wireless device is not able to acquire the updated common TA, the wireless device may become unsynchronized.

In an example, in response to determining the second validity window/period being absent from the one or more NTN configuration parameters (e.g., when the satellite ephemeris parameters and the common TA parameters are provided via the same broadcast system information or dedicated system information), the wireless device may manage acquiring the common TA parameters based on the first validity window/period (e.g., the validity window/ period of the ephemeris data/information). For example, based on the second validity window/period being absent from the one or more NTN configuration parameters and when the first validity period/window expires, the wireless device may acquire the updated common TA.

For example, the second-order drift rate of the common TA may indicate the variation rate by which the drift rate of the common TA changes over a predefined window/period (e.g., the second validity window/period or the first validity window/period). In another example, when provided, a third-order drift rate of the common TA may indicate a variation rate corresponding to the second-order drift rate of the common TA by which the second-order drift rate of the common TA changes over a predefined window/period (e.g., the first validity window).

In an example, in response to receiving/reading at least the updated satellite ephemeris data/information, and/or the updated common TA/delay, and/or an updated GNSS-acquired position, the wireless device may calculate/measure/update the current TA value via the open-loop TA procedure/control. In another example, the wireless device may update the current TA value based on the closed-loop TA procedure/control, for example, based on receiving the one or more TAC MAC CEs. In an example, based on the current TA value being updated, the wireless device may adjust (recalculate) the UE-gNB RTT. In an example, based on receiving a new third timing offset, the wireless device may set K-Mac and adjust (recalculate) the UE-gNB RTT.

In an example, the wireless device may set the common TA/delay by zero in response to determining that the common TA/delay parameters are absent from the one or more NTN configuration message. For example, when the reference point is located at the NTN node (e.g., the third timing offset is equal to the feeder link delay), the common TA/delay may be zero. In another example, for an NTN with the transparent payload, when the UL timing synchronization is held at the NTN node (e.g., the UL and DL frames are aligned at the base station), the wireless device may not pre-compensate the common TA.

The base station may periodically broadcast (e.g., each 160 milliseconds) the one or more NTN configuration parameters. In some aspect, based on determining the validity period/window of the ephemeris data/information (and/or the validity period/window of the common TA) being configured and the validity period/window of the ephemeris data/information (and/or the validity period/window of the common TA) being larger than the periodicity of the broadcast system information comprising the one or more NTN configuration parameters, the wireless device may not require reading/acquiring the one or more NTN configuration parameters while the validity period/window of the ephemeris data/information (and/or the validity period/window of the common TA) is running.

In an example, based on determining at least one or more drift rates being provided (e.g., the drift rate of the satellite ephemeris and/or the drift rate of the common TA), the wireless device may (autonomously) adjust/update/recalculate the current TA value based on the at least one or more drift rates. The base station by providing the at least one or more drift rates and/or the at least one or more variation rates may reduce the signaling overhead for calculating/maintaining the open-loop TA value. For example, when the at least one or more drift rates are provided, the wireless device may maintain/track a change in the propagation delay (e.g., the open-loop TA value) for a relatively long period (e.g., 3 seconds). For example, when the at least one or more drift rates are provided and the at least one or more variation rates of the at least one or more drift rates are provided, the wireless device may maintain/track a change in the propagation delay (or the open-loop TA value) for an extended period (e.g., 35 seconds). In an example, the base station may, to increase the capability of the wireless device to track/maintain the change in the propagation delay, indicate a third order approximation of the feeder link delay, a third order approximation of the satellite movement, a third order approximation of the common delay, and the like.

In an example, the wireless device with GNSS capability may require estimating the propagation delay (or service link delay) based on one or more measurements. For example, the one or more measurements may indicate the GNSS-acquired location information (position) of the wireless device. In an example, the one or more measurements may allow the wireless device to calculate/estimate the propagation delay (or the open-loop TA value) using the GNSS-acquired position and the satellite ephemeris data/information. In another example, the one or more measurements may allow the wireless devices to estimate/calculate the propagation delay via one or more timestamps (e.g., the timestamp of a configured broadcast signal) and/or the epoch time of the satellite ephemeris parameters. In an example, the one or more measurements may allow the wireless device to estimate/measure a variation rate by which the common TA and/or the service link delay changes over a period. For example, the wireless device may estimate/measure the first order drift rate of the satellite ephemeris based on estimating a rate by which the service link delay changes. In an example, the one or more measurements may allow the wireless device to estimate/calculate the second order (and/or the third order) drift rate of the common TA and/or the satellite ephemeris data.

In an example, the base station may avoid a HARQ stalling state of the wireless device, when the wireless device communicates with the base station via the NTN node, e.g., when the wireless device is an NTN UE. For example, the base station may continuously schedule the wireless device using one or more scheduling strategies/modes/states. For example, in the uplink, the one or more scheduling strategies may comprise a scheduling strategy/mode/state without HARQ retransmissions, or a scheduling strategy/mode/state with blind retransmissions, or a scheduling strategy/mode/state with HARQ retransmissions based on UL decoding result.

For example, in the uplink, a state/mode of a HARQ process may be a state B (e.g., DRX-LCP Mode B). For the HARQ process that has a mode/state of the state B, the one or more scheduling strategies may comprise the scheduling strategy/mode/state without the HARQ retransmissions (e.g., no retransmission mode/state or a deactivated retransmission mode/state) or the scheduling strategy/mode/state with the blind retransmissions (e.g., a blind retransmission mode/state). For example, based on the state/mode of the HARQ process being the state B, the base station may blindly retransmit (e.g., the blind retransmission mode/state) a transport block (TB) corresponding to the HARQ process. For example, based on the state/mode of the HARQ process being the state B, the base station may not retransmit the TB (e.g., the no retransmission mode/state).

In an example, the one or more configuration parameters (e.g., the MAC-CellGroupConfig and/or PUSCH-Serving-CellConfig) may indicate/configure the state/mode of the HARQ process as the state B, e.g., the HARQ process is with (or has) a second state/mode of a UL HARQ retransmission state or a HARQ state B or an RJTT-TimerUL-extended state/mode. In an example, based on determining a uplinkHARQ-DRX-LCP-Mode (or uplinkHARQ-DRX-LCP-Mode-r17) in the one or more configuration parameters (e.g., the MAC-CellGroupConfig and/or PUSCH-Serving-CellConfig) being configured/indicated and the HARQ process being configured/indicated as DRX-LCP Mode B, the wireless device may determine that the state/mode of the HARQ process is the state B. For example, based on determining a uplinkHARQ-DRX-LCP-Mode (or uplinkHARQ-DRX-LCP-Mode-r17) in the one or more configuration parameters (e.g., the MAC-CellGroupConfig and/or PUSCH-ServingCellConfig) being configured/indicated and the HARQ process not being configured/indicated as a DRX-LCP Mode A, the wireless device may determine that the state/mode of the HARQ process is the state B. In an example, the wireless device may determine the state/mode of the HARQ process is the state B based on the HARQ process being set by a second value (e.g., a value of '1') in the uplinkHARQ-DRX-LCP-Mode-r17.

For example, the transmission of the TB may be scheduled/indicated by a DCI indicating the HARQ process. In an example, the DCI may indicate that the state/mode of the HARQ process is the state B (e.g., as the DRX-LCP Mode B). For example, the one or more configuration parameters may indicate/configure the HARQ process as the DRX-LCP Mode B.

In an example, the transmission of the TB may be performed/scheduled based on a configured uplink grant (e.g., a configured grant Type 1 or a configured grant Type 2). The wireless device may determine the HARQ process based on based on a first/starting/initial symbol of the configured uplink grant and/or the one or more configuration parameters (e.g., ConfiguredGrantConfig), e.g., the harq-ProcID-Offset2 and/or a nroJHARQ-Processes. For example, the one or more configuration parameters may indicate/configure the HARQ process as the DRX-LCP Mode B. According to an example, a configured grant configuration corresponding to the configured uplink grant may indicate/configure the HARQ process as the DRX-LCP Mode B. In an example, a DCI activating the configured grant Type 2 may indicate/configure the state/mode of the HARQ process as the state B.

For example, in the uplink, a state/mode of a HARQ process may be a state A (e.g., RJTT-TimerUL-off state/mode or a first state/mode of a UL HARQ retransmission state or a HARQ state A). For the HARQ process that has a mode/state of the state A (e.g., the DRX-LCP Mode A), the one or more scheduling strategies may comprise the scheduling strategy/mode/state with the HARQ retransmissions based on the UL decoding result. In an example, based on determining the uplinkHARQ-DRX-LCP-Mode (or uplinkHARQ-DRX-LCP-Mode-r17) in the one or more configuration parameters (e.g., the MAC-CellGroupConfig and/or PUSCH-ServingCellConfig) being configured/indicated and the HARQ process being configured/indicated as DRX-LCP Mode A, the wireless device may determine that the state/mode of the HARQ process is the state A. For example, based on determining the uplinkHARQ-DRX-LCP-Mode (or uplinkHARQ-DRX-LCP-Mode-r17) in the one or more configuration parameters (e.g., the MAC-CellGroupConfig and/or PUSCH-ServingCellConfig) being configured/indicated and the HARQ process not being configured/indicated as DRX-LCP Mode B, the wireless device may determine that the state/mode of the HARQ process is the state A. In an example, the wireless device may determine the state/mode of the HARQ process is the state A based on the HARQ process being set by a first value (e.g., a value of '0') in the uplinkHARQ-DRX-LCP-Mode-r17.

For example, in the uplink the state/mode of the HARQ process may not be the state A and may not the state B. For example, the one or more configuration parameters may configure the state/mode of the HARQ process as 'legacy'. For example, the one or more configuration parameters may not configure/indicate the uplinkHARQ-DRX-LCP-Mode (or uplinkHARQ-DRX-LCP-Mode-r17). The one or more scheduling strategies may comprise the scheduling strategy/mode/state with the HARQ retransmissions based on the UL decoding result.

In an example, the wireless device, when communicating with the base station via the NTN, may delay a start of one or more timers/windows of the random access (RA) procedure. For example, based on the RA procedure being initiated and the Msg1 1311/1321/1341 (e.g., a first preamble) being transmitted, the wireless device may start the RAR window (e.g., ra-ResponseWindow) after a first offset, e.g., the wireless device may delay the start of the RAR window by the first offset.

For example, the first offset may be based on the propagation delay between the wireless device and the base station. In an example, the first offset may be the UE-gNB RTT (or the RTD). For example, the first offset may be indicated by the base station (e.g., via the one or more NTN configuration parameters). For example, the first offset may be calculated, by the wireless device, from one or more indicated parameters (e.g., the common TA and/or the satellite ephemeris parameters).

In another example, the wireless device may transmit the MsgA 1331 (e.g., comprising a second preamble and/or a MsgA payload). In response to the MsgA being transmitted, the wireless device may delay the start of the RAR window (e.g., msgB-ResponseWindow) by the first offset. For example, in response to transmitting the second preamble (e.g., when the MsgA payload is not transmitted), the wireless device may start the RAR window from a last/ending symbol of the valid RO corresponding to the second preamble transmission plus the first offset. In another example, in response to transmitting the MsgA (e.g., when the second preamble and MsgA payload both are transmitted), the wireless device may start the RAR window from a last/ending symbol of the MsgA PUSCH occasion mapped to the valid RO plus the first offset.

For example, the wireless device may transmit the Msg3 1333. For example, the transmission of the Msg3 may be indicated/scheduled based on receiving a first RAR message or a second RAR message. In an example, the wireless device may receive the first RAR message in response to transmitting the Msg1 1311 (e.g., the first preamble). In an example, the wireless device may receive the second RAR message in response to transmitting the MsgA 1331 comprising the second preamble 1341. For example, the first RAR message may comprise at least the RAR with the MAC subPDU with RAPID matching the first preamble. For example, the second RAR message may comprise at least the fallback RAR with the MAC subPDU with RAPID matching the second preamble. In response to transmitting the Msg3, the wireless device may delay the start of a contention resolution timer (e.g., a ra_ContentionResolutionTimer) by the first offset.

A wireless device may perform a random access (RA) procedure (e.g., a four-step RA procedure or a two-step RA procedure) by transmitting the Msg1 1311/1321/1341 or the MsgA 1331. In response to transmitting the Msg3 1313 (e.g., the transmission of the Msg3 may be indicated by the Msg2 1312 or MsgB 1332), the wireless device may start a contention resolution timer. In an NTN scenario with a long propagation delay (e.g., about 550 milliseconds in a GEO satellite and 25-42 milliseconds in a LEO satellite), the wireless device may delay the start of the contention resolution timer with the first offset (e.g., the UE-gNB RTT). In an example, during/while the contention resolution timer is running, the wireless device may receive a DCI with/having a CRC scrambled by a TC-RNTI indicating an uplink grant for retransmission of the Msg3. The wireless device may restart the contention resolution timer based on transmitting the retransmission of the Msg3.

Based on existing technology, in an NTN scenario with large propagation delay (e.g., about 550 milliseconds in the GEO satellite and 25-42 milliseconds in the LEO satellite), the contention resolution timer may expire before receiving the Msg 4 or may expire before transmitting the retransmission of the Msg3. For example, the contention resolution timer may expire before the wireless device receives the Msg4 when the value range of the contention resolution timer is smaller than the UE-gNB RTT (e.g., when the wireless device is located around the cell edge). For example, a large difference between the cell-specific timing offset and the TA value (e.g., 3-21 milliseconds) may result in the transmission time of the retransmission of the Msg3 being after the expiry of the contention resolution timer. In an example, in an NTN scenario, the difference between the cell-specific timing offset and the TA value may become large (e.g., 3-21 milliseconds), e.g., when the wireless device is located around the cell/beam center. The difference between the cell-specific timing offset and the TA value may indicate the transmission time of the retransmission of the Msg3.

Based on existing technologies, due to the large propagation delay, the wireless device may incorrectly consider/determine that the contention resolution was unsuccessful upon the expiry of the contention resolution timer. Based on the contention resolution being unsuccessful, the wireless device may, for example, perform at least one of: discarding the TC-RNTI, flushing the HARQ buffer of the Msg3, retransmitting a preamble or a MsgA after applying the backoff time and/or switching the RA type, and/or stopping the time alignment timer, e.g., if the (absolute) TAC MAC CE received via a RAR message (e.g., the fallback RAR) is not ignored. Consequently, based on existing technologies, the latency of the contention resolution procedure may increase, the consumed power of the wireless device (e.g., due to transmitting the preamble or the MsgA) may increase, and/or the efficiency of the RA procedure may reduce (e.g., due to not receiving the Msg4 or not transmitting the retransmission of the Msg3). Based on existing technologies, the behavior of the wireless device may be unspecified/undefined when the retransmission of the Msg3 is scheduled/indicated and the HARQ buffer of the Msg3 is empty (or flushed) and/or the TC-RNTI is discarded.

There is a need to improve the contention resolution procedure in an NTN scenario to reduce the latency of the contention resolution procedure, e.g., the latency due to incorrectly considering/determining the contention resolution being unsuccessful or the latency due to retransmitting the preamble/MsgA in response to the expiry of the contention resolution timer. There is a need to improve the contention resolution procedure in an NTN scenario to reduce the power consumption of the wireless device, improve the efficiency of the RA procedure, and/or improve the flexibility of the base station to improve the success of the contention resolution.

According to example embodiments of the present disclosure, the wireless device may adjust the contention resolution (CR) timer to not expire until after a retransmission of an initial transmission of the RA procedure. For example, the initial transmission may be performed for transmitting the Msg3. For example, the retransmission of the initial transmission may be performed to transmit the retransmission of the Msg3. Example embodiments may reduce the possibility of the unsuccessful contention resolution. For example, by adjusting the CR timer based on transmitting the retransmission of the Msg3, the contention resolution may not be considered/determined unsuccessful. Example embodiments may reduce the latency of the contention resolution procedure by reducing the possibility of the unsuccessful contention resolution. Example embodiments may improve the efficiency of the RA procedure (e.g., receiving the Msg4 and/or transmitting the retransmission of the Msg3). By adjusting the CR timer, the base station may be able to indicate/schedule one or more retransmissions of the Msg3. For example, the base station may improve a decoding probability of the Msg3 based on indicating/scheduling the one or more retransmissions of the Msg3. For example, the base station may not be restricted for scheduling/indicating the one or more retransmissions of the Msg3.

In an example embodiment, the wireless device may adjust the contention resolution (CR) timer to not expire until after the transmission of the retransmission of the Msg3. Based on an example embodiment, the wireless device may adjust the CR timer to not expire until the transmission of the retransmission of the Msg3. In an example embodiment, the wireless device may adjust the CR timer to not expire until a second offset after the transmission of the retransmission of the Msg3. The second offset may be based on the UE-gNB RTT. For example, the second offset may be equal to the UE-gNB RTT, e.g., when the wireless device adjusts the CR timer to not expire until the Msg4 being received. The base station may configure/indicate, e.g., by/via the one or more configuration parameters, the second offset to improve its flexibility for scheduling one or more retransmissions of the Msg3.

In an example embodiment, the wireless device may determine whether the contention resolution timer expires until after the retransmission of the message 3 or not. In an example, the wireless device may determine the contention resolution timer expires until after the retransmission of the message 3 based on at least one expiry condition being satisfied. For example, the at least one expiry condition may be based on (or may comprise) at least of: the first value indicated by one or more RACH configuration parameters, a distance of the wireless device to a configured reference point (e.g., the NTN node), a UE-specific TA value, or an elevation angle between the wireless device and the NTN node. For example, the UE-specific TA value may be determined, by the wireless device, using the GNSS-acquired position of the wireless device and/or the satellite ephemeris parameters. For example, the wireless device may determine the at least one expiry condition is satisfied based on the UE-specific TA value being smaller than a third threshold or the distance of the wireless device to the configured reference point being smaller than a second threshold. For example, the one or more configuration parameters may indicate/configure the second threshold and the third threshold, and/or the fourth threshold.

For example, the one or more configuration parameters may indicate/configure a first scaling factor (or a first scale factor). The wireless device may calculate/determine a first threshold based on the first scaling factor and a difference between the cell-specific timing offset and the current TA value, e.g., by multiplying the first scaling factor by the difference between the cell-specific timing offset and the current TA value. In an example embodiment, the wireless device may determine the at least one expiry condition is satisfied based on the first value indicated by the one or more RACH configuration parameters (e.g., ra-ContentionReso-lutionTimer) being smaller than the first threshold.

In an example embodiment, based on the second offset being configured/indicated and at least one of the first scaling factor, the second threshold, the third threshold, and the fourth threshold being configured/indicated, the wireless device may adjust the CR timer to compensate for the service link delay, e.g., when the wireless device is located around the cell/beam edge. In an example embodiment, based on the second offset not being configured/indicated and at least one of the first scaling factor, the second threshold, the third threshold, and the fourth threshold being configured, the wireless device may adjust the CR timer to compensate for the differential delay of the cell/beam and/or the difference between the cell-specific timing offset and the current TA value, e.g., when the wireless device is located around the cell/beam center.

In an example embodiment, the wireless device may adjust the CR timer based on the DCI being received/detected, the Msg3 being transmitted, and/or the Msg3 being retransmitted. In an example embodiment, the wireless device may adjust the CR timer by restarting the CR timer, stopping the CR timer, and/or extending the value range of the CR timer. In an example embodiment, based on whether a discontinuous reception (DRX) operation being configured or not, the wireless device may adjust the CR timer by restarting the CR timer, stopping the CR timer, or extending the value range of the CR timer.

In an example embodiment, the one or more configuration parameters may configure a state/mode of a first HARQ process associated with (or corresponding to) the Msg3 as the state B (e.g., the DRX-LCP Mode B). The wireless device may adjust the CR timer by restarting the CR timer or extending the value range of the CR timer. In an example embodiment, the one or more configuration parameters may configure the state/mode of the first HARQ process associated with the Msg3 as the state A (e.g., the DRX-LCP Mode A). The wireless device may adjust the CR timer by stopping the CR timer in response to receiving the DCI. In an example embodiment, the one or more configuration parameters may not configure the state/mode of the first HARQ process associated with the Msg3 as the state A or as the state B. The wireless device may adjust the CR timer by stopping the CR timer in response to receiving the DCI.

In an example embodiment, a downlink signal may indicate a first indication and/or a second indication (e.g., a DCI, a MAC CE, a RAR message, or RRC signaling). The first indication may be for restarting the value range of the CR timer. For example, the one or more configuration param-eters may indicate/configure the first indication and/or the second indication. The second indication may be for extend-ing the value range of the CR timer. In an example embodi-ment, based on the first indication and/or the second indi-cation, the wireless device may adjust the CR timer by restarting the CR timer, stopping the CR timer, or extending the value range of the CR timer. In an example embodiment, based the first indication and/or the second indication, the wireless device may adjust the CR timer in response to the DCI being received, the transmission of the Msg3 being performed, or the retransmission of the Msg3 being per-formed.

Example embodiments may allow the base station to configure flexibly/dynamically the wireless device to adjust the CR (e.g., based on indicating the first indication and/or the second indication via the DCI and/or the RAR message). For example, based on not decoding the Msg3, the base station may, via the DCI, indicate/enable the wireless device to adjust the CR timer.

Based on an example embodiment, the one or more configuration parameters may indicate/configure a plurality of second factors. The wireless device may determine the second offset based on the plurality of second factors to adjust the CR timer. For example, the wireless device may select a second factor based on at least one of the following: the distance of the wireless device to the configured refer-ence point, the UE-specific TA value, or the elevation angle between the wireless device and the NTN node. For example, the wireless device may determine the second offset based on the second factor. For example, the wireless device may determine the second offset based on the second factor and the first offset. Example embodiments may allow the wireless device to flexibly determine the second offset, for example, for extending the value range of the CR timer. For example, when the wireless device is located around the cell/beam center, the wireless device may extend the value range of the CR timer by a smaller second factor from/among the plurality of second factors to compensate for the service link delay. For example, when the wireless device is located around the cell/beam edge, the wireless device may extend the value range of the CR timer by a larger second factor from/among the plurality of second factors to com-pensate for the service link delay.

Based on an example embodiment, the one or more RACH configuration parameters may indicate/configure a plurality of first factors. To initialize the CR timer, the wireless device may determine the first value based on the plurality of first factors. For example, the wireless device may select a first factor from/among the plurality of first vactors based on at least one of the following: the distance of the wireless device to the configured reference point, the UE-specific TA value, or the elevation angle between the wireless device and the NTN node. In an example embodi-ment, based on the first offset and the first factor, the wireless device may determine the first value for initializing the CR timer. In an example, the wireless device may determine first value by the first factor. Example embodiments may allow the wireless device to properly initialize the CR timer based on the plurality of the first factors. For example, when the wireless device is around the cell/beam edge the wireless device may determine a larger first value based on the plurality of first factors. For example, when the wireless device is around the cell/beam center, the wireless device may determine a smaller first value based on the plurality of first factors.

FIG. 22, FIG. 23, FIG. 24, FIG. 25, FIG. 26, and FIG. 27 illustrate examples of a random access procedure per aspect of an embodiment of the present disclosure. The wireless device may communicate with the base station via the NTN node (e.g., a GEO satellite), e.g., the wireless device may be an NTN UE. For example, the wireless device may receive the one or more configuration parameters comprising at least the one or more RACH configuration parameters and the one or more NTN configuration parameters.

As shown in FIG. 22, FIG. 23, FIG. 24, FIG. 25, FIG. 26, and FIG. 27, the wireless device may start the contention resolution (CR) timer (e.g., ra-ContentionResolutionTimer) at time T1. For example, the wireless device may start the CR timer based on an initial transmission of an RA procedure. As shown in FIG. 22, FIG. 23, FIG. 24, FIG. 25, FIG. 26, and FIG. 27, the wireless device may perform the initial transmission at time TO. The initial transmission may be for the message 3 (Msg3) 1313 of the RA procedure. When communicating with the base station via the NTN node, in response to performing the initial transmission, the wireless device may delay the start of the CR timer by the first offset (e.g., the UE-gNB RTT). In an example, time T1 may be the first offset after the transmission occasion/time of the initial transmission.

As shown in in FIG. 22, FIG. 23, FIG. 24, FIG. 25, FIG. 26, and FIG. 27, the wireless device may receive/detect, during/while the CR timer in running, a $1^{st}$ DCI at time T2. For example, the base station may transmit the $1^{st}$ DCI to indicate/schedule an uplink grant for a retransmission of the initial transmission. For example, the uplink grant may indicate/schedule the retransmission of the Msg3.

In an example embodiment, as shown in FIG. 22, FIG. 23, FIG. 24, FIG. 25, FIG. 26, and FIG. 27, the wireless device may adjust the CR to not expire until after the retransmission of the initial transmission. The wireless device may adjust the CR timer based on at least one of: the first DCI being received, the transmission of the initial being performed, or the retransmission of the initial transmission being performed.

In an example embodiment, as shown FIG. 22, FIG. 23, FIG. 24, and FIG. 26, the wireless device may, based on the first DCI being received/detected at time T2, adjust the CR to not expire until after the retransmission of the initial transmission.

Figure 22:
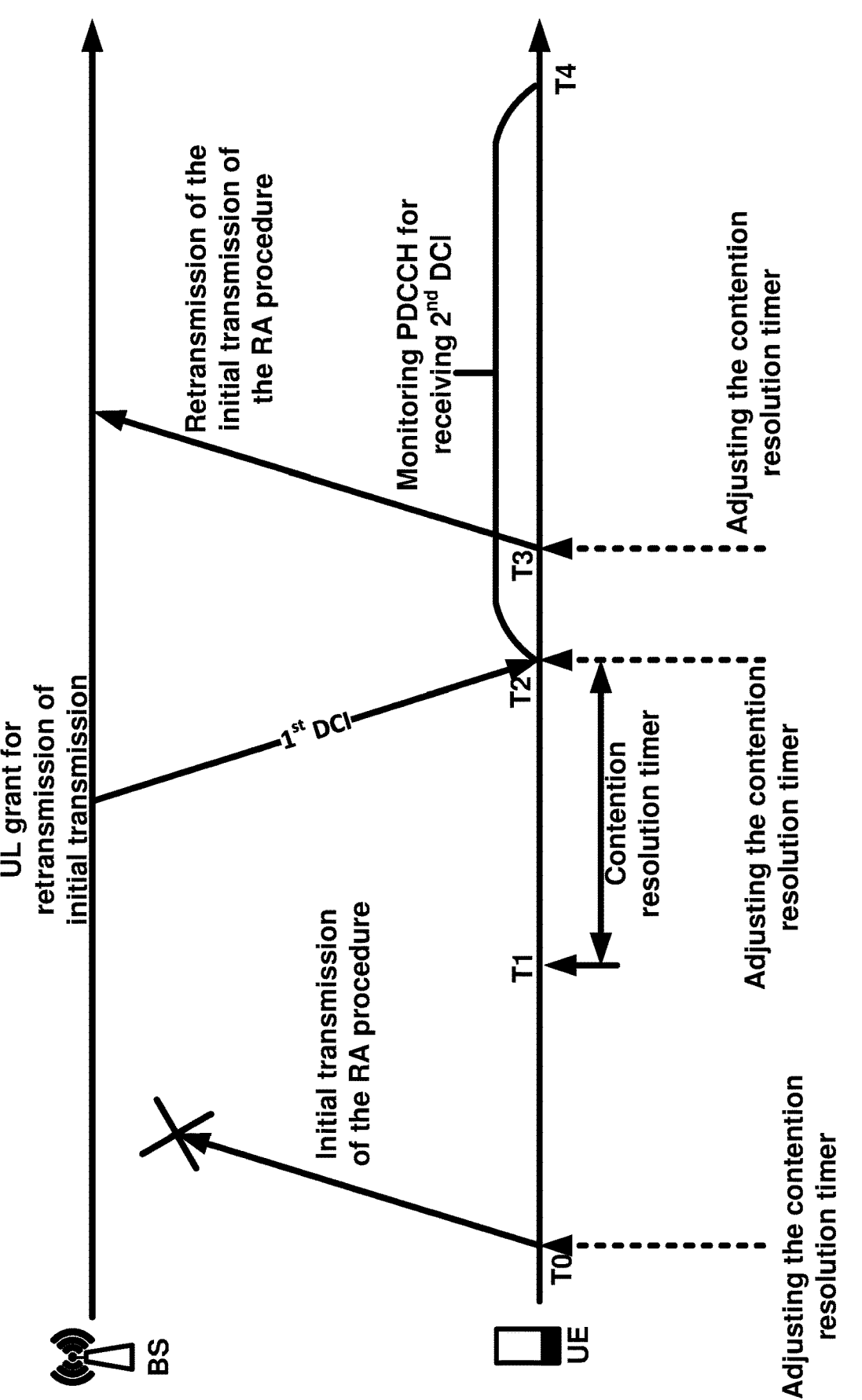
FIG. 22 illustrates an example of a random access procedure per aspect of an embodiment of the present disclosure.
Figure 23:
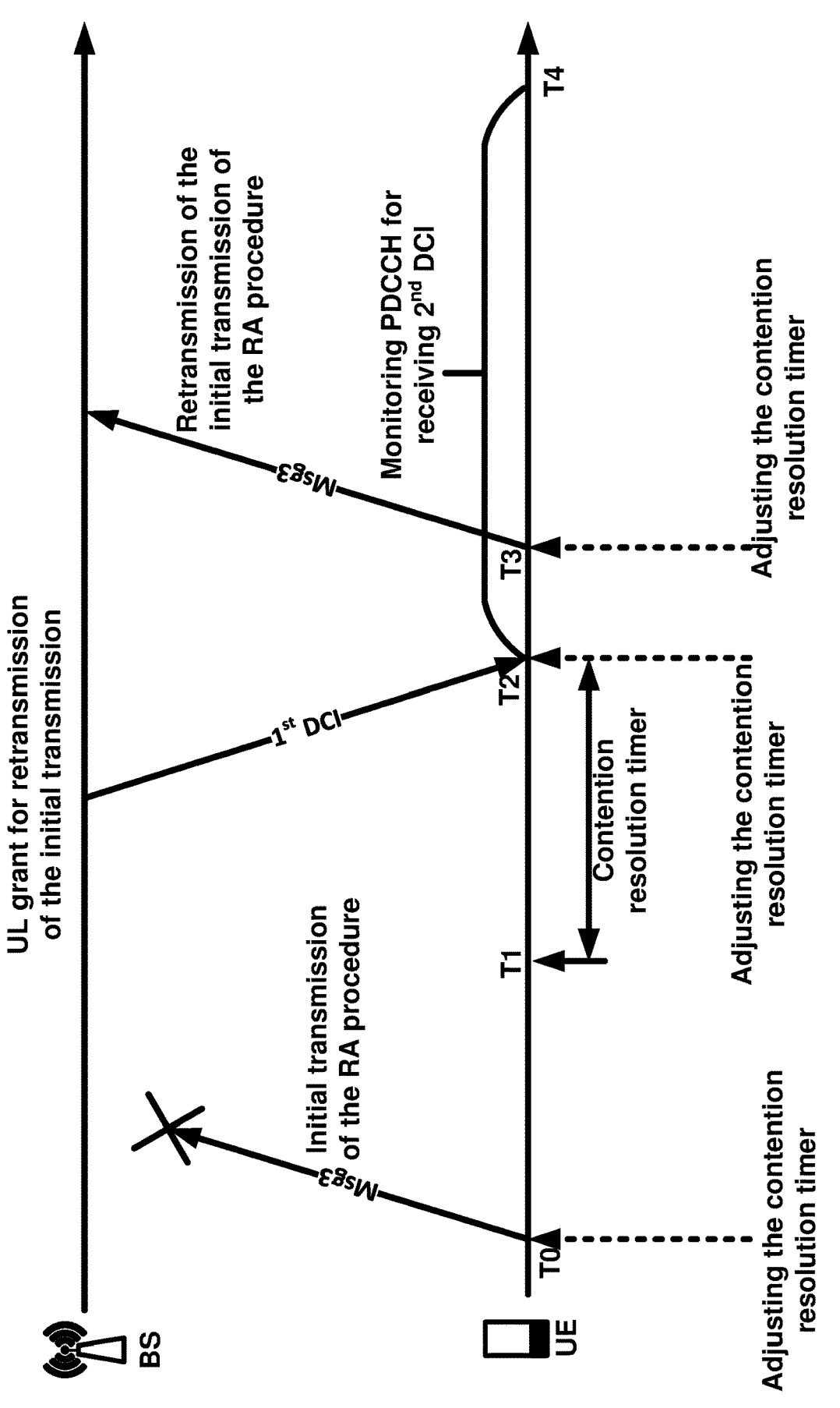
FIG. 23 illustrates an example of a random access procedure per aspect of an embodiment of the present disclosure.
Figure 25:
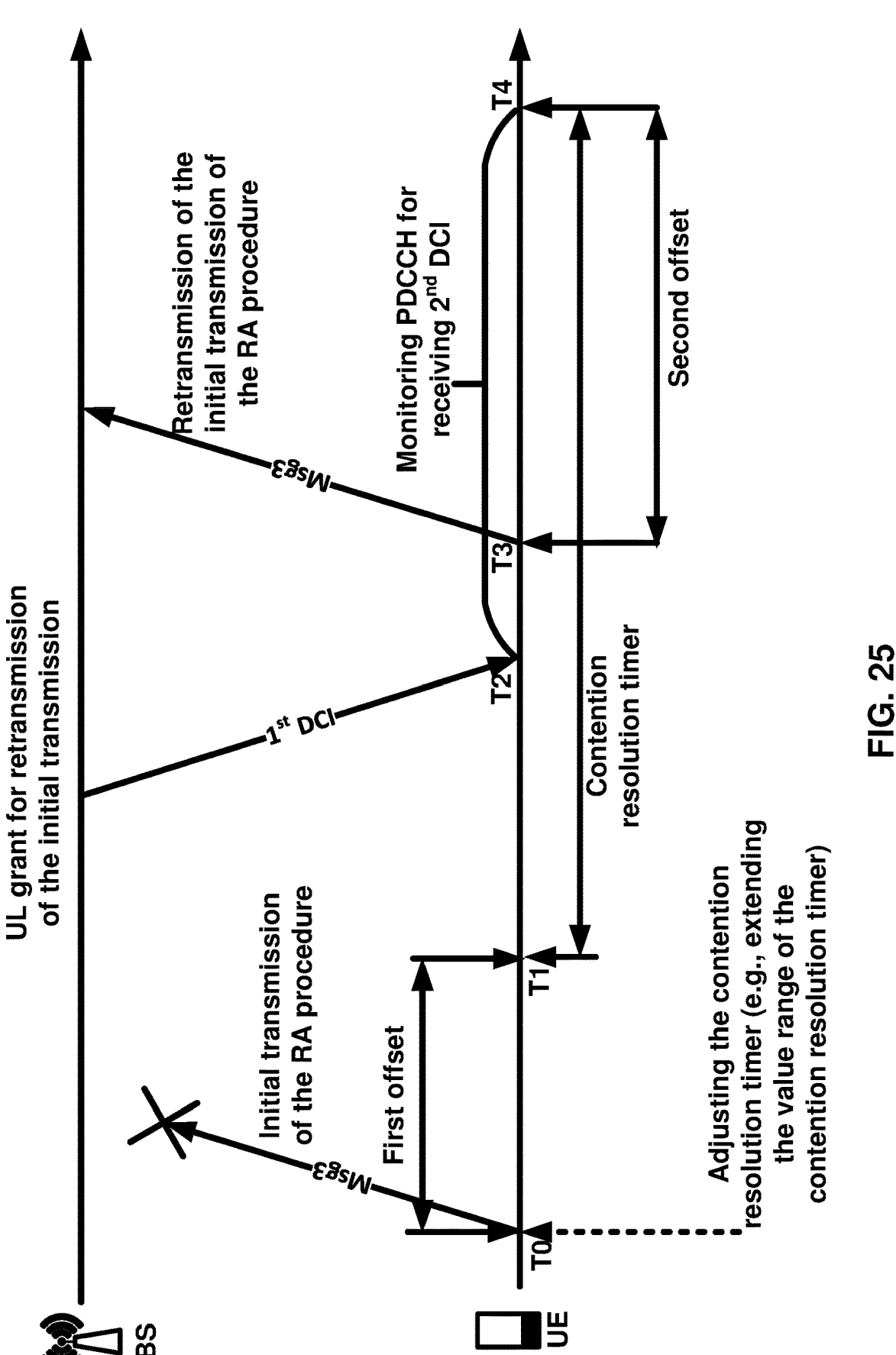
FIG. 25 illustrates an example of a random access of an RA procedure per aspect of an embodiment of the present disclosure.

In an example embodiment, as shown in in FIG. 22, FIG. 23, and FIG. 25, the wireless device may, based on the initial transmission being performed at time TO, adjust the CR to not expire until after the retransmission of the initial transmission.

Figure 27:
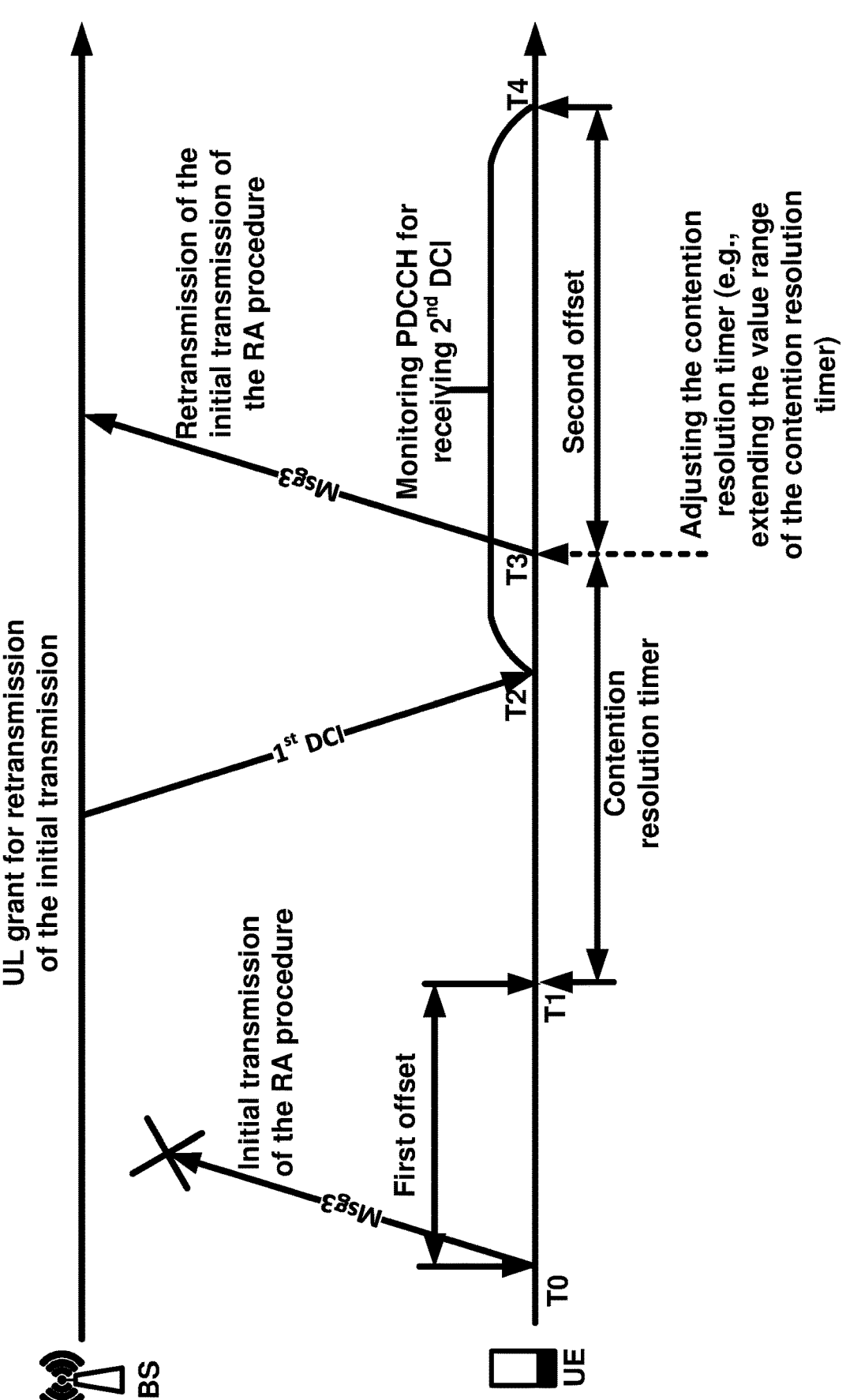
FIG. 27 illustrates an example of a random access of an RA procedure per aspect of an embodiment of the present disclosure.

In an example embodiment, as shown in FIG. 22, FIG. 23, and FIG. 27, the wireless device may, based on the retransmission of the initial transmission being performed at time T4, adjust the CR to not expire until after the retransmission of the initial transmission.

For example, as shown in FIG. 22, FIG. 23, FIG. 24, FIG. 25, FIG. 26, and FIG. 27, based on adjusting the CR timer, the wireless device may monitor PDCCH to receive a $2^{nd}$ DCI. In an example, the base station may, based on receiving the retransmission of the initial transmission, transmit the $2^{nd}$ DCI. The second DCI may, for example, indicate a downlink assignment comprising a transport block (TB). For example, the TB may comprise the indication for the contention resolution. For example, the second DCI may indicate an UL grant for a second retransmission of the initial transmission. According to an example, the second DCI may indicate one or more retransmissions of the initial retransmission.

As shown in FIG. 22, FIG. 23, FIG. 24, FIG. 25, FIG. 26, and FIG. 27, the wireless device may, based on the CR timer being adjusted, transmit the retransmission of the initial transmission at time T3. For example, the base station may, based on receiving the retransmission of the initial transmission, transmit the Msg4. The wireless device may, based on the CR timer being adjusted, monitor the PDCCH to receive the Msg4 1314. In an example, the wireless device may receive the Msg4 before the contention resolution timer expires.

By adjusting the CR timer to not expire until after the transmission of the retransmission of the initial transmission, the wireless device may reduce the latency of the contention resolution procedure, improve the efficiency of the RA procedure, and/or reduce the power consumption. For example, by adjusting the CR timer, the wireless device may not consider/determine the contention resolution being unsuccessful, e.g., based on receiving the Msg4 and/or performing the retransmission of the initial transmission.

For example, by adjusting the CR timer, the wireless device may not (re)transmit the first preamble and/or the second preamble (e.g., after applying the backoff time). Adjusting the CR timer may result in reducing the latency of the contention resolution and/or the consumed power of the wireless device. For example, by adjusting the CR timer, the wireless device may not flush the HARQ buffer of the Msg3 and/or discard the TC-RNTI and/or stop the time alignment timer. Adjusting the CR timer may result in improving the efficiency of the RA procedure.

In an example, the initial transmission may be for the Msg3 of the RA procedure. As shown in FIG. 23, FIG. 24, FIG. 25, FIG. 26, and FIG. 27, the wireless device may transmit the Msg3 1313 at time TO. The wireless device may transmit the Msg3, for example, based on receiving the first RAR message or the second RAR message. The first RAR message or the second RAR message may schedule/indicate transmission of the Msg3. In an example, the wireless device may receive the first RAR message in response to transmitting the Msg1 1311 (e.g., the first preamble). In an example, the wireless device may receive the second RAR message in response to transmitting the MsgA 1331 comprising at least the second preamble 1341. For example, the first RAR message may comprise at least the RAR with the MAC subPDU with RAPID matching the first preamble and a first UL grant for the transmission of the Msg3. For example, the second RAR message may comprise at least the fallback RAR with the MAC subPDU with RAPID matching the second preamble and a second UL grant for the transmission of the Msg3.

In an example, the wireless device may transmit the Msg3 based on receiving/detecting a third DCI. For example, the base station may transmit the third DCI to indicate/schedule the transmission of the Msg3. In an example, the third DCI may have a CRC scrambled by the TC-RNTI.

When/while/during the CR timer is running, the wireless device may monitor the PDCCH (e.g., the one or more PDCCH candidates). For example, the wireless device may monitor the one or more PDCCH candidates for the TC-RNTI and/or the C-RNTI. For example, the wireless device may monitor the one or more PDCCH candidates to receive an indication for retransmission of the Msg3. For example, the wireless device may monitor the one or more PDCCH candidates to receive the Msg4 1314. For example, the wireless device may monitor the one or more PDCCH candidates to receive the indication of the contention resolution. For example, the base station may, based on receiving the retransmission of the Msg3 successfully, transmit the Msg4 comprising the indication of the contention resolution. For example, the wireless device may, based on receiving the indication of the contention resolution, stop the CR timer and consider the contention resolution successfully completed.

As shown in FIG. 23, FIG. 24, FIG. 25, FIG. 26, and FIG. 27, during/while the CR timer is running, the wireless device may receive the first DCI at time T2. The first DCI may schedule a retransmission of the initial transmission (e.g., the retransmission of the Msg3). For example, the first DCI may indicate an uplink grant for the retransmission of the Msg3. For example, the first DCI may/have CRC scrambled by the TC-RNTI.

In an example embodiment, the wireless device may adjust the CR timer to not expire until after the transmission of the retransmission of the Msg3.

In an example embodiment, the wireless device may adjust the CR timer based on at least one of: the first DCI being received, the transmission of the Msg3 being performed, or the retransmission of the Msg3 being performed.

As shown FIG. 22, FIG. 23, FIG. 24, and FIG. 26, the wireless device may adjust the CR timer based on the first DCI being received at time T2.

As shown in FIG. 22, FIG. 23, and FIG. 27, the wireless device may adjust the CR timer based on the transmission of the retransmission of the Msg3 (e.g., the Msg3 retransmission) at time T3.

As shown in in FIG. 22, FIG. 23, and FIG. 25, the wireless device may adjust the CR timer based on the transmission of the Msg3 at time TO.

For example, an adjusting of the CR timer to not expire until after the transmission of the retransmission of the Msg3 may comprise adjusting the CR timer to not expire until the transmission of the retransmission of the Msg3. In an example, as FIG. 23 shows, based on receiving/detecting the first DCI at time T2, the wireless device may adjust the CR timer by restarting the CR timer to not expire until the transmission of the retransmission of the Msg3 at time T3. In an example, as FIG. 23 shows, based on transmitting the Msg3 at time TO, the wireless device may adjust the CR timer by extending the value range of the CR timer to not expire until the transmission of the retransmission of the Msg3 at time T3.

For example, the adjusting of the CR timer to not expire until after the transmission of the retransmission of the Msg3 may comprise adjusting the CR timer to not expire until after a second offset (e.g., offset2) after the transmission of the retransmission of the Msg3. For example, based on transmitting the Msg3, the wireless device may adjust the CR timer by extending the value range of the CR timer to not expire until after the second offset from the transmission of the retransmission of the Msg3. For example, the wireless device may adjust the CR timer by stopping the CR timer after the second offset from the reception time of the first DCI. For example, based on transmitting the retransmission of the Msg3, the wireless device may adjust the CR timer by extending the value range of the CR timer to not expire until after the second offset from the transmission of the retransmission of the Msg3.

The second offset may be based on the first offset. For example, the second offset may be smaller than the first offset or may be larger than the first offset. For example, the second offset may be equal to the first offset, e.g., the wireless device may adjust the CR timer to not expire until the Msg4 is received. For example, the one or more configuration parameters (e.g., the one or more RACH configuration parameters or the one or more NTN configuration parameters) may indicate/configure the second offset.

In an example, based on the second offset not being configured/indicated, the adjusting of the CR timer to not expire until after the transmission of the retransmission of the Msg3 may comprise adjusting the CR timer to not expire until the transmission of the retransmission of the Msg3. For example, based on the second offset being configured/indicated, the adjusting of the CR timer to not expire until after the transmission of the retransmission of the Msg3 may comprise adjusting the CR timer to not expire until the second offset after the transmission of the retransmission of the Msg3.

The base station (via the one or more configuration parameters) may configure/indicate the second offset to improve the flexibility for scheduling one or more retransmissions of the Msg3. To improve the probability of successfully receiving at least one Msg3 at the base station, the base station may schedule, for example by transmitting a DCI (e.g., the first DCI), the one or more retransmissions of the Msg3. For example, when the second offset is configured, the base station may not wait to unsuccessfully decode the retransmission of the Msg3 to schedule another retransmission of the Msg3. The base station may determine the channel condition of the wireless device not being favorable (e.g., a low signal-to-noise ratio) based on not receiving the Msg3. Via scheduling the one or more retransmissions of the Msg3, the base station may improve the coverage performance of the wireless device. For example, the one or more retransmissions of the Msg3 may be scheduled/indicated after the first DCI and/or until after the retransmission of the Msg3. For example, the one or more retransmissions of the Msg3 may be scheduled/indicated after the retransmission of the Msg3 and before the Msg4 being received.

For example, for adjusting (or to adjust) the CR timer, the wireless device may determine whether the CR timer expires until after the retransmission of the message 3. In response to determining that the CR timer expires until after the retransmission of the Msg3, the wireless device may adjust the CR timer. In response to determining that the contention resolution timer does not expire until after the retransmission of the Msg3, the wireless device may not adjust the CR timer.

For example, in response to the first DCI being detected/received (e.g., at time T2 in FIG. 23, FIG. 24, FIG. 25, FIG. 26, and FIG. 27), the wireless device may determine the transmission time of the retransmission of the Msg3. The wireless device may determine the transmission time of the retransmission of the Msg3 based on at least the cell-specific timing offset (e.g., Koffset), the TA value (e.g., $N_{TA}$), and a time domain resource assignment indicated the first DCI. The wireless device may determine that transmission time of the retransmission of the Msg3 is D ms after the reception time of the first DCI, wherein D may be Koffset-$N_{TA}$+L. In an example, L may depend on at least time domain resource assignment indicated the first DCI, the numerology of the DL configuration, and the numerology of the UL configuration. For example, in response to the remined duration of the CR timer being smaller than the difference between the transmission time of the Msg3 retransmission and the reception time of the DCI (e.g., D), the wireless device may determine that the CR timer expires until the retransmission of the Msg3. For example, in response to the remined duration of the CR timer being larger than the difference between the transmission time of the Msg3 retransmission and the reception time of the DCI (e.g., D), the wireless device may determine that the CR timer does not expire until the retransmission of the Msg3.

For example, the wireless device may determine the CR timer expires until after the retransmission of the Msg3 based on at least one expiry condition being satisfied.

Based on the at least one expiry condition not being satisfied, the wireless device may determine that the CR timer does not expire until after the retransmission of the Msg3.

In an example embodiment, the at least one expiry condition may be based on the first value indicated by one or more RACH configuration parameters. For example, the one or more configuration parameters (e.g., the one or more NTN configuration parameters) may indicate/configured a first scaling factor. The at least one expiry condition may be satisfied based on the first value being smaller than a first threshold. The wireless device may calculate/measure/determine the first threshold based on the cell-specific timing offset, the current TA value, and/or the first scaling factor.

In an example, the wireless device may calculate/measure/determine the first threshold based on the first scaling factor and the difference between the cell-specific timing offset (e.g., Koffset) and the current TA value (e.g., $N_{TA}$), e.g., by multiplying the first scaling factor and Koffset-$N_{TA}$. For example, the wireless device may calculate/determine the first threshold based on an estimate of the differential delay of the cell/beam and the first scaling factor, e.g., by multiplying the first scaling factor and the estimate of the differential delay. For example, the wireless device may calculate/determine the estimate of the differential delay by the difference between the cell-specific timing offset and the feeder link delay. In another example, the one or more configuration parameters may indicate/configure the estimate of the differential delay of the cell/beam. In an example, the wireless device may calculate/measure/determine the first threshold based on the first scaling factor and Koffset-$N_{TA}$+$L_{max}$, e.g., by multiplying the first scaling factor and Koffset-$N_{TA}$+$L_{max}$. In an example, $L_{max}$ may depend on at least a maximum allowable value for a time domain resource assignment indicated the first DCI, the numerology of the DL configuration, and the numerology of the UL configuration. For example, $L_{max}$ may be 16.

For example, the one or more configuration parameters may indicate/configure the first scaling factor and may not indicate/configure the second offset. The at least one expiry condition may be satisfied based on the first value being smaller than the first threshold.

For example, the one or more configuration parameters may indicate/configure the first scaling factor and the second offset. The at least one expiry condition may be satisfied based on the first value being smaller than the second offset and/or the first value being smaller than the second offset plus the first threshold.

For example, the one or more configuration parameters may not indicate/configure the first scaling factor and the second offset. The at least one expiry condition may be satisfied based on the first value being smaller than the first offset.

In an example embodiment, the at least one expiry condition may be based on the distance of the wireless device to a configured reference point. For example, the configured reference point may be the cell/beam center. For example, the configured reference point may be the NTN node. For example, the one or more configuration parameters (e.g., the one or more NTN configuration parameters) may indicate/configure the configured reference point.

In an example, the one or more configuration parameters may not indicate/configure the configured reference point. The wireless device may determine the configured reference point based on the satellite ephemeris parameters and/or the location of the NTN node. For example, the wireless device may determine the configured reference point is the NTN node.

In an example, the one or more configuration parameters (e.g., the one or more NTN configuration parameters) may indicate/configure a second threshold and the second offset. The at least one expiry condition may be satisfied based on the distance of the wireless device to the configured reference point being larger than the second threshold (e.g., the wireless device is located around the cell/beam edge).

In an example, the one or more configuration parameters may indicate/configure the second threshold may not indicate/configure the second offset. The at least one expiry condition may be satisfied based on the distance of the wireless device to the configured reference point being smaller than the second threshold (e.g., the wireless device is located around the cell/beam center).

In an example embodiment, the at least one expiry condition may be based on a UE-specific TA value. In an example, the wireless device may calculate/determine the UE-specific TA value based on (or using) the GNSS-acquired position of the wireless device and/or the satellite ephemeris parameters, and/or the configured reference point. For example, the wireless device may determine/calculate the UE-specific TA value based on the service link delay of the wireless device. In an example, the at least one expiry condition may be satisfied based on the UE-specific TA value being smaller than a third threshold. For example, the one or more configuration parameters (e.g., the one or more NTN configuration parameters) may indicate/configure the third threshold.

For example, the one or more configuration parameters may not indicate/configure the second offset and may indicate/configure the third threshold. The at least one expiry condition may be satisfied based on the UE-specific TA value being smaller than the third threshold (e.g., the wireless device is located around the cell/beam center).

For example, the one or more configuration parameters may indicate/configure the second offset and the third threshold. The at least one expiry condition may be satisfied based on the UE-specific TA value being larger than the third threshold (e.g., the wireless device is located around the cell/beam edge).

In an example embodiment, the at least one expiry condition may be based on an elevation angle between the wireless device and the NTN node. For example, the at least one expiry condition may be satisfied based on the elevation angle between the wireless device and the NTN node being larger than a fourth threshold. In an example, the one or more configuration parameters (e.g., the one or more NTN configuration parameters) may indicate/configure the fourth threshold.

In an example, the one or more configuration parameters may indicate/configure the fourth threshold and may not configure/indicated the second offset. The at least one expiry condition may be satisfied based on the elevation angle between the wireless device and the NTN node being larger than the fourth threshold (e.g., the wireless device is located around the cell/beam center).

In an example, the one or more configuration parameters may indicate/configure the fourth threshold and the second offset. The at least one expiry condition may be satisfied based on the elevation angle between the wireless device and the NTN node being smaller than the fourth threshold (e.g., the wireless device is located around the cell/beam edge).

In an example, the one or more configuration parameters may indicate/configure the second offset. The base station may, by configuring/indicating the at least one of the first scaling factor, the second threshold, the third threshold, and the fourth threshold, allow the wireless device to flexibly adjust the CR timer. For example, based on at least one of the first scaling factor, the second threshold, the third threshold, and the fourth threshold being configured/indicated, the wireless device may adjust the CR timer to compensate for (or based on) the service link delay, e.g., when the wireless device is located around the cell/beam edge.

In an example, the one or more configuration parameters may not indicate/configure the second offset. Based on at least one of the first scaling factor, the second threshold, the third threshold, and the fourth threshold being configured/ indicated, the wireless device may adjust the CR timer to compensate for (or based on) the differential delay of the cell/beam and/or the difference between the cell-specific timing offset and the current TA value, e.g., when the wireless device is located around the cell/beam center.

In an example embodiment, the wireless device may adjust the CR timer by restarting the CR timer, stopping the CR timer, and/or extending the value range of the CR timer. For example, when a discontinues reception (DRX) operation is not configured (e.g., via the one or more DRX configuration parameters), the wireless device may adjust the CR timer by restarting the CR timer and/or extending the value range of the CR timer.

For example, the one or more DRX configuration parameters may configured the wireless device with the DRX operation. The wireless device may adjust the CR timer by stopping the CR timer. For example, the wireless device may adjust the CR timer by stopping the CR timer to not expire until after the retransmission of the Msg3.

The wireless device may adjust the CR timer by extending the value range of the CR timer based on the second offset and/or the first threshold. For example, the wireless device may set the value range of the CR timer based on first value, the second offset, and/or the first threshold. For example, the wireless device may initialize the CR timer based on the first value, the second offset, and/or the first threshold, e.g., the wireless device may determine the initialized value of the CR timer based on the first value, the second offset, and/or the first threshold. For example, the wireless device may increase the value range of the CR timer by the first threshold (e.g., in number of subframes) and/or the second offset (e.g., in the number of subframes). In an example, the wireless device may add the first threshold and/or the second offset to the first value for initializing the CR timer. For example, based on the CR timer being extended, the wireless device may start the CR timer using the initialized value.

In an example, the one or more configuration parameters may indicate/configure the second offset. The wireless device may extend the value range of the CR timer based on the second offset, e.g., by increasing the value range of the CR timer by the second offset (e.g., in number of subframes) or initializing the CR timer based on the first value and the second offset.

In example, the one or more configuration parameters may not indicate/configure the second offset. The wireless device may extend the value range of the CR timer based on the first offset (e.g., in number of subframes) or initializing the CR timer based on the first value and the first offset.

The wireless device may, by adjusting the CR timer based on whether the DRX operation being configured or not configured (e.g., via the one or more configuration parameters), trade off the consumed power for monitoring the PDCCH and the performance of the RA procedure. For example, when the DRX operation is configured, based on stopping the CR timer, the base station may be restricted in indicating/scheduling the one or more retransmissions of the Msg3. For example, based on stopping the CR timer, the wireless device may reduce the power consumption for monitoring the PDCCH.

In an example, the wireless device may adjust the CR timer based on a HARQ process associated with (or corresponding to) the Msg3 (e.g., a first HARQ process). For example, the first HARQ process may have ID/index/number 0, e.g., HARQ process ID=0. In an example, the base station may indicate/configure the sate/mode of the first HARQ process as the state A (e.g., the DRX-LCP Mode A). For example, the one or more configuration parameters (e.g., the MAC-CellGroupConfig and/or PUSCH-ServingCell-Config) may configure/indicate the state/mode of the first HARQ process. In an example embodiment, based on the sate/mode of the first HARQ process being the state A (or a HARQ state/mode A), the wireless device may stop the CR timer based on receiving the $1^{st}$ DCI. In an example embodiment, regardless of whether the second offset being indicate/configured or not being indicated/configured, based on the sate/mode of the first HARQ process being the state A (or a HARQ state/mode A), the wireless device may stop the CR timer based on receiving the $1^{st}$ DCI.

In an example, the base station may indicate/configure the sate/mode of the first HARQ process as the state B (e.g., the DRX-LCP Mode B). In an example embodiment, based on the sate/mode of the first HARQ process being the state B (or a HARQ state/mode B), the wireless device may adjust the CR timer by restarting the CR timer and/or extending the value range of the CR timer.

In an example embodiment, based on the sate/mode of the first HARQ process being the state B and the second offset being indicated/configured, the wireless device may adjust the CR timer by extending the value range of the CR timer. For example, the wireless device may extend the value range of the CR timer based on transmitting the retransmission of the Msg3 or transmitting the Msg3.

In an example embodiment, based on the sate/mode of the first HARQ process being the state B and the second offset not being indicated/configured, the wireless device may adjust the CR timer by extending the value range of the CR timer. For example, the one or more configuration parameters may indicate/configure the first scaling factor. The wireless device may, based on the first value and the first threshold, extend the value range of the CR timer in response to transmitting the Msg3 or the retransmission of the Msg3.

In an example embodiment, based on the sate/mode of the first HARQ process being the state B and the second offset not being indicated/configured, the wireless device may adjust the CR timer by extending the value range of the CR timer. For example, the one or more configuration parameters may not indicate/configure the first scaling factor. The wireless device may, based on the first value and the first offset, extend the value range of the CR timer in response to transmitting the Msg3 or the retransmission of the Msg3.

In an example embodiment, based on the sate/mode of the first HARQ process being the state B and the second offset not being indicated/configured, the wireless device may adjust the CR timer by extending the value range of the CR timer. For example, the one or more configuration parameters may indicate/configure the first scaling factor. The wireless device may, based on the first value and the first threshold, extend the value range of the CR timer in response to transmitting the Msg3.

The base station may transmit a downlink signal to the wireless device. In an example, the downlink signal may indicate a first indication and/or a second indication. For example, the first indication may indicate adjusting the CR timer by restarting the CR timer. For example, the first indication may configure the wireless device for adjusting the CR timer by restarting the CR timer. The second indication may, for example, be for extending the value range of the CR timer, e.g., the second indication may configure the wireless device for adjusting the CR timer by extending the value range of the CR timer. For example, the second indication may indicate adjusting the CR timer by extending the value range of the CR timer.

The downlink signal may be, for example, a DCI (e.g., the first DCI). For example, the first indication may be indicated by the first DCI and/or the third DCI. For example, the second indication may be indicated by the first DCI and/or the third DCI.

The downlink signal may be, for example, a MAC-CE. In an example, the downlink signal may be a RAR message (e.g., the first RAR message or the second RAR message).

The downlink signal may, for example, be a RRC signaling, e.g., one or more RRC configuration/reconfiguration parameters, e.g., the one or more configuration parameters. In an example, the one or more configuration parameters (e.g., the one or more RACH configuration parameters or the one or more NTN configuration parameters) may indicate/configure the first indication. For example, the one or more configuration parameters (e.g., the one or more RACH configuration parameters or the one or more NTN configuration parameters) may indicate/configure the second indication.

In an example, the wireless device may be configured by the first indication and/or the second indication. The wireless device may adjust the CR timer based on the first indication being configured/indicated and/or the second indication being configured/indicated. The base station by configuring/indicating the first indication and/or the second indication may improve the flexibility of the wireless device for adjusting the CR timer.

For example, the first indication may be configured/indicated and/or the second indication may be configured/indicated. Regardless of whether the state/mode of the first HARQ process is configured/indicates as the state A or state B, the wireless device may adjust the CR timer. For example, the wireless device may, for adjusting the CR timer, ignore whether the state/mode of the first HARQ process is configured/indicates as the state A or state B.

According to an example, the wireless device may adjust the CR timer based on the first indication being configured/indicated and/or the second indication being configured/indicated and/or whether the state/mode of the first HARQ process is configured/indicates as the state A or state B.

In an example, the first indication may be configured/indicated and/or the second indication may be configured/indicated. Regardless of whether the DRX operation being configured or not, the wireless device may adjust the CR timer. For example, the wireless device may ignore whether the DRX operation is configured for adjusting the CR timer.

In an example, the wireless device may adjust the CR timer based on the first indication being configured/indicated and/or the second indication being configured/indicated and/or whether the DRX operation being configured or not.

As shown in FIG. 23, FIG. 24, FIG. 25, FIG. 26, and FIG. 27, the wireless device may, based on the CR timer being adjusted, transmit the retransmission of the Msg3 at time T3. In an example, the wireless device may, based on the CR timer being adjusted, monitor the PDCCH to receive the Msg4. For example, the wireless device may, based on the CR timer being adjusted, receive the Msg4. In an example, the wireless device may receive the Msg4 before the contention resolution timer expires.

In an example, as FIG. 23, FIG. 24, FIG. 25, FIG. 26, and FIG. 27 show, the wireless device may, based on the CR timer being adjusted and after the DCI being received, monitor the PDCCH to detect/receive a second DCI. In an example, the second DCI may indicate a downlink assignment comprising a TB. For example, the TB may comprise the indication for the contention resolution. For example, the second DCI may indicate an UL grant for a second retransmission of the Msg3. For example, the wireless device may, based on adjusting the CR timer, transmit the second retransmission of the Msg3.

In an example, the base station may transmit the at least one indication for scheduling/indicating the one or more retransmissions of the Msg3. The wireless device may, based on the CR timer being adjusted, receive at least one indication for the one or more retransmissions of the Msg3 when/while the CR timer is running. For example, the at least one indication may schedule the wireless device to perform the one or more retransmissions of the Msg3. For example, the at least one indication may be based on (or comprise) the second DCI and/or the first DCI. For example, the at least one indication may be based on (or comprise) a fourth DCI. The at least one indication may, for example, be based on receiving one or more DCIs. In an example, the one or more DCIs may be detected/received after receiving/detecting the first DCI. In an example, the one or more DCIs may be detected/received before receiving the downlink assignment comprising the indication for the contention resolution.

By adjusting the CR timer to not expire until after the transmission of the Msg3 retransmission, the base station may be able to indicate/schedule the one or more retransmissions of the Msg3 when/while the CR timer is running. For example, the base station may improve a decoding probability of the Msg3 based on the one or more retransmissions of the Msg3 being performed by the wireless device. For example, the base station may not encounter restriction in scheduling/indicating the one or more retransmission of the Msg3 when the CR timer being adjusted.

By adjusting the CR timer, the latency of the contention resolution procedure may reduce, the consumed power of the wireless device may reduce, and/or the efficiency of the RA procedure may be improved. For example, the flexibility of the base station for scheduling the one or more retransmissions of the Msg3 before the expiry of the CR timer may be improved.

Figure 24:
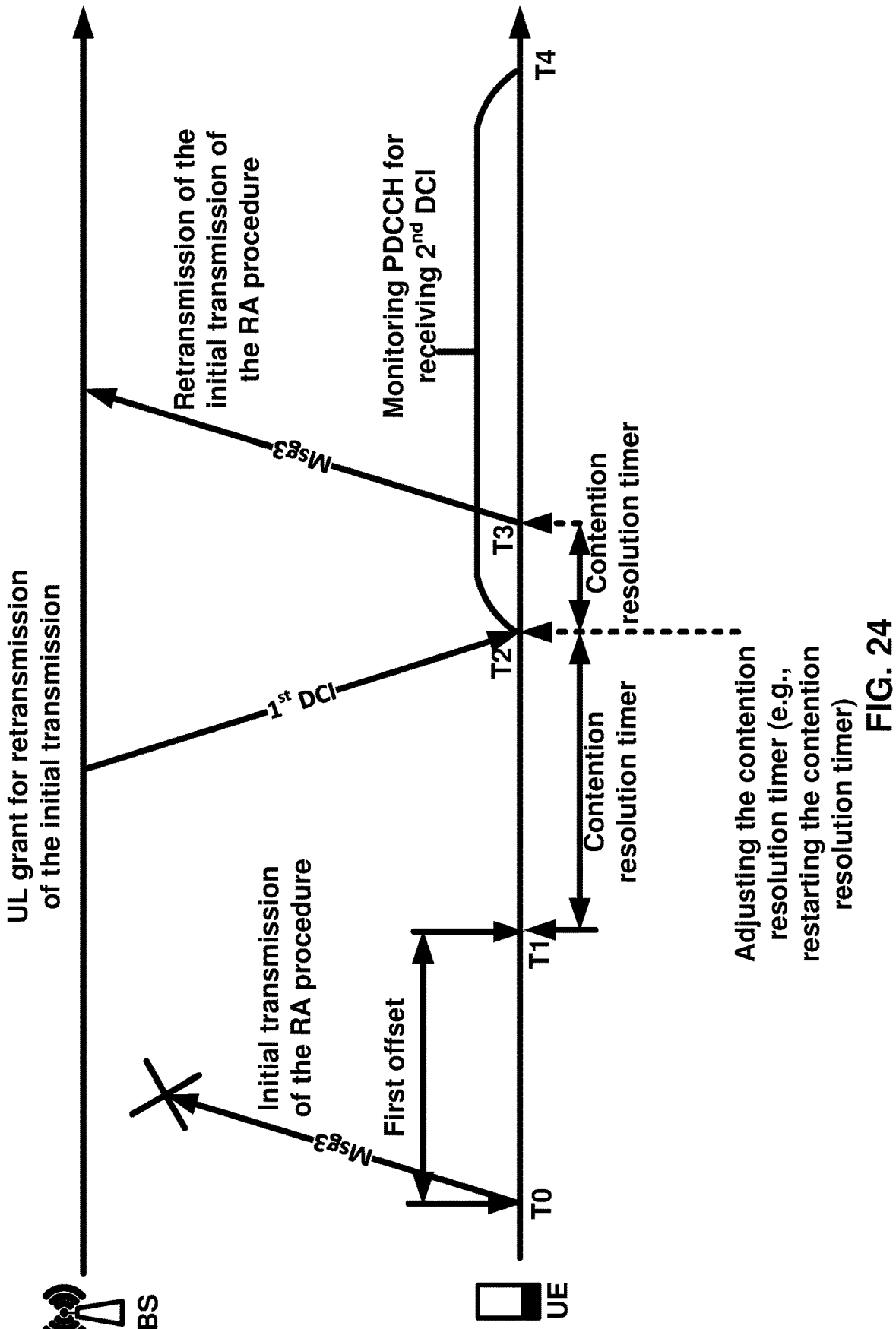
FIG. 24 illustrates an example of a random access of an RA procedure per aspect of an embodiment of the present disclosure.

In an example embodiment, as shown in FIG. 24, in response to receiving the first DCI, the wireless device may adjust the CR timer by restarting the CR timer to not expire until the transmission of the retransmission of the Msg3 (e.g., the initial transmission) at time T3.

For example, the one or more configuration parameters may not comprise the one or more DRX configuration parameters, e.g., the one or more configuration parameters may not configure the wireless device with the DRX operation. The wireless device may adjust the CR timer by restarting the CR timer in response to receiving the first DCI. For example, the sate/mode of the first HARQ process may be the state B.

In an example, based on the sate/mode of the first HARQ process being the state B (e.g., the DRX-LCP Mode B), the wireless device may adjust the CR timer by restarting the CR timer in response to receiving the first DCI. For example, the one or more configuration parameters may not configure the wireless device with the DRX operation.

In an example, based on the sate/mode of the first HARQ process being the state B (e.g., the DRX-LCP Mode B), the wireless device may adjust the CR timer by restarting the CR timer in response to receiving the first DCI. For example, the one or more configuration parameters may configure the wireless device with the DRX operation.

In an example, based on the sate/mode of the first HARQ process being the state B (e.g., the DRX-LCP Mode B) and regardless of whether the DRX operation is configured or not, the wireless device may adjust the CR timer by restarting the CR timer in response to receiving the first DCI. For example, the wireless device may ignore the DRX operation.

For example, the wireless may determine that the at least one expiry condition is satisfied. The wireless device may, in response to receiving/detecting the first DCI, restart the CR timer to not expire until the transmission of the retransmission of the Msg3.

In an example embodiment, in response to receiving/detecting the first DCI and the remined duration of the CR timer being smaller than the difference between the transmission time of the Msg3 retransmission and the reception time of the DCI (e.g., D), the wireless device may restart the CR timer in response to receiving the first DCI.

In an example, in response to receiving/detecting the first DCI and the remined duration of the CR timer being larger than the difference between the transmission time of the Msg3 retransmission and the reception time of the DCI (e.g., D), the wireless device may not restart the CR timer. For example, the wireless device may stop the CR timer. The wireless device may, based on not restarting the CR timer, stop the CR timer in response to receiving the first DCI.

For example, the one or more configuration parameters may configure/indicated the first scaling factor. In an example embodiment, in response to the remined duration of the CR timer being larger than the first threshold, the wireless device may restart the CR timer based on the first DCI being received/detected. In an example embodiment, in response to the remined duration of the CR timer being smaller than the first threshold, the wireless device may not restart the CR timer based on the first DCI being received/detected. For example, the wireless device may, based on not restarting the CR timer, stop the CR timer in response to receiving the first DCI.

In an example embodiment, in response to receiving the first DCI, the wireless device may restart the CR timer to not expire until the transmission of the retransmission of the Msg3 based on the first indication being configured/indicated and the second indication not being configured/indicated. In an example, the wireless device may determine the at least one expiry condition being satisfied.

For example, the first indication may be indicated by a DCI (e.g., the first DCI and/or the third DCI). In an example, the first indication may be configured by the one or more configuration parameters. For example, the RAR message (e.g., the first RAR message or the second RAR message) may indicate the first indication. For example, the second indication may not be configured/indicated, e.g., the DCI may not indicate the second indication, or the one or more configuration parameters may not indicate/configure the second indication or the RAR message may not indicate the second indication. Based on the first indication being indicated/configured and the second indication not being configured/indicated, the wireless device may restart the CR timer at time T2 in FIG. 24.

For example, the first indication may be configured/indicated, and the second indication may not be configured/indicated. Regardless of whether the state/mode of the first HARQ process is configured/indicates as the state A or state B, the wireless device may restart the CR timer in response to receiving the first DCI. For example, the wireless device may, for restarting the CR timer, ignore whether the state/mode of the first HARQ process is configured/indicates as the state A or state B.

For example, the wireless device may determine that the state/mode of the first HARQ process is configured/indicates as the state B. Regardless of whether the first indication being configured/indicated or not, the wireless device may restart the CR timer in response to receiving the first DCI. For example, the wireless device may, for restarting the CR timer, ignore whether the first indication being configured/indicated or not.

In an example, the first indication may be configured/indicated and/or the second indication may not be configured/indicated. Regardless of whether the DRX operation being configured or not, the wireless device may adjust the CR timer by restarting the CR timer in response to receiving the first DCI. For example, the wireless device may ignore whether the DRX operation is configured for adjusting the CR timer.

In an example embodiment, as FIG. 25 shows, in response to transmitting the Msg3 (e.g., performing the initial transmission) at time TO, the wireless device may adjust the CR timer by extending the value range of the CR timer based on the second offset and/or the first threshold. For example, when the DRX operation is configured, the wireless device may adjust the CR timer by extending the value range of the CR timer. The wireless device may, based on the CR timer being extended and after the first offset, start the CR timer at time T1.

For example, the wireless may determine the at least one expiry condition being satisfied. For example, based on the first scaling factor being indicated/configured, the wireless device may extend the value range of the CR timer to not expire until the transmission of the retransmission of the Msg3.

For example, based on the first scaling factor being indicated/configured and the mode/state of the first HARQ process being the state A, the wireless device may extend the value range of the CR timer to not expire until the transmission of the retransmission of the Msg3. By extending the value range of the CR timer, the wireless device may be able to transmit the retransmission of the Msg3 before the expiry of the CR timer.

For example, the one or more configuration parameters may not indicate/configure the first scaling factor. In an example, the wireless device may determine the state/mode of the first HARQ process is the state B. The wireless device may extend the value range of the CR timer to not expire until after the transmission of the retransmission of the Msg3 based on the first value and/or the second offset and/or the first offset. Based on extending the value range of the CR timer, the base station may be able to indicate/schedule the one or more retransmissions of the Msg3.

In an example, based on the second threshold being indicated/configured, the wireless device may extend the value range of the CR timer to not expire until the second offset after the transmission of the retransmission of the Msg3. In another example, based on the second threshold not being indicated/configured and the first scaling factor not being indicated/configured, the wireless device may extend the value range of the CR timer to not expire until the first offset after the transmission of the retransmission of the Msg3. For example, the wireless device may extend the value range of the wireless device to not expire until the reception of the Msg4.

For example, the second indication may be indicated by a DCI (e.g., the third DCI). In an example, the second indication may be configured by the one or more configuration parameters. For example, the RAR message (e.g., the first RAR message or the second RAR message) may indicate the second indication. For example, the first indication may not be configured/indicated, e.g., the third DCI may not indicate the first indication, or the one or more configuration parameters may not indicate/configure the first indication or the RAR message may not indicate the first indication. In an example embodiment, in response to transmitting the Msg3, the wireless device may extend the value range of the CR timer based the first indication not being configured/indicated and the second indication being configured/indicated. In an example, the at least one expiry condition may be satisfied. For example, regardless of whether the DRX operation being configured or not being configured, the wireless device may extend the value range of the CR timer.

Figure 26:
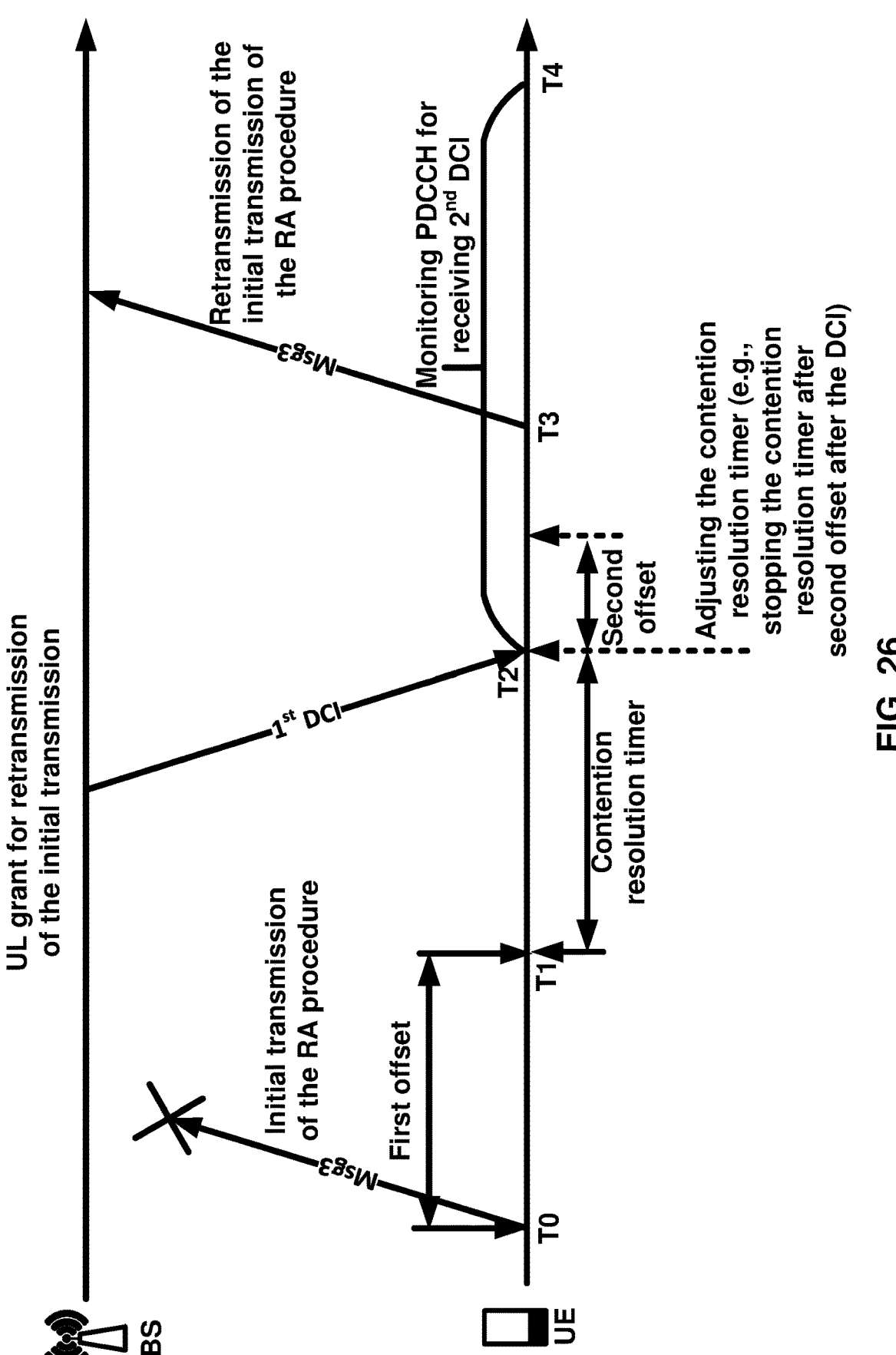
FIG. 26 illustrates an example of a random access of an RA procedure per aspect of an embodiment of the present disclosure.

In an example embodiment, as FIG. 26 shows, the wireless device may adjust the CR timer by stopping, in response to receiving the first DCI and after the second offset, the CR timer.

For example, when the DRX operation is configured, the wireless device may adjust the CR timer by stopping the CR timer. The wireless device may adjust the CR timer by stopping the CR timer based on the first DCI being received/detected.

For example, the one or more configuration parameters may configure/indicate the second offset. In an example embodiment, the wireless device may adjust the CR timer by stopping the CR timer after the second offset after the first DCI being received/detected. For example, the DRX operation may be configured.

In an example, based on the sate/mode of the first HARQ process being the state A (e.g., the DRX-LCP Mode A), the wireless device may adjust the CR timer by stopping the CR timer in response to receiving the first DCI.

In an example, based on the sate/mode of the first HARQ process being the state A (e.g., the DRX-LCP Mode A) and the DRX operation not being configured, the wireless device may adjust the CR timer by stopping the CR timer in response to receiving the first DCI.

In an example, based on the sate/mode of the first HARQ process being the state A (e.g., the DRX-LCP Mode A) and regardless of whether the DRX operation is configured or not, the wireless device may adjust the CR timer by stopping the CR timer in response to receiving the first DCI. For example, the wireless device may ignore the DRX operation.

In an example, based on the sate/mode of the first HARQ process being the state A (e.g., the DRX-LCP Mode A) and regardless of whether the second offset being configured or not, the wireless device may adjust the CR timer by stopping the CR timer in response to receiving the first DCI. For example, the wireless device may ignore the second offset.

For example, the wireless may determine that the at least one expiry condition is satisfied. The wireless device may, in response to receiving/detecting the first DCI, restart the CR timer to not expire until the transmission of the retransmission of the Msg3.

For example, the wireless device may determine that the remined duration of the CR timer being larger than the second offset. The wireless device may, based on the remined duration of the CR timer being larger than the second offset, may adjust the CR timer by stopping the CR timer after the second offset after the first DCI being received/detected. In an example embodiment, the wireless device may, based on the remined duration of the CR timer being smaller than the second offset and the first DCI being received/detected, may adjust the CR timer by stopping the CR timer.

For example, the one or more configuration parameters may not configure/indicate the second offset. In response to receiving/detecting the first DCI and the remined duration of the CR timer being smaller than the difference between the transmission time of the Msg3 retransmission and the reception time of the DCI (e.g., D), the wireless device may adjust the CR timer by stopping the CR timer based on the first DCI being received/detected. For example, based on the remined duration of the CR timer being smaller than the difference between the cell-specific timing offset and the current TA value and the first DCI being received/detected, the wireless device may adjust the CR timer by stopping the CR timer.

For example, the one or more configuration parameters may configure the first scaling factor and may not configure/indicate the second offset. In response to receiving/detecting the first DCI and the remined duration of the CR timer being smaller than the first threshold, the wireless device may adjust the CR timer by stopping the CR timer.

For example, the first indication may not be configured/indicated, e.g., the third DCI and/or the first DCI may not indicate the first indication, or the one or more configuration parameters may not indicate/configure the first indication or the RAR message may not indicate the first indication. For example, the second indication may not be configured/indicated, e.g., the third DCI and/or the first DCI may not indicate the second indication, or the one or more configuration parameters may not indicate/configure the second indication or the RAR message may not indicate the second indication. In an example embodiment, in response to receiving the first DCI, the wireless device may stop the CR timer. For example, at least one expiry condition may be satisfied. For example, regardless of whether the DRX operation being configured or not being configured, the wireless device may stop the CR timer. For example, the wireless device may stop the CR timer after the second offset after the first DCI being received/detected.

In an example embodiment, as FIG. 27 shows, in response to transmitting the retransmission of the Msg3 (e.g., performing the retransmission of the initial transmission), the wireless device may adjust the CR timer by extending the value range of the CR timer based on the second offset and/or the first offset. In an example, when the DRX operation is configured, the wireless device may adjust the CR timer by extending the value range of the CR timer. For example, the wireless device may, based on the value range of the CR timer being extended, start the CR timer.

For example, the wireless may determine the at least one expiry condition is satisfied. For example, based on the second threshold being indicated/configured, the wireless device may extend the value range of the CR timer to not expire until the second offset after the transmission of the retransmission of the Msg3. In another example, based on the second threshold not being indicated/configured, the wireless device may extend the value range of the CR timer to not expire until the first offset after the transmission of the retransmission of the Msg3 at time T3. For example, the wireless device may extend the value range of the wireless device to not expire until the reception of the Msg4. In an example, the state/mode of the first HARQ process may be indicated/configured as the state B.

For example, the first indication may be configured/indicated, e.g., the third DCI and/or the first DCI may indicate the first indication, or the one or more configuration parameters may indicate/configure the first indication or the RAR message may indicate the first indication. For example, the second indication may be configured/indicated, e.g., the third DCI and/or the first DCI may indicate the second indication, or the one or more configuration parameters may indicate/configure the second indication or the RAR message may indicate the second indication. In an example embodiment, in response to transmitting the retransmission of the Msg3, the wireless device may extend the value range of the CR timer based on the first indication being configured/indicated and the second indication being configured/indicated. In an example, the at least one expiry condition may be satisfied. For example, regardless of whether the DRX operation being configured or not being configured, the wireless device may extend the value range of the CR timer. For example, regardless of whether the state/mode of the first HARQ process being indicated/configured as the state B or the state A, the wireless device may extend the value range of the CR timer. The wireless device may extend value range of the CR timer based on the first value, the second offset, and/or the first offset. Based on extending the CR timer, the wireless device may start the CR timer.

FIG. 28 is an example flow diagram of an RA procedure per aspect of an embodiment of the present disclosure. For example, the wireless device may perform the RA procedure via the NTN.

In an example embodiment, as shown in FIG. 28A, the one or more configuration parameters (e.g., the one or more RACH configuration parameters or the one or more NTN configuration parameters) may indicate/configure a plurality of second factors. The wireless device may determine the second offset based on the plurality of second factors for adjusting the CR timer. For example, the wireless device may determine the second offset for adjusting the CR timer to not expire until after the transmission of the retransmission of the Msg3, e.g., to not expire until after the second offset after the transmission of the retransmission of the Msg3 (e.g., the retransmission of the initial transmission).

For example, the wireless device may select a second factor based on at least one of the following: the distance of the wireless device to the configured reference point, the UE-specific TA value, or the elevation angle between the wireless device and the NTN node. Based on the second factor, the wireless device may determine the second offset. For example, the second offset may be the second factor. In an example, the wireless device may determine the second offset based on the second factor. The wireless device may, for example, determine the second offset based on the second factor and the first offset, e.g., by multiplying the second factor by the first offset, or adding the second factor to the first offset, or dividing the first offset by the second factor, or subtracting the second factor from the first offset.

For example, when the wireless device is located around the cell/beam center, the wireless device may select a smaller second factor from/among the plurality of second factors to compensate for the service link delay. For example, when the wireless device is located around the cell/beam edge, the wireless device may select a larger second factor form/among the plurality of second factors to compensate for the service link delay.

Example embodiments may allow the wireless device to flexibly select a second offset for adjusting the CR timer, e.g., extending the value range of the CR timer.

In an example embodiment, as FIG. 28B shows, the one or more configuration parameters (e.g., the one or more RACH configuration parameters or the one or more NTN configuration parameters) may indicate/configure a plurality of first factors. For example, the wireless device may determine the first value based on the plurality of first factors for adjusting the CR timer. In an example, the wireless device may initialize the CR timer based on the plurality of first factors. The wireless device may select a first factor among/from the plurality of first factors.

In an example, the first value may be the first factor. According to an example, the first value may be determine based on the first factor. By selecting the first factor, the wireless device may reduce the possibility of the CR timer being expired until after the transmission of the retransmission of the Msg3.

In an example embodiment, the wireless device may select the first factor based on at least one of the following: the distance of the wireless device to the configured reference point, the UE-specific TA value, or the elevation angle between the wireless device and the NTN node. For example, the first value may be determined by multiplying the first factor by the first offset (e.g., the UE-gNB RTT) or adding the first factor to the first offset. When the wireless device is located around the cell/beam center, the wireless device may select a smaller first factor from/among the plurality of first factors to compensate for the service link delay. For example, when the wireless device is located around the cell/beam edge, the wireless device may select a larger first factor form/among the plurality of first factors to compensate for the service link delay.

In another example, the wireless device may initialize the value range of the CR timer based on the first value and the first factor, e.g., by adding the first value by the first factor. For example, the first factor may be determined to compensate for the difference between the cell-specific timing offset and the current TA value. When the wireless device is located around the cell/beam center, the wireless device may select a larger first factor from/among the plurality of first factors to compensate for the difference between the cell-specific timing offset and the current TA value. For example, when the wireless device is located around the cell/beam edge, the wireless device may select a smaller first factor form/among the plurality of first factors to compensate for the difference between the cell-specific timing offset and the current TA value.

Example embodiments may allow the wireless device to flexibly select the value range of the CR timer.

An example method, comprising: starting, by a wireless device, a contention resolution timer based on an initial transmission of a random access (RA) procedure; receiving, during/while the contention resolution timer in running, a first downlink control information (DCI) indicating an uplink grant for a retransmission of the initial transmission; adjusting the contention resolution timer to not expire until after the retransmission of the initial transmission based on at least one of the first DCI being received or the initial transmission or the retransmission of the initial transmission being performed; and monitoring, based on the adjusting, physical downlink control channel (PDCCH) to receive a second DCI.

The above-example method, further comprising: performing the initial transmission of the RA procedure.

One or more the above-example methods, wherein the contention resolution timer is delayed by a first offset after performing the initial transmission.

One or more the above-example methods, wherein the first offset is based on a round trip transmission delay (RTT) between the wireless device and a base station (UE-gNB RTT).

One or more the above-example methods, wherein the first offset is the UE-gNB RTT.

One or more the above-example methods, wherein the initial transmission is for a transmission of a message 3 of the RA procedure.

One or more the above-example methods, wherein the initial transmission is scheduled/indicated by a random access response (RAR);

One or more the above-example methods, wherein the initial transmission is scheduled/indicated by a third DCI.

One or more the above-example methods, wherein the third DCI is with/having a cyclic redundancy check (CRC) scrambled by a temporary cell radio network temporary identifier (TC-RNTI).

One or more the above-example methods, further comprising: adjusting the contention resolution timer to not expire until the retransmission of the initial transmission.

One or more the above-example methods, further comprising: adjusting the contention resolution timer to not expire until after a second offset from the retransmission of the initial transmission.

One or more the above-example methods, further comprising: receiving one or more configuration parameters comprising the second offset.

One or more the above-example methods, wherein the second offset is based on a first offset.

One or more the above-example methods, wherein the second offset is equal to the first offset.

One or more the above-example methods, wherein the second offset is determined based on a plurality of second factors, wherein the determining is based on selecting a second factor from the plurality of the second factors.

One or more the above-example methods, wherein the selecting is based on at least one of: a UE-specific TA value; the distance of the wireless device to a configured reference; or an elevation angle between the wireless device and a non-terrestrial network (NTN) node.

One or more the above-example methods, further comprising: determining the contention resolution timer expires until after the retransmission of the initial transmission, wherein the determining is based on at least one of: a first value indicated by one or more RACH configuration parameters; a UE-specific timing advance (TA) value; the distance of the wireless device to a configured reference point; or an elevation angle between the wireless device and an NTN node.

One or more the above-example methods, wherein the adjusting the contention resolution timer comprises stopping the contention resolution timer after a second offset after the first DCI being received.

One or more the above-example methods, wherein the adjusting the contention resolution timer comprises stopping, in response to receiving the first DCI, the contention resolution timer based on at least one of: a remined duration of the contention resolution timer being smaller than the difference between a transmission time of the retransmission of the initial transmission and the reception time of the first DCI; a remined duration of the contention resolution timer being smaller than a first threshold; or a remined duration of the contention resolution timer being smaller than the second offset.

One or more the above-example methods, further comprising: determining the first threshold based on a first scaling factor and a difference between a cell-specific timing offset and a current TA value.

One or more the above-example methods, wherein the first threshold is equal to the multiplication of the first scaling factor and the difference between a cell-specific timing offset and a current TA value.

One or more the above-example methods, wherein the one or more configuration parameters indicate/configure the first scaling factor.

One or more the above-example methods, wherein the adjusting the contention resolution timer comprises stopping the contention resolution timer based on at least one of: a discontinuous reception (DRX) operation not being configured; or a state/mode of a first hybrid automatic repeat request (HARQ) associated with the initial transmission being configured/indicated as a state A.

One or more the above-example methods, wherein the adjusting the contention resolution timer comprises restarting the contention resolution timer.

One or more the above-example methods, the restarting, in response to receiving the first DCI, is based on one of: a remined duration of the contention resolution timer being larger than the difference between a transmission time of the retransmission of the initial transmission and the reception time of the first DCI; or a remined duration of the contention resolution timer being larger than a first threshold.

One or more the above-example methods, wherein the adjusting the contention resolution timer comprises restarting the contention resolution timer or extending the value range of the contention resolution timer based on at least one of: a DRX operation not being configured; or a state/mode of a first HARQ associated with the initial transmission being configured/indicated as a state B.

One or more the above-example methods, wherein the adjusting the contention resolution timer comprises extending, in response to performing the initial transmission, the value range of the contention resolution timer by a second offset and/or a first offset.

One or more the above-example methods, wherein the adjusting the contention resolution timer comprises extending, in response to performing the retransmission of the initial transmission, the value range of the contention resolution timer by a second offset and/or a first offset.

One or more the above-example methods, wherein the adjusting the contention resolution timer comprises extending, in response to preforming the initial transmission or retransmission of the initial transmission, the value range of the contention resolution timer by a second offset and/or a first offset and/or a first threshold.

One or more the above-example methods, further comprising: determining adjusting the contention resolution timer based on a first indication and/or a second indication, wherein: the first indication indicates adjusting the contention resolution timer by restarting the contention resolution timer; and the second indication indicates adjusting the contention resolution timer by extending the value range of the contention resolution timer.

One or more the above-example methods, wherein the first indication is indicated by a downlink signal, wherein the downlink signal is at least one of: the first DCI; a medium access control (MAC) control element (CE); a random access response (RAR); or a radio resource control (RRC) signaling.

One or more the above-example methods, wherein the second indication is indicated by a downlink signal, wherein the downlink signal is at least one of: the first DCI; a MAC CE; a RAR; or a RRC signaling.

One or more the above-example methods, wherein the adjusting the contention resolution timer comprises initializing the contention resolution timer based on a plurality of first factors, wherein the initializing is based on selecting a first factor from the plurality of the first factors.

One or more the above-example methods, wherein the selecting is based on at least one of: a UE-specific TA value; the distance of the wireless device to a configured reference; or an elevation angle between the wireless device and an NTN node.

One or more the above-example methods, wherein the second DCI indicates a transport block indicating an indication for a contention resolution.

One or more the above-example methods, wherein the second DCI indicates a second retransmission of the initial transmission.

One or more the above-example methods, further comprising: receiving, based on the adjusting, at least one indication scheduling one or more retransmissions of the initial transmission.

An example method, comprising: transmitting, by a base station, a first downlink control information (DCI) indicating an uplink grant for a retransmission of an initial transmission; receiving, from a wireless device and in response to the transmitting the first DCI, the retransmission of the initial transmission; and transmitting, based on the receiving, a second DCI.

The above-example method, wherein the initial transmission is scheduled/indicated by a random access response (RAR).

One or more of the above-example methods, wherein the initial transmission is scheduled/indicated by a third DCI.

One or more of the above-example methods, wherein the third DCI is with/having a cyclic redundancy check (CRC) scrambled by a temporary cell radio network temporary identifier (TC-RNTI).

One or more of the above-example methods, further comprising: transmitting one or more downlink signals comprising one or more configuration parameters.

One or more of the above-example methods, wherein the one or more configuration parameters comprise at least one of: a second offset; a plurality of second factors; a plurality of first factors; one or more discontinues reception (DRX) configuration parameters; configuration parameters indicating/configuration state/mode of a first hybrid automatic repeat request (HARQ) associated with the initial transmission; a first scaling factor; a second threshold; a third threshold; a fourth threshold; a configured reference point; one or more non-terrestrial network (NTN) configuration parameters; a first indication for restarting the contention resolution timer; or a second indication for extending the value range of the contention resolution timer.

One or more of the above-example methods, further comprising: indicating a first indication via a downlink signal, wherein the downlink signal is at least one of: the first DCI; a medium access control (MAC) control element (CE); a random access response (RAR); or a radio resource control (RRC) signaling.

One or more of the above-example methods, further comprising: indicating a second indication via a downlink signal, wherein the downlink signal is at least one of: the first DCI; a MAC CE; a RAR; or RRC signaling.

One or more of the above-example methods, wherein the second DCI indicates a transport block comprising an indication for a contention resolution.

One or more of the above-example methods, wherein the second DCI indicates a second retransmission of the initial transmission.

One or more of the above-example methods, further comprising transmitting at least one indication scheduling one or more retransmissions of the initial transmission.

One or more of the above-example methods, wherein the at least one indication comprises the first DCI.

One or more of the above-example methods, wherein the at least one indication comprises the second DCI.

What is claimed is:

1. A method comprising:
receiving, by a wireless device, one or more configuration parameters indicating a first value for a contention resolution timer of a first random access configuration;
starting the contention resolution timer based on an initial transmission of a transport block of a random access (RA) procedure via a non-terrestrial network, wherein a length of the contention resolution timer is initialized to the first value;
receiving, while the contention resolution timer is running, a first downlink control information (DCI) indicating a retransmission of the transport block;
determining the contention resolution timer has expired based on an elapsed time exceeding the first value;
not discarding a temporary cell (TC) radio network temporary identifier (RNTI) of the wireless device in response to:
the first DCI being received while the contention resolution timer is running; and
the contention resolution timer having expired before transmission of the retransmission; and
transmitting the retransmission of the transport block based on the TC-RNTI.

2. The method of claim 1, further comprising receiving a random access response (RAR), of the RA procedure, indicating:
the TC-RNTI; and
an uplink grant for an initial transmission of the transport block.

3. The method of claim 2, further comprising transmitting the initial transmission of the transport block based on the TC-RNTI and the uplink grant.

4. The method of claim 1, further comprising:
receiving a second DCI indicating a second uplink grant for an initial transmission of the transport block, wherein the second DCI is with a cyclic redundancy check (CRC) scrambled by the TC-RNTI; and
transmitting the initial transmission of the transport block based on the TC-RNTI and the second uplink grant.

5. The method of claim 1, further comprising, in response to transmitting the retransmission of the transport block, monitoring a physical downlink control channel (PDCCH) using the TC-RNTI.

6. The method of claim 5, further comprising receiving a third DCI scheduling a physical downlink shared channel (PDSCH) of the RA procedure, wherein:
the third DCI is received based on a cyclic redundancy check (CRC) scrambled by the TC-RNTI; and
the PDSCH is for contention resolution.

7. The method of claim 1, further comprising at least one of:
not determining contention resolution, of the RA procedure, is unsuccessful;
not indicating the contention resolution is unsuccessful;
not flushing a hybrid repeat request (HARQ) buffer of the initial transmission of the RA procedure;
not stopping a time alignment timer; or
not retransmitting a preamble of the RA procedure.

8. A non-transitory computer-readable medium comprising instructions that, when executed by one or more processors of a wireless device, cause the wireless device to:

receive one or more configuration parameters indicating a first value for a contention resolution timer of a first random access configuration;

start the contention resolution timer based on an initial transmission of a transport block of a random access (RA) procedure via a non-terrestrial network, wherein a length of the contention resolution timer is initialized to the first value;

receive, while the contention resolution timer is running, a first downlink control information (DCI) indicating a retransmission of the transport block;

determine the contention resolution timer has expired based on an elapsed time exceeding the first value;

not discard a temporary cell (TC) radio network temporary identifier (RNTI) of the wireless device in response to:

the first DCI being received while the contention resolution timer is running; and the contention resolution timer having expired before transmission of the retransmission; and transmit the retransmission of the transport block based on the TC-RNTI.

9. The non-transitory computer-readable medium of claim 8, wherein the instructions further cause the wireless device to receive a random access response (RAR), of the RA procedure, indicating:

the TC-RNTI; and an uplink grant for an initial transmission of the transport block.

10. The non-transitory computer-readable medium of claim 9, wherein the instructions further cause the wireless device to transmit the initial transmission of the transport block based on the TC-RNTI and the uplink grant.

11. The non-transitory computer-readable medium of claim 8, wherein the instructions further cause the wireless device to:

receive a second DCI indicating a second uplink grant for an initial transmission of the transport block, wherein the second DCI is with a cyclic redundancy check (CRC) scrambled by the TC-RNTI; and transmit the initial transmission of the transport block based on the TC-RNTI and the second uplink grant.

12. The non-transitory computer-readable medium of claim 8, wherein the instructions further cause the wireless device to, in response to transmitting the retransmission of the transport block, monitor a physical downlink control channel (PDCCH) using the TC-RNTI.

13. The non-transitory computer-readable medium of claim 12, wherein the instructions further cause the wireless device to receive a third DCI scheduling a physical downlink shared channel (PDSCH) of the RA procedure, wherein:

the third DCI is received based on a cyclic redundancy check (CRC) scrambled by the TC-RNTI; and the PDSCH is for contention resolution.

14. A wireless device comprising:

one or more processors; and memory storing instructions that, when executed by the one or more processors, cause the wireless device to:

receive one or more configuration parameters indicating a first value for a contention resolution timer of a first random access configuration;

start the contention resolution timer based on an initial transmission of a transport block of a random access (RA) procedure via a non-terrestrial network, wherein a length of the contention resolution timer is initialized to the first value;

receive, while the contention resolution timer is running, a first downlink control information (DCI) indicating a retransmission of the transport block;

determine the contention resolution timer has expired based on an elapsed time exceeding the first value;

not discard a temporary cell (TC) radio network temporary identifier (RNTI) of the wireless device in response to:

the first DCI being received while the contention resolution timer is running; and the contention resolution timer having expired before transmission of the retransmission; and transmit the retransmission of the transport block based on the TC-RNTI.

15. The wireless device of claim 14, wherein the instructions further cause the wireless device to:

receive a random access response (RAR), of the RA procedure, indicating:

the TC-RNTI; and an uplink grant for an initial transmission of the transport block.

16. The wireless device of claim 15, wherein the instructions further cause the wireless device to:

transmit the initial transmission of the transport block based on the TC-RNTI and the uplink grant.

17. The wireless device of claim 14, wherein the instructions further cause the wireless device to:

receive a second DCI indicating a second uplink grant for an initial transmission of the transport block, wherein the second DCI is with a cyclic redundancy check (CRC) scrambled by the TC-RNTI; and transmit the initial transmission of the transport block based on the TC-RNTI and the second uplink grant.

18. The wireless device of claim 14, wherein the instructions further cause the wireless device to:

in response to transmitting the retransmission of the transport block, monitor a physical downlink control channel (PDCCH) using the TC-RNTI.

19. The wireless device of claim 18, wherein the instructions further cause the wireless device to:

receive a third DCI scheduling a physical downlink shared channel (PDSCH) of the RA procedure, wherein:

the third DCI is received based on a cyclic redundancy check (CRC) scrambled by the TC-RNTI; and the PDSCH is for contention resolution.

20. The wireless device of claim 14, wherein the instructions further cause the wireless device to not perform at least one of:

determine contention resolution, of the RA procedure, is unsuccessful;

indicate the contention resolution is unsuccessful;

flush a hybrid repeat request (HARQ) buffer of the initial transmission of the RA procedure;

stop a time alignment timer; or retransmit a preamble of the RA procedure.

* * * * *